United States Patent
Ran et al.

(10) Patent No.: US 12,424,101 B2
(45) Date of Patent: Sep. 23, 2025

(54) SYSTEMS AND METHODS FOR CONNECTED AND AUTOMATED VEHICLE HIGHWAY SYSTEMS DEDICATED LANE MANAGEMENT AND CONTROL

(71) Applicant: CAVH LLC, Fitchburg, WI (US)

(72) Inventors: Bin Ran, Fitchburg, WI (US); Shuyan He, Madison, WI (US); Yang Cheng, Middleton, WI (US); Shen Li, Madison, WI (US); Yongming He, Madison, WI (US); Tingting Gao, Madison, WI (US); Liu Yang, Madison, WI (US); Zhenlong Li, Madison, WI (US); Yuanyuan Zhang, Madison, WI (US); Ning Jin, Madison, WI (US); Yanghui Mo, Madison, WI (US); Leyu Wei, Madison, WI (US)

(73) Assignee: CAVH LLC, Fitchburg, WI (US)

( * ) Notice: Subject to any disclaimer, the term of this patent is extended or adjusted under 35 U.S.C. 154(b) by 315 days.

(21) Appl. No.: 18/119,599

(22) Filed: Mar. 9, 2023

(65) Prior Publication Data
US 2023/0282115 A1  Sep. 7, 2023

Related U.S. Application Data

(63) Continuation of application No. 16/839,852, filed on Apr. 3, 2020, now abandoned.

(30) Foreign Application Priority Data

Apr. 9, 2019 (CN) .......................... 201910279013.X
Apr. 9, 2019 (CN) .......................... 201910279014.4
(Continued)

(51) Int. Cl.
*G08G 1/00* (2006.01)
*B60W 30/18* (2012.01)
(Continued)

(52) U.S. Cl.
CPC ....... *G08G 1/205* (2013.01); *B60W 30/18163* (2013.01); *B60W 40/06* (2013.01); *B60W 60/0053* (2020.02); *G08G 1/22* (2013.01)

(58) Field of Classification Search
CPC ..... G08G 1/205; G08G 1/22; B60W 60/0053; B60W 30/18163; B60W 40/06
See application file for complete search history.

(56) References Cited

U.S. PATENT DOCUMENTS 9,187,117 B2    11/2015  Spero et al.
9,775,004 B2 *   9/2017  Cawse ................. G08G 1/0112
(Continued)

OTHER PUBLICATIONS

SAE International Standard J3016, "Taxonomy and Definitions for Terms Related to Driving Automation Systems for On-Road Motor Vehicles" (published in 2014 (J3016_201401).
(Continued)

*Primary Examiner* — Hussein Elchanti
(74) *Attorney, Agent, or Firm* — Casimir Jones, S.C.; Thomas A. Isenbarger

(57) ABSTRACT

Provided herein is technology relating to roadway design and traffic control systems and methods for connected and automated vehicle and highway (CAVH) systems, and particularly, but not exclusively, to systems and methods for controlling switching of vehicles between automated mode and human-driven mode, systems and methods for vehicle merging, diverging, and overtaking on automated lanes of multiple lane highways, systems and methods for emergency management and roadside assistance on automated lanes, and/or systems and methods for managing automated vehicle lanes on urban major and minor expressways.

19 Claims, 32 Drawing Sheets

(30) Foreign Application Priority Data

| | | |
|---|---|---|
| Apr. 9, 2019 | (CN) | 201910279021.4 |
| Apr. 9, 2019 | (CN) | 201910279023.3 |
| Jul. 30, 2019 | (CN) | 201910694665.X |
| Aug. 9, 2019 | (CN) | 201910733559.8 |
| Aug. 9, 2019 | (CN) | 201910733847.3 |

(51) Int. Cl.

*B60W 40/06* (2012.01)
*B60W 60/00* (2020.01)

(56) References Cited

U.S. PATENT DOCUMENTS

| | | | |
|---|---|---|---|
| 10,380,886 | B2 | 8/2019 | Ran et al. |
| 10,692,365 | B2 | 6/2020 | Ran et al. |
| 11,073,400 | B2 * | 7/2021 | Bailey ................ G01C 21/3815 |
| 12,233,872 | B2 * | 2/2025 | Chikamori .......... B60W 30/182 |
| 12,280,783 | B2 * | 4/2025 | Woodbury ...... B60W 30/18163 |
| 2005/0015203 | A1 * | 1/2005 | Nishira ................ B60W 50/16 |
| | | | 340/436 |
| 2008/0147319 | A1 | 6/2008 | Cubillo |
| 2009/0125174 | A1 | 5/2009 | Delean |
| 2010/0063720 | A1 | 3/2010 | Machino |
| 2010/0110105 | A1 | 5/2010 | Kinnunen |
| 2010/0161192 | A1 * | 6/2010 | Nara ............... B60W 30/18145 |
| | | | 701/1 |
| 2012/0166076 | A1 | 6/2012 | Hardy |
| 2014/0156133 | A1 * | 6/2014 | Cullinane ......... B60W 60/0059 |
| | | | 701/23 |
| 2014/0156182 | A1 | 6/2014 | Nemec et al. |
| 2014/0277888 | A1 | 9/2014 | Dastoor et al. |
| 2016/0019434 | A1 | 1/2016 | Caldwell |
| 2016/0132705 | A1 | 5/2016 | Kovarik |
| 2016/0154538 | A1 | 6/2016 | Wang et al. |
| 2017/0018189 | A1 * | 1/2017 | Ishikawa .............. G05D 1/0088 |
| 2017/0197629 | A1 | 7/2017 | Redbrandt et al. |
| 2017/0276492 | A1 * | 9/2017 | Ramasamy ...... G08G 1/096758 |
| 2017/0336797 | A1 * | 11/2017 | Abe .......................... B60R 1/27 |
| 2018/0012492 | A1 | 1/2018 | Baldwin et al. |
| 2018/0088572 | A1 | 3/2018 | Uchida et al. |
| 2018/0120837 | A1 | 5/2018 | Regmi et al. |
| 2018/0154939 | A1 * | 6/2018 | Aoki ........................ B60Q 9/00 |
| 2018/0162396 | A1 | 6/2018 | Ibuka et al. |
| 2018/0299284 | A1 | 10/2018 | Wang |
| 2018/0354510 | A1 * | 12/2018 | Miyata ............ B60W 30/18163 |
| 2018/0354518 | A1 * | 12/2018 | Inou ................ B60W 60/00272 |
| 2019/0071099 | A1 * | 3/2019 | Nishiguchi ........ B62D 15/0255 |
| 2019/0072970 | A1 * | 3/2019 | Izumori ........... B60W 30/18145 |
| 2019/0084572 | A1 * | 3/2019 | Oishi ....................... B60Q 1/40 |
| 2019/0096238 | A1 | 3/2019 | Ran et al. |
| 2019/0138024 | A1 | 5/2019 | Liang et al. |
| 2019/0143983 | A1 * | 5/2019 | Hashimoto .......... G05D 1/0088 |
| | | | 701/23 |
| 2019/0170527 | A1 | 6/2019 | Inoue et al. |
| 2019/0206254 | A1 | 7/2019 | Tao et al. |
| 2019/0244521 | A1 | 8/2019 | Ran et al. |
| 2019/0329780 | A1 * | 10/2019 | Tomescu .............. B62D 15/029 |
| 2020/0005633 | A1 | 1/2020 | Jin et al. |
| 2020/0020227 | A1 | 1/2020 | Ran et al. |
| 2020/0021961 | A1 | 1/2020 | Li et al. |
| 2020/0050195 | A1 * | 2/2020 | Gross ..................... B60W 10/08 |
| 2020/0086890 | A1 | 3/2020 | Ikeda et al. |
| 2020/0133272 | A1 | 4/2020 | Chong et al. |
| 2020/0148204 | A1 * | 5/2020 | Kunz ................ B60W 60/0013 |
| 2020/0148214 | A1 | 5/2020 | Tamagaki et al. |
| 2020/0193194 | A1 | 6/2020 | Zhang et al. |
| 2020/0207343 | A1 | 7/2020 | Vassilovski et al. |
| 2020/0239031 | A1 | 7/2020 | Ran et al. |
| 2020/0388161 | A1 | 12/2020 | Kim et al. |
| 2020/0398849 | A1 * | 12/2020 | Kanoh ..................... G08G 1/16 |

OTHER PUBLICATIONS

SAE International Standard J3016, "Taxonomy and Definitions for Terms Related to Driving Automation Systems for On-Road Motor Vehicles" revised in 2016 (J3016_201609).

SAE International Standard J3016, "Taxonomy and Definitions for Terms Related to Driving Automation Systems for On-Road Motor Vehicles" revised in 2018 (J3016_201806 ).

\* cited by examiner

SYSTEMS AND METHODS FOR CONNECTED AND AUTOMATED VEHICLE HIGHWAY SYSTEMS DEDICATED LANE MANAGEMENT AND CONTROL

This application is a continuation of U.S. patent application Ser. No. 16/839,852, filed Apr. 3, 2020, which claims priority to Chinese patent application 201910279013.X, filed Apr. 9, 2019; Chinese patent application 201910279014.4, filed Apr. 9, 2019; Chinese patent application 201910279021.4, filed Apr. 9, 2019; Chinese patent application 201910279023.3, filed Apr. 9, 2019; Chinese patent application 201910694665.X, filed Jul. 30, 2019; Chinese patent application 201910733847.3, filed Aug. 9, 2019; and Chinese patent application 201910733559.8, filed Aug. 9, 2019, each of which is incorporated herein by reference in its entirety.

FIELD

Provided herein is technology relating to roadway design and traffic control systems and methods for connected and automated vehicle and highway (CAVH) systems, and particularly, but not exclusively, to systems and methods for controlling switching of vehicles between automated mode and human-driven mode, systems and methods for vehicle merging, diverging, and overtaking on automated lanes of multiple lane highways, systems and methods for emergency management and roadside assistance on automated lanes, and/or systems and methods for managing automated vehicle lanes on urban major and minor expressways.

BACKGROUND

Autonomous vehicles, vehicles that are capable of sensing their environment and navigating without or with reduced human input, are in development. Accordingly, road designs and technologies for managing traffic comprising autonomous vehicles and/or traffic comprising a mixture of autonomous vehicles and human-driven vehicles are needed.

SUMMARY

Accordingly, provided herein is technology for roadway design and traffic control for connected and automated vehicle and highway (CAVH) systems. For example, in some embodiments, the technology provides road designs, systems, and methods for controlling switching of vehicles between automated mode and human-driven mode; systems and methods for vehicle merging, diverging, and overtaking on automated lanes of multiple lane highways; systems and methods for emergency management and roadside assistance on automated lanes; and/or systems and methods for managing automated vehicle lanes on urban major and minor expressways. Accordingly, in some embodiments, the technology provides a road design and traffic control system for a connected and automated vehicle and highway (CAVH) system. For example, in some embodiments, the road design and traffic control system comprises a vehicle mode control subsystem configured to control mode switching of automated vehicle (AV) driving modes from an automated mode to a human-driven mode and from a human-driven mode to an automated mode; a merging, diverging, and overtaking subsystem configured to control vehicle merging, diverging, and overtaking on automated lanes of multi-lane highways; an emergency management subsystem configured to manage emergencies on roads and provide roadside assistance; and a lane management subsystem configured to manage lanes dedicated for automated vehicle travel.

In some embodiments, the vehicle mode control subsystem is configured to control mode switching for automated vehicles (AVs) traveling on multi-lane highways comprising automated lanes dedicated for AVs and lanes for human-driven vehicles. In some embodiments, the road design and traffic control system further comprises buffer zones and mode switching zones. In some embodiments, the buffer zone provides a road segment for vehicle acceleration and/or vehicle deceleration. In some embodiments, the mode switching zone provides a road segment for vehicles to switch modes from human-driven mode to automated mode. In some embodiments, the mode switching zone provides a road segment for vehicles to switch modes from automated mode to human-driven mode. In some embodiments, the length of a buffer zone is provided by $$L_h = v_{in}\tau_{85} + \frac{|v_{in}^2 - v_{out}^2|}{2a_{avg}}$$

where $L_h$ is the buffer zone length, $v_{in}$ is the maximum speed when entering the buffer zone, $v_{out}$ is the minimum speed to leave the buffer zone, $a_{avg}$ is the average acceleration of a vehicle, and $\tau_{85}$ is an 85% reaction time for a driver. In some embodiments, the length of a mode switching zone is provided by $$L_2 = v \cdot \tau_{85}$$

where $L_2$ is the length of the mode switching zone, v is a vehicle speed, and $\tau_{85}$ is an 85% reaction time for a driver.

In some embodiments, the road design and traffic control system is configured to perform a mode switching method for AVs switching modes from human-driven mode to automated mode. For example, in some embodiments, the mode switching method comprises sending a mode switching request from a vehicle in a mode switching zone to the road design and traffic control system; determining by the road design and traffic control system if the vehicle meets the mode switching requirements; and assuming control of the vehicle by the CAVH system and driving the vehicle through the buffer zone to an automated lane if the mode switching requirements are met by the vehicle, or assuming control of the vehicle by a human driver and driving the vehicle into a human-driven lane if the mode switching requirements are not met. In some embodiments, the road design and traffic control system is configured to perform a mode switching method for AVs switching modes from automated mode to human-driven mode. For example, in some embodiments, the mode switching method comprises sending a mode switching request from a vehicle in a buffer zone to the road design and traffic control system; and assuming control of the vehicle by a human driver in a mode switching zone and driving the vehicle into a human-driven lane.

In some embodiments, the road design and traffic control system further comprises vehicles (e.g., AVs (e.g., in automated mode or in human-driven mode) and human-driven vehicles). In some embodiments, AVs operate in an automated mode or a human-driven mode. In some embodiments, the road design and traffic control system is configured to manage vehicles on highways comprising automated lanes dedicated for AVs and lanes for human-driven vehicles. In some embodiments, the road design and traffic control system is configured to manage vehicles on highways comprising an inner automated lane. In some embodiments, the road design and traffic control system is configured to manage vehicles on highways comprising an outer automated lane. In some embodiments, the road design and traffic control system is configured to manage vehicles on highways comprising a middle automated lane.

In some embodiments, vehicle management and control is provided by a CAVH system. For example, in some embodiments, the present technology incorporates aspects of U.S. patent application Ser. No. 15/628,331, incorporated by reference, which provides a system-oriented and fully-controlled automated vehicle highway (CAVH) system for various levels of connected and automated vehicles and highways. In some embodiments, the present technology incorporates aspects of U.S. patent application Ser. No. 16/267,836, incorporated by reference, which provides systems and methods for an Intelligent Road Infrastructure System (IRIS) configured to provide vehicle operations and control for connected automated vehicle highway (CAVH) systems.

In some embodiments, AVs in automated mode drive on automated lanes dedicated for AVs, AVs in human-driven mode drive on human-driven lanes, and human-driven vehicles drive on human-driven lanes.

In some embodiments, the road design and traffic control system is configured to manage mode switching on a ramp, connector, and/or main road. In some embodiments, the road design and traffic control system comprises signs providing acceleration and/or deceleration instructions to drivers. In some embodiments, the road design and traffic control system comprises signs that are provided at the roadside of a mode switching zone or on a road surface of a mode switching zone.

In some embodiments, the road design and traffic control system comprises a vehicle mode control subsystem that is configured to perform an automated lane access control method. For example, in some embodiments, the technology provides an automated lane access control method comprising providing an AV identification detector at the entrance of an automated lane; determining by the AV identification detector if an approaching vehicle is an AV; and permitting access to the automated lane and assuming control of the vehicle by the road design and traffic control system if the approaching vehicle is an AV or denying access to the automated lane if the approaching vehicle is not an AV. In some embodiments, the road design and traffic control system further provides an "access allowed" signal if the approaching vehicle is an AV or providing an "access denied" signal if the vehicle is not an AV. In some embodiments, the road design and traffic control system further provides alerts and/or instructions to a driver to exit to a human-driven lane if the approaching vehicle is not an AV. In some embodiments, the road design and traffic control system further comprises providing instructions to a driver to pull over an AV that the CAVH system is unable to control.

In some embodiments, the road design and traffic control system comprises a vehicle mode control subsystem that is configured to perform an automated lane exit control method. For example, in some embodiments, the method comprises identifying by the AV or road design and traffic control system one or more exits from an automated lane; optionally identifying an optimal exit from the one or more exits from the automated lane; controlling the AV by the road design and traffic control system to drive through a buffer zone and mode switching zone; exiting the automated lane; and entering a human-driven lane.

In some embodiments, the road design and traffic control system comprises a merging, diverging, and overtaking subsystem that comprises a mode switching management component configured to manage mode switching of AVs entering automated lanes and exiting automated lanes; tidal lane traffic flow component configured to control tidal lane traffic flow; merge/diverge component configured to manage merging of AVs into traffic on automated lanes and diverging of AVs from traffic on automated lanes; and overtaking component configured to manage overtaking by AVs and human-driven vehicles. In some embodiments, the mode switching management component is configured to determine real-time location and velocity information of AVs; and provide control instructions to an AV OBU for merging into an automated lane and/or diverging from an automated lane. In some embodiments, the mode switching management component obtains the real-time location and velocity information of AVs and/or predicts the real-time location and velocity information of AVs. In some embodiments, the control instructions are sent from an RSU to the OBU. In some embodiments, the control instructions are based on a traffic control strategy. In some embodiments, the CAVH system assumes control of an AV entering an automated lane. In some embodiments, the CAVH system controls an AV until it switches from automated mode to human-driven mode and exits an automated lane.

In some embodiments, the tidal lane traffic flow component is configured to open and close tidal flow lanes.

In some embodiments, the merge/diverge component is configured to send control instructions from an RSU to an AV when the merge/diverge component determines that the AV can safely merge into an automated lane or diverge from an automated lane.

In some embodiments, the overtaking component is configured to control an overtaking AV using an extended overtaking lane, using an adjacent reverse direction automated lane, and/or using an emergency lane. In some embodiments, the overtaking component is configured to control an overtaking AV using an extended overtaking lane by performing a method comprising adjusting AV speed; entering an extended overtaking lane from an original driving lane; determining that overtaking has been completed; and returning to the original driving lane. In some embodiments, the overtaking component is configured to control an overtaking AV using an adjacent reverse automated lane by performing a method comprising adjusting AV speed; entering an adjacent reverse automated lane from an original driving lane; determining that overtaking has been completed; and returning to the original driving lane. In some embodiments, the overtaking component is configured to control an overtaking AV using an emergency lane by performing a method comprising adjusting AV speed; entering an emergency lane from an original driving lane; determining that overtaking has been completed; and returning to the original driving lane. In some embodiments, methods for overtaking using an emergency lane or an adjacent reverse automated lane comprise determining that an extended overtaking lane is unavailable for overtaking by the AV. In some embodiments, the overtaking component is configured to provide for human-driven vehicles to perform overtaking using an extended overtaking lane, an automated lane, and/or an emergency lane for overtaking when the overtaking will not affect other traffic and/or when the human-driven vehicles will not occupy the extended overtaking lane, automated lane, and/or emergency lane longer than needed to complete the overtaking.

In some embodiments, the merging, diverging, and overtaking subsystem coordinates with a vehicle mode control subsystem to control mode switching of AV driving modes during merging into automated lanes and diverging from automated lanes. In some embodiments, an AV comprises a human-machine interface component to assist mode switching, merging, and diverging. In some embodiments, a CAVH system controls AVs driving on automated lanes. In some embodiments, a CAVH system comprises RSUs for bidirectional communication between AVs and road infrastructure; roadside sensing; and for positioning and control of AVs. In some embodiments, an RSU detects AV speed, AV acceleration, highway slope, and/or highway curvature; calculates a velocity and/or acceleration required for the AV to merge, diverge, and/or overtake; transmits the calculated velocity and/or acceleration to an OBU and to a TOC; and the TOC determines if the detected AV speed and/or acceleration meets the requirements of the calculated velocity and/or acceleration required for the AV to merge, diverge, and/or overtake. In some embodiments, the TOC further opens or closes a dynamic barrier to control vehicle merging and/or vehicle diverging.

In some embodiments, the merging, diverging, and overtaking subsystem is configured to control access of human-driven vehicles to automated lanes using dynamic lane markings between automated lanes and human-driven lanes. In some embodiments, the dynamic lane markings indicate that an automated lane may be accessed or that an automated lane may not be accessed. In some embodiments, the CAVH system comprises intelligent electronic equipment to produce visual patterns to provide the dynamic lane markings. In some embodiments, the patterns comprise a solid line, a broken line, and/or combinations of line segments having the same or different lengths. In some embodiments, a lane marking comprising a repeating pattern of two short segments and one long segment indicates that a lane is an automated lane and that human-driven vehicles are permitted to access the automated lane. In some embodiments, a lane marking comprising a broken line comprising short segments of the same size indicates that the lane is a reversible automated lane and that human-driven vehicles are permitted to access the automated lane. In some embodiments, a lane marking comprising a solid line indicates that the lane may not be accessed by human-driven vehicles.

In some embodiments, the road design and traffic control system is configured to provide human-driven lanes for use by human-driven vehicles and/or AVs in human-driven mode.

In some embodiments, the overtaking component is configured to provide overtaking methods comprising using an adjacent same direction lane, an adjacent opposite direction lane, an emergency lane, a shared full passing lane, and/or a half passing lane.

In some embodiments, the emergency management subsystem is configured to dispatch emergency vehicles; confirm the existence of an emergency; respond to an emergency; and/or clear responding, patrol and/or emergency vehicles from the emergency site. In some embodiments, the emergency management subsystem is configured to provide emergency management and roadside assistance on automated lanes. In some embodiments, the emergency management subsystem is configured to perform methods for emergency management and roadside assistance, the methods comprising dispatching emergency vehicles; confirming the existence of an emergency; responding to an emergency; and/or clearing responding, patrol, and/or emergency vehicles from the emergency site. In some embodiments, dispatching emergency vehicles comprises receiving a notification at a TOC of accident occurrence or detecting an accident occurrence by a TOC; and sending responding vehicles to an accident site by a TOC. In some embodiments, dispatching emergency vehicles comprises sending instructions to respond to an accident to patrol vehicles from a TOC. In some embodiments, confirming the existence of an emergency comprises identifying the severity level of an accident by a responding vehicle and/or a patrol vehicle. In some embodiments, responding to an emergency comprises identifying the severity level of an emergency as a minor incident or a major incident; and performing a minor incident response if the emergency is identified as a minor incident or performing a major incident response if the emergency is identified as a major incident, wherein the minor incident response comprises setting road blocks and/or dynamic barriers by a responding vehicle and/or a patrol vehicle to identify the site of the emergency; and sending detour control instructions to AVs from CAVH system RSUs and sending detour information to human-driven vehicles from the CAVH system; and wherein the major incident response comprises dispatching rescue vehicles to the site of the emergency; setting road blocks and/or dynamic barriers by a responding vehicle and/or a patrol vehicle to identify the site of the emergency; and sending detour control instructions to AVs from CAVH system RSUs and sending detour information to human-driven vehicles from the CAVH system.

In some embodiments, clearing responding, patrol, and/or emergency vehicles from the emergency site comprises identifying the severity level of an emergency as a minor incident or a major incident; and performing a minor incident clearance if the emergency is identified as a minor incident or performing a major incident clearance if the emergency is identified as a major incident, wherein the minor incident clearance comprises removing road blocks and/or dynamic barriers from the site of the emergency; and moving a responding and/or patrol vehicle from the emergency site; and wherein the major incident clearance comprises sending control instructions to AVs from CAVH system RSUs to clear an exit route for rescue vehicles; moving a rescue vehicle from the emergency site; removing road blocks and/or dynamic barriers from the site of the emergency; and moving a responding and/or patrol vehicle from the emergency site.

In some embodiments, the road design and traffic control system comprises an emergency management subsystem that is configured to perform traffic control methods comprising identifying the site of an emergency as being in an automated lane or in a human-driven lane; performing automated lane emergency traffic control if the site of the emergency is an automated lane and performing human-driven lane emergency traffic control if the site of the emergency is a human driven lane, wherein the automated lane emergency traffic control comprises setting road blocks and/or dynamic barriers by a responding vehicle and/or a patrol vehicle to identify the site of the emergency; and sending control instructions to AVs upstream of the site of the emergency from CAVH RSUs to switch modes from automated mode to human-driven mode and move to a human-driven lane; and wherein the human driven lane emergency traffic control comprises providing road signs and/or information to instruct vehicles upstream of the site of the emergency to move from the lane comprising the emergency and/or to avoid using an automated lane.

In some embodiments, the emergency management subsystem is configured to perform responding vehicle guidance methods comprising identifying the site of an emergency as being in an automated lane or in a human-driven lane; performing automated lane responding vehicle guidance if the site of the emergency is an automated lane and performing human driven lane responding vehicle guidance if the site of the emergency is a human-driven lane, wherein the automated lane responding vehicle guidance comprises setting road blocks and/or dynamic barriers by a responding vehicle and/or a patrol vehicle to identify the site of the emergency; and sending control instructions to AVs upstream of the site of the emergency from CAVH RSUs to switch modes from automated mode to human-driven mode and move to a human driven lane; and providing rescue vehicles to the site of the emergency using human-driven lanes, emergency lanes, and/or automated lanes; and wherein the human-driven lane responding vehicle guidance comprises providing road signs and/or information to instruct vehicles upstream of the site of the emergency to move from the lane comprising the emergency and/or to avoid using an automated lane; and providing rescue vehicles to the site of the emergency using human-driven lanes, emergency lanes, and/or automated lanes.

In some embodiments, the emergency management subsystem is configured to identify an optimal route for rescue vehicles to reach the site of an emergency and/or to identify an optimal route for rescue vehicles to leave the site of an emergency. In some embodiments, the emergency management subsystem is configured to provide control instructions to rescue vehicles for driving the optimal route to reach the site of an emergency and/or for driving the optimal route to leave the site of an emergency. In some embodiments, the control instructions comprise instructions for changing lanes from a first automated lane to a second automated lane, from an automated lane to a human-driven lane, and/or from a human-driven lane to an automated lane.

In some embodiments, the emergency management subsystem is configured to control traffic and provide access to a site of an emergency according to a method comprising identifying the site of an emergency as an automated lane or a human-driven lane; identifying the rescue route as from a first automated lane to a second automated lane, from an automated lane to a human-driven lane, or from a human-driven lane to an automated lane; and perform a first traffic control and rescue access method if the emergency is on an automated lane and the rescue route is from a first automated lane to a second automated lane, perform a second traffic control and rescue access method if the emergency is on human-driven lane and the rescue route is from an automated lane to a human-driven lane, and perform a third traffic control and rescue access method if the emergency is on an automated lane and the rescue route is from a human-driven lane to an automated lane, wherein the first traffic control and rescue access method comprises setting road blocks and/or dynamic barriers to identify the site of the emergency; sending control instructions to AVs upstream of the site of the emergency from CAVH RSUs to switch modes from automated mode to human-driven mode and move to a human-driven emergency lane or contraflow automated lane; and guiding rescue vehicles to access the emergency using a human-driven emergency lane or contraflow automated lane; wherein the second traffic control and rescue access method comprises providing road signs and/or information to instruct vehicles upstream of the site of the emergency to move from the lane comprising the emergency and/or to avoid using an automated lane; and guiding rescue vehicles to access the emergency using an automated lane; wherein the third traffic control and rescue access method comprises setting road blocks and/or dynamic barriers to identify the site of the emergency; sending control instructions to AVs upstream of the site of the emergency from CAVH RSUs to switch modes from automated mode to human-driven mode and move to a human-driven lane; and guiding rescue vehicles to access the emergency using a human-driven emergency lane or contraflow automated lane.

In some embodiments, the lane management subsystem is configured to manage dedicated lanes for automated vehicles on major roads and minor roads; and is configured to manage vehicles, buffer zones, mode switching zones, waiting zones, waiting/switching zones, CAVH signalized intersections, direction switching zones, and/or vehicle classification. In some embodiments, the major road is a two-way highway and/or the minor road is a secondary expressway. In some embodiments, major roads comprise automated and human-driven lanes and/or wherein minor roads comprise automated and human-driven lanes. In some embodiments, vehicles are AVs and/or human-driven vehicles. In some embodiments, AVs have an automated mode and a human-driven mode. In some embodiments, a buffer zone is a CAVH road segment comprising at least a portion of an automated lane and at least a portion of a human-driven lane and is provided for vehicles to accelerate and/or decelerate. In some embodiments, a mode switching zone is an automated mode to human-driven mode switching zone or is a human-driven mode to automated mode switching zone. In some embodiments, a waiting zone is used for vehicles to wait for a passing signal. In some embodiments, a waiting/switching zone is used for vehicles to wait for a passing signal and/or for mode switching. In some embodiments, a direction switching zone is provided on a human-driven lane prior to a traffic light to indicate to drivers to switch directions. In some embodiments, a CAVH signalized intersection is an intersection of a human-driven lane and an automated lane. In some embodiments, the road design and traffic control system is configured to perform a method for mode switching comprising switching an AV from human-driven mode to automated mode or switching an AV from automated mode to human-driven mode. In some embodiments, vehicle classification is provided by the CAVH system for vehicles on an automated lane.

In some embodiments, the road design and traffic control system is configured to perform CAVH signalized intersection methods comprising guiding human-driven vehicles and controlling AVs to cross an intersection. In some embodiments, the road design and traffic control system is configured to perform CAVH signalized intersection methods comprising mode switching an AV from human-driven mode to automated mode for an AV moving from a human-driven lane to an automated lane and/or switching an AV from automated mode to human-driven mode for an AV moving from an automated lane to a human-driven lane. In some embodiments, the lane management subsystem comprises a lane designation and switching module configured to manage designating lanes as automated lanes or human driven lanes; and to manage switching lanes from automated lanes to human-driven lanes or from human-driven lanes to automated lanes. In some embodiments, the lane management subsystem comprises a merging and diverging module configured to manage merging of vehicles into lanes and diverging of vehicles from lanes. In some embodiments, the lane management subsystem comprises a signalized intersection module configured to control traffic on automated lanes and/or human-driven lanes that meet at a signalized intersection. In some embodiments, the lane management subsystem is configured to perform traffic signal optimization at an intersection. For example, in some embodiments, methods comprise collecting location, velocity, and acceleration information for vehicles by RSUs sensing location, velocity, and acceleration of the vehicles and/or obtaining the vehicle location, velocity, and acceleration from vehicle OBUs; forming platoons of AVs wherein the space between AVs in a platoon is smaller than the space between AVs in different platoons; determining an optimal traffic signal state at an intersection by a TOC using the location, velocity, and acceleration of AV platoons; and providing a traffic signal state to optimize traffic flow of platoons of AVs on automated lanes through the intersection. In some embodiments, the traffic signal controls traffic on human-driven lanes. In some embodiments, the traffic signal controls traffic on roads that cross the automated lanes comprising platoons of AVs. In some embodiments, traffic on the automated lanes does not pass through the intersection when the traffic signal is green; the green light begins when the last vehicle of a platoon completely crosses the intersection; and the green light ends at least n seconds (e.g., at least 3 seconds (e.g., at least 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0 seconds or more)) before the first vehicle in a platoon reaches the intersection.

In some embodiments, the lane management subsystem is configured to manage an automated lane that is an inner lane of a main road, an automated lane that is an outer lane of a main road, an automated lane that is an inner lane of an auxiliary road, and/or an automated lane that is an outer lane of an auxiliary road. In some embodiments, the lane management subsystem is configured to manage vehicles at an intersection by performing a method comprising providing a direction switching zone for human-driven vehicles; providing a waiting zone for human-driven vehicles to slow and/or stop until a signal is green; and providing a lane for the human-driven vehicles to move to when the signal is green. In some embodiments, the lane management subsystem is configured to manage vehicles at an intersection by performing a method comprising controlling AVs in automated dedicated lanes to pass through the intersection in their platoon and enter an automated lane. In some embodiments, the lane management subsystem is configured to manage vehicles at an intersection by performing a method comprising providing a waiting/switching zone for human-driven vehicles to slow and/or stop until a signal is green; and providing a lane for the human-driven vehicles to move to when the signal is green. In some embodiments, the lane management subsystem is configured to manage vehicles at an intersection by performing a method comprising decelerating an AV in human-driving mode in a mode switching zone; sending a request from the AV to the CAVH system to switch from human-driven mode to automated mode; and controlling the AV by the CAVH system to move through the intersection if the signal light is green. In some embodiments, the lane management subsystem is configured to manage vehicles at an intersection by performing a method further comprising merging the AV into an automated lane after passing through the intersection; updating the CAVH system state; grouping AVs into platoons; and optimizing signal timing by a TOC. In some embodiments, the lane management subsystem is configured to manage vehicles at an intersection by performing a method comprising providing a direction switching zone for human-driven vehicles; providing a waiting zone for human-driven vehicles to decelerate and/or stop; providing a traffic signal to control flow of human-driven vehicles through the intersection and into a human-driven lane. In some embodiments, the road design and traffic control system comprises traffic guidance signs and/or signals indicating where the human-driven vehicle enters the human-driven lane. decelerating an AV in a mode switching zone; sending a request from the AV to the CAVH system to switch from automated mode to human-driven mode; providing a driver of the AV with control of the AV to provide human-driven control of the AV; and moving the human-driven AV to a human-driven lane. In some embodiments, the lane management subsystem is configured to manage vehicles at an intersection by performing a method further comprising updating the CAVH system state; grouping AVs into platoons; and optimizing signal timing by a TOC.

In some embodiments, the technology provides a method for managing vehicle modes; vehicle mode switching; vehicle merging, diverging, and/or overtaking; emergency response and roadside assistance, and/or automated lanes. For example, in some embodiments, methods comprise providing a road design and traffic control system as described herein. In some embodiments, the technology provides use of a road design and traffic control system as described herein. For example, in some embodiments, the technology provides use of a road design and traffic control system as described herein to manage vehicle modes; vehicle mode switching; vehicle merging, diverging, and/or overtaking; emergency response and roadside assistance, and/or automated lanes.

Additional embodiments will be apparent to persons skilled in the relevant art based on the teachings contained herein.

Outer lane of the minor road; 504: CAVH dedicated lane from minor to major road; 505: Ramp to the human driving road; 506: Mode switching zone; 507: Buffer zone; 508: AV in human-driven mode; 509: AV in human-driven mode; 510: AV in automated mode; 511: AV in human-driven mode.

Figure 6:
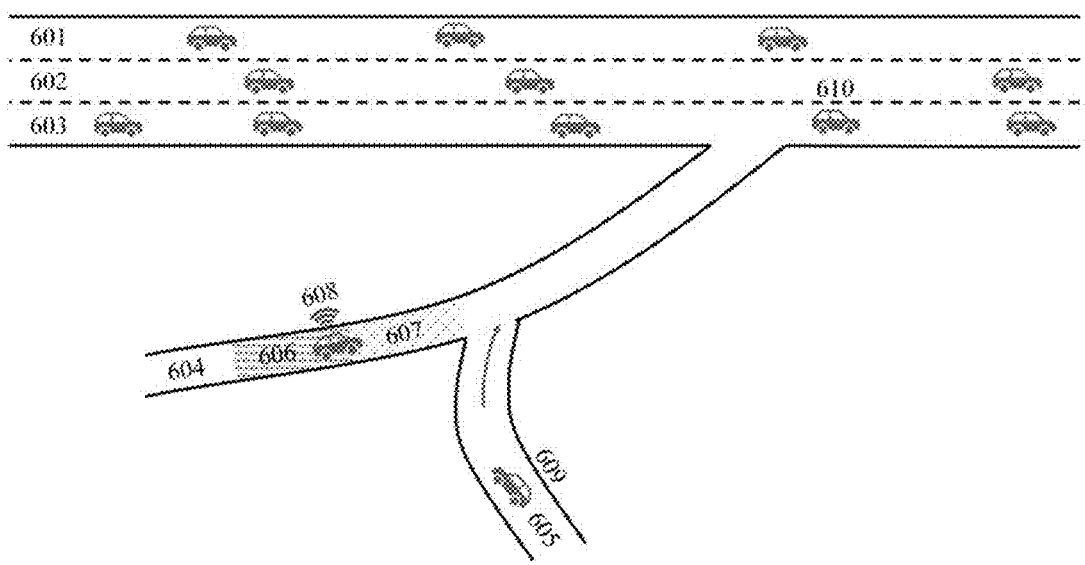

FIG. 6 is a schematic drawing showing a Type 1 off-ramp lane design for AVs exiting a CAVH dedicated lane (e.g., to move from a major road to a minor road). 601: Inner lane of the minor road; 602: Middle lane of the minor road; 603: Outer lane of the minor road; 604: CAVH dedicated lane from the major to the minor road; 605: Ramp from the human driving road; 606: Buffer zone; 607: Mode switching zone; 608: AV in automated mode; 609: AV in human-driven mode; 610: AV in human-driven mode.

Figure 7:
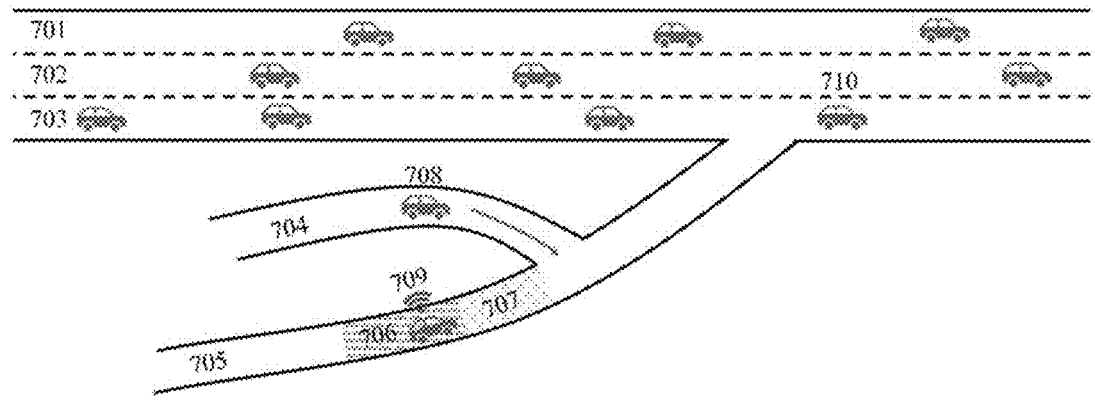

FIG. 7 is a schematic drawing showing a Type 2 off-ramp lane design for AV exiting a CAVH dedicated lane (e.g., to move from a major road to a minor road). 701: Inner lane of the minor road; 702: Middle lane of the minor road; 703: Outer lane of the minor road; 704: Ramp from the human driving road; 705: CAVH dedicated lane from the major to the minor road; 706: Buffer zone; 707: Mode switching zone; 708: AV in human-driven mode; 709: AV in automated mode; 710: AV in human-driven mode.

Figure 8:
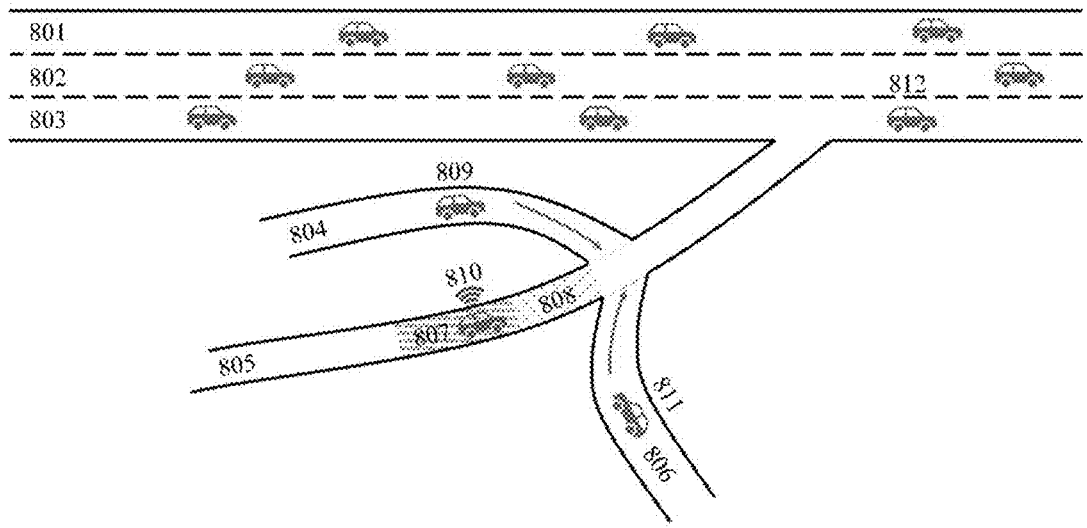

FIG. 8 is a schematic drawing showing a Type 3 off-ramp lane design for AV exiting a CAVH dedicated lane (e.g., to move from a major road to a minor road). 801: Inner lane of the minor road; 802: Middle lane of the minor road; 803: Outer lane of the minor road; 804: Ramp from the human driving road; 805: Inner CAVH dedicated lane from major to minor road; 806: Ramp from the human driving road; 807: Buffer zone; 808: Mode switching zone; 809: AV in human-driven mode; 810: AV in automated mode; 811: AV in human-driven mode; 812: AV in human-driven mode.

Figure 9:
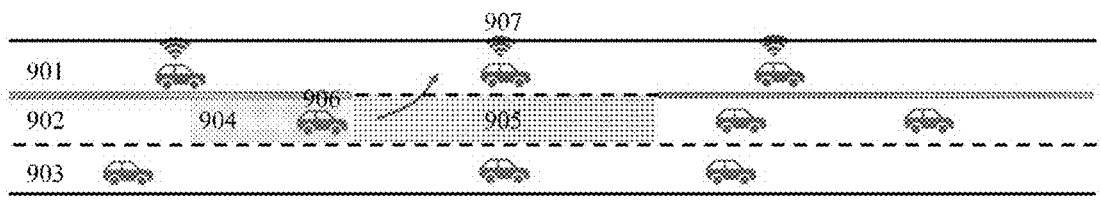

FIG. 9 is a schematic drawing of a Type 1 road design, system, and methods for entry of an AV into an automated lane for a multi-lane (e.g., two-way multi-lane) highway in which the automated lane is the inner lane (e.g., three lanes in each direction and the innermost lane is an automated lane). A lane adjacent to the automated lane comprises a mode switching zone and a buffer zone. 901: Automated lane; 902: Human driving lane; 903: Human driving lane; 904: Mode switching zone; 905: Buffer zone; 906: AV in human-driven mode; 907: AV in automated mode.

Figure 10:
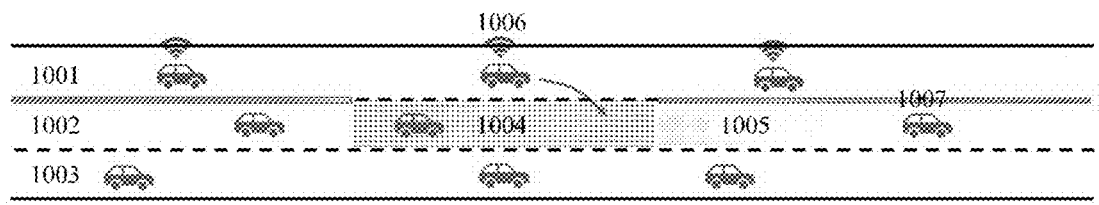

FIG. 10 is a schematic drawing of a Type 1 road design, system, and methods for exit of an AV from an automated lane of a multi-lane (e.g., two-way multi-lane) highway in which the automated lane is the inner lane (e.g., three lanes in each direction and the innermost lane is an automated lane). A lane adjacent to the automated lane comprises a mode switching zone and a buffer zone. 1001: Automated lane; 1002: Human driving lane; 1003: Human driving lane; 1004: Buffer zone; 1005: Mode switching zone; 1006: AV in automated mode; 1007: AV in human-driven mode.

Figure 11:
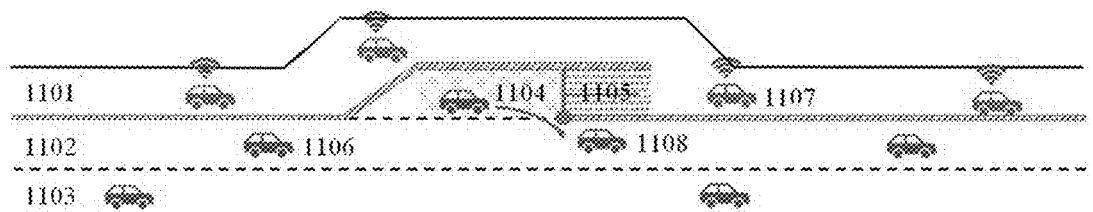

FIG. 11 is a schematic drawing of a Type 2 road design, system, and methods for entry of an AV into an automated lane for a multi-lane (e.g., two-way multi-lane) highway in which the automated lane is the inner lane (e.g., three lanes in each direction and the innermost lane is an automated lane). 1101: Automated lane; 1102: Human driving lane; 1103: Human driving lane; 1104: Mode switching zone; 1105: Buffer zone; 1106: AV in human-driven mode; 1107: AV in automated mode; 1107: AV in human-driven mode.

Figure 12:
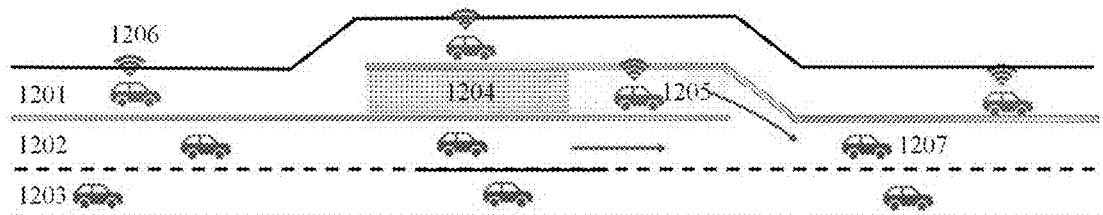

FIG. 12 is a schematic drawing of a Type 2 road design, system, and methods for exit of an AV from an automated lane for a multi-lane (e.g., two-way multi-lane) highway in which the automated lane is the inner lane (e.g., three lanes in each direction and the innermost lane is an automated lane). 1201: Automated lane; 1202: Human driving lane; 1203: Human driving lane; 1204: Buffer zone; 1205: Mode switching zone; 1206: AV in automated mode; 1207: AV in human-driven mode.

Figure 13:
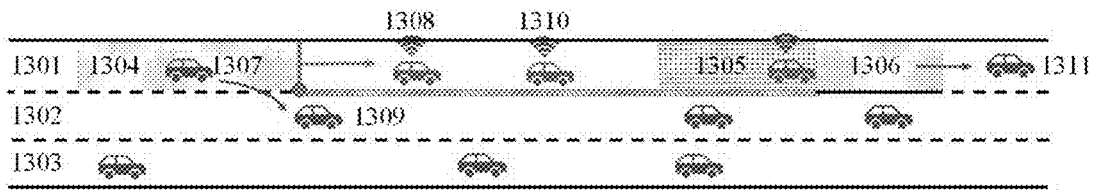

FIG. 13 is a schematic drawing of a Type 3 road design, system, and methods for exit of an AV from an automated lane and entry of an AV into an automated lane for a multi-lane (e.g., two-way multi-lane) highway in which the automated lane is the inner lane (e.g., three lanes in each direction and the innermost lane is an automated lane). 1301: Mixed and/or partially automated and partially human driving lane; 1302: Human driving lane; 1303: Human driving lane; 1304: Mode switching zone; 1305: Buffer zone; 1306: Mode switching zone; 1307: AV in human-driven mode; 1308: AV in automated mode; 1309: AV in human-driven mode; 1310: AV in automated mode; 1311: AV in human-driven mode.

Figure 14:
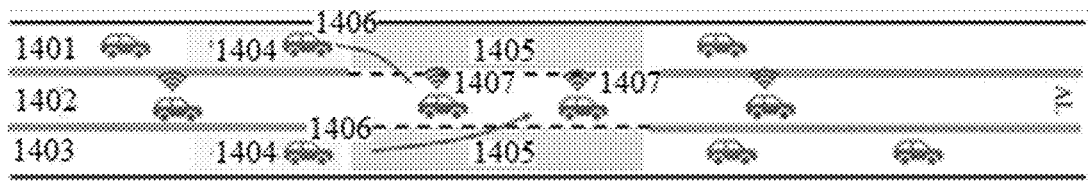

FIG. 14 is a schematic drawing of a Type 1 road design, system, and methods for entry of an AV into an automated lane for a multi-lane (e.g., two-way multi-lane) highway in which the automated lane is a middle lane (e.g., three lanes in each direction and the middle lane is an automated lane). One or both lanes adjacent to the automated lane comprise(s) a mode switching zone and a buffer zone. 1401: Human driving lane; 1402: Automated lane; 1403: Human driving lane; 1404: Mode switching zone; 1405: Buffer zone; 1406: AV in human-driven mode; 1407: AV in automated mode.

Figure 15:
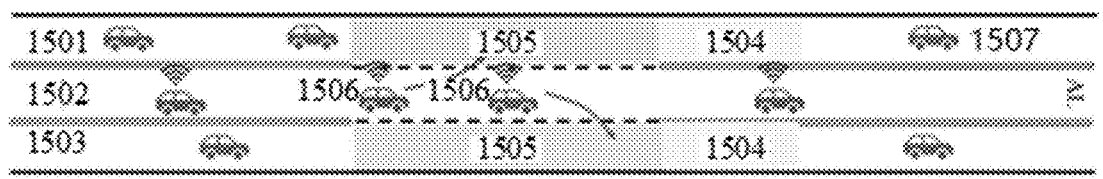

FIG. 15 is a schematic drawing of a Type 1 road design, system, and methods for exit of an AV from an automated lane for a multi-lane (e.g., two-way multi-lane) highway in which the automated lane is a middle lane (e.g., three lanes in each direction and the middle lane is an automated lane). One or both lanes adjacent to the automated lane comprise(s) a mode switching zone and a buffer zone. 1501: Human driving lane; 1502: Automated lane; 1503: Human driving lane; 1504: Mode switching zone; 1505: Buffer zone; 1506: AV in automated mode; 1507: AV in human-driven mode.

Figure 16:
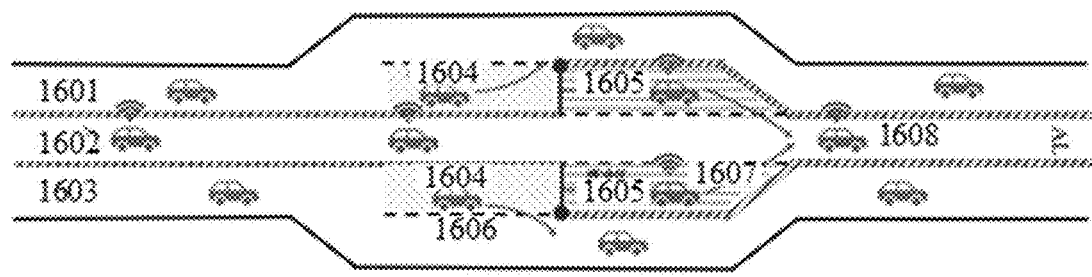

FIG. 16 is a schematic drawing of a Type 2 road design, system, and methods for entry of an AV into an automated lane for a multi-lane (e.g., two-way multi-lane) highway in which the automated lane is a middle lane (e.g., three lanes in each direction and the middle lane is an automated lane). 1601: Human driving lane; 1602: Automated lane; 1603: Human driving lane; 1604: Mode switching zone; 1605: Buffer zone; 1606: AV in human-driven mode; 1607: AV in automated mode; 1608: AV in automated mode.

Figure 17:
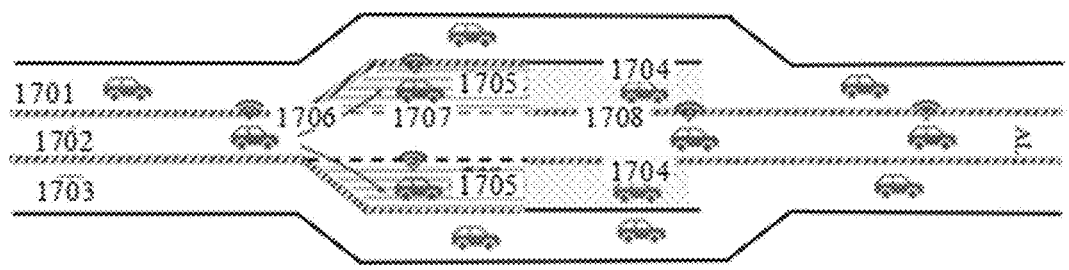

FIG. 17 is a schematic drawing of a Type 2 road design, system, and methods for exit of an AV from an automated lane for a multi-lane (e.g., two-way multi-lane) highway in which the automated lane is a middle lane (e.g., three lanes in each direction and the middle lane is an automated lane). 1701: Human driving lane; 1702: Automated lane; 1703: Human driving lane; 1704: Mode switching zone; 1705: Buffer zone; 1706: AV in automated mode; 1707: AV in automated mode; 1708: AV in human-driven mode.

Figure 18:
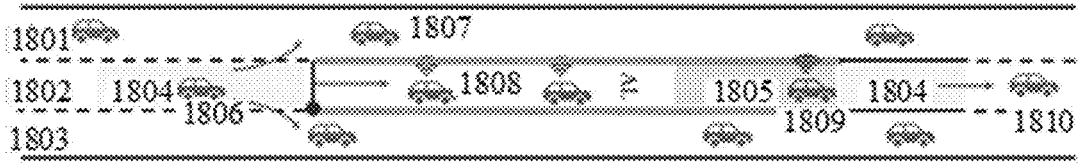

FIG. 18 is a schematic drawing of a Type 3 road design, system, and methods for exit of an AV from an automated lane and entry of an AV into an automated lane for a multi-lane (e.g., two-way multi-lane) highway in which the automated lane is a middle lane (e.g., three lanes in each direction and the middle lane is an automated lane). 1801: Human driving lane; 1802: Mixed and/or partially automated and partially human driving lane; 1803: Human driving lane; 1804: Mode switching zone; 1805: Buffer zone; 1806: AV in human-driven mode; 1807: AV in human-driven mode; 1808: AV in automated mode; 1809: AV in automated mode; 1810: AV in human-driven mode.

Figure 19:
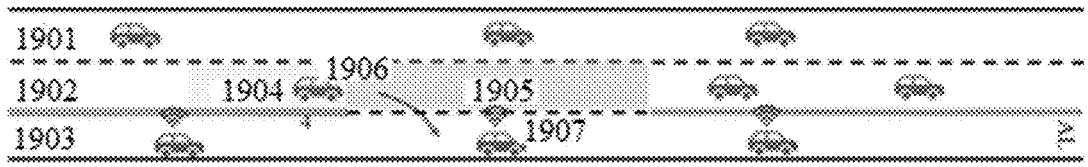

FIG. 19 is a schematic drawing of a Type 1 road design, system, and methods for entry of an AV into an automated lane for a multi-lane (e.g., two-way multi-lane) highway in which the automated lane is the outer lane (e.g., three lanes in each direction and the outermost lane is an automated lane). A lane adjacent to the automated lane comprises a mode switching zone and a buffer zone. 1901: Human driving lane; 1902: Human driving lane; 1903: Automated lane; 1904: Mode switching zone; 1905: Buffer zone; 1906: AV in human-driven mode; 1907: AV in automated mode.

Figure 20:
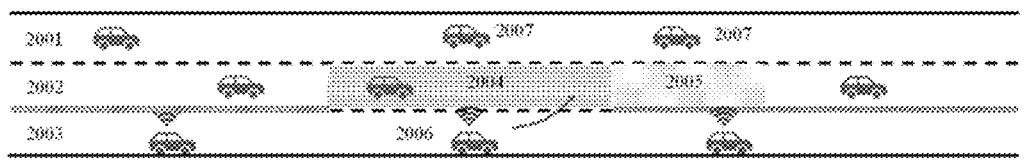

FIG. 20 is a schematic drawing of a Type 1 road design, system, and methods for exit of an AV from an automated lane for a multi-lane (e.g., two-way multi-lane) highway in which the automated lane is the outer lane (e.g., three lanes in each direction and the outermost lane is an automated lane). A lane adjacent to the automated lane comprises a mode switching zone and a buffer zone. 2001: human-driven Lane; 2002: human-driven Lane; 2003: Automated-driven Lane; 2004: Buffer Zone; 2005: Mode Switching Zone; 2006: AV in Automated Mode; 2007: AV in human-driven Mode.

Figure 21:
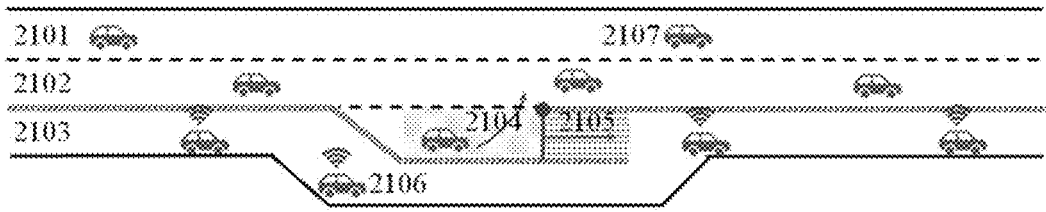

FIG. 21 is a schematic drawing of a Type 2 road design, system, and methods for entry of an AV into an automated lane for a multi-lane (e.g., two-way multi-lane) highway in which the automated lane is the outer lane (e.g., three lanes in each direction and the outermost lane is an automated lane). 2101: human-driven Lane; 2102: human-driven Lane; 2103: Automated-driven Lane; 2104: Buffer Zone; 2105: Mode Switching Zone; 2106: AV in Automated Mode; 2107: AV in human-driven Mode.

Figure 22:
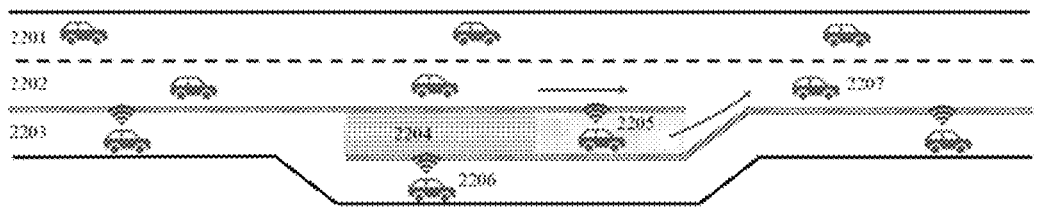

FIG. 22 is a schematic drawing of a Type 2 road design, system, and methods for exit of an AV from an automated lane for a multi-lane (e.g., two-way multi-lane) highway in which the automated lane is the outer lane (e.g., three lanes in each direction and the outermost lane is an automated lane). 2201: human-driven Lane; 2202: human-driven Lane; 2203: Automated-driven Lane; 2204: Buffer Zone; 2205: Mode Switching Zone; 2206: AV in Automated Mode; 2207: AV in human-driven Mode.

Figure 23:
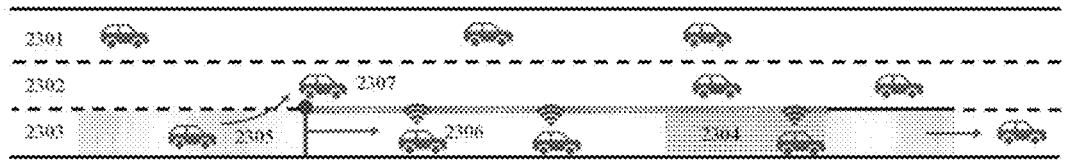

FIG. 23 is a schematic drawing of a Type 3 road design, system, and methods for exit of an AV from an automated lane and entry of an AV into an automated lane for a multi-lane (e.g., two-way multi-lane) highway in which the automated lane is the outer lane (e.g., three lanes in each direction and the outermost lane is an automated lane). 2301: human-driven Lane; 2302: Human-driven Lane; 2303: Automated-driven Lane; 2304: Buffer Zone; 2305: Mode Switching Zone; 2306: AV in Automated Mode; 2307: AV in Human-driven Mode.

Figure 24:
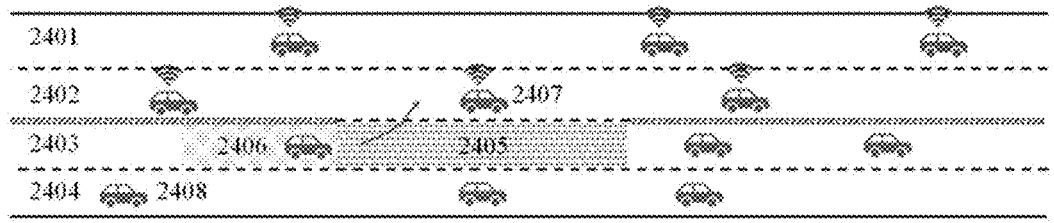

FIG. 24 is a schematic drawing of a Type 1 road design, system, and methods for entry of an AV into an automated lane for a multi-lane (e.g., two-way multi-lane) highway having multiple automated inner lanes (e.g., four lanes in each direction and the two innermost lanes are automated lanes). 2401: Automated-driven Lane; 2402: Automated-driven Lane; 2403: Human-driven Lane; 2404: Human-driven Lane; 2405: Buffer Zone; 2406: Mode Switching Zone; 2407: AV in Automated Mode; 2408: AV in Human-driven Mode.

Figure 25:
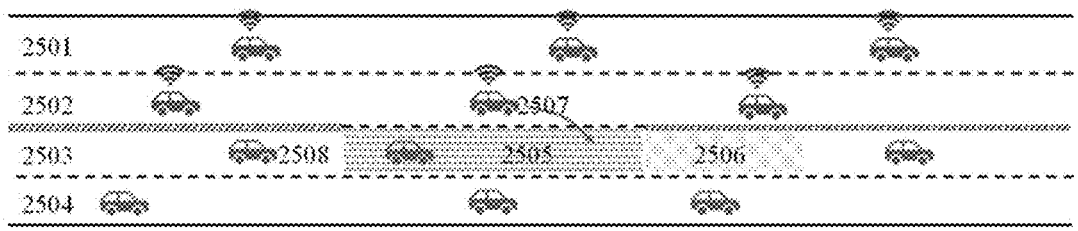

FIG. 25 is a schematic drawing of a Type 1 road design, system, and methods for exit of an AV from an automated lane for a multi-lane (e.g., two-way multi-lane) highway having multiple automated inner lanes (e.g., four lanes in each direction and the two innermost lanes are automated lanes). 2501: Automated-driven Lane; 2502: Automated-driven Lane; 2503: Human-driven Lane; 2504: Human-driven Lane; 2505: Buffer Zone; 2506: Mode Switching Zone; 2507: AV in Automated Mode; 2508: AV in Human-driven Mode.

Figure 26:
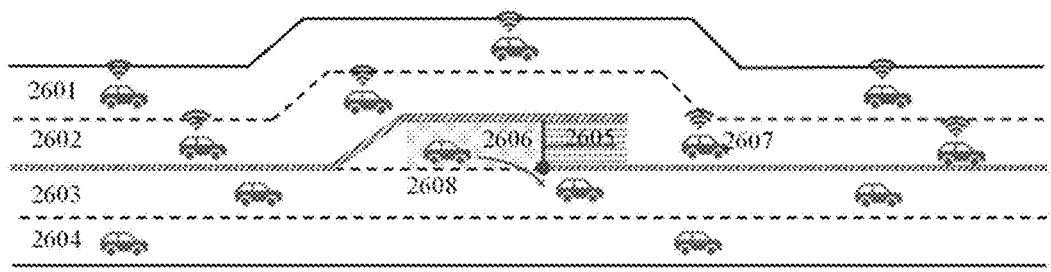

FIG. 26 is a schematic drawing of a Type 2 road design, system, and methods for entry of an AV into an automated lane for a multi-lane (e.g., two-way multi-lane) highway having multiple automated inner lanes (e.g., four lanes in each direction and the two innermost lanes are automated lanes). 2601: Automated-driven Lane; 2602: Automated-driven Lane; 2603: Human-driven Lane; 2604: Human-driven Lane; 2605: Buffer Zone; 2606: Mode Switching Zone; 2607: AV in Automated Mode; 2608: AV in Human-driven Mode.

Figure 27:
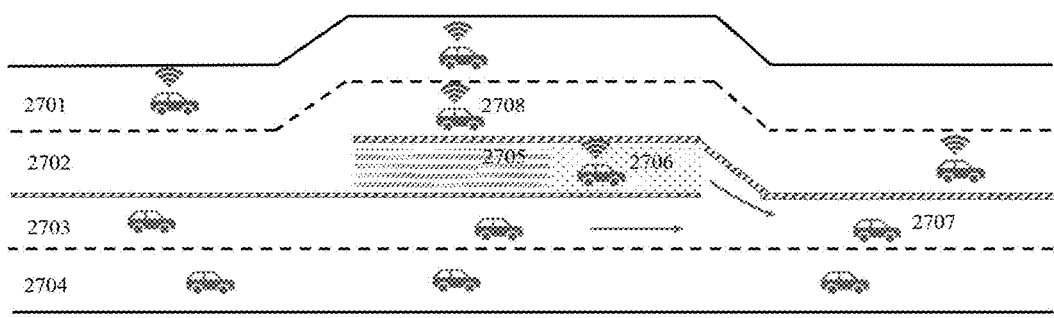

FIG. 27 is a schematic drawing of a Type 2 road design, system, and methods for exit of an AV from an automated lane for a multi-lane (e.g., two-way multi-lane) highway having multiple automated inner lanes (e.g., four lanes in each direction and the two innermost lanes are automated lanes). 2701: Automated-driven Lane; 2702: Automated-driven Lane; 2703: Human-driven Lane; 2704: Human-driven Lane; 2705: Buffer Zone; 2706: Mode Switching Zone; 2707: AV in Automated Mode; 2708: AV in Human-driven Mode.

Figure 28:
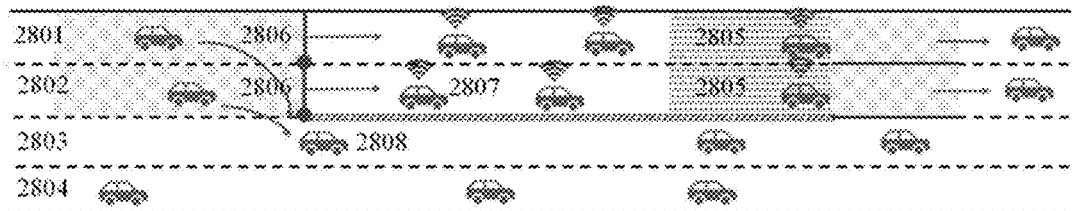

FIG. 28 is a schematic drawing of a Type 3 road design, system, and methods for exit of an AV from an automated lane and entry of an AV into an automated lane for a multi-lane (e.g., two-way multi-lane) highway having multiple automated inner lanes (e.g., four lanes in each direction and the two innermost lanes are automated lanes). 2801: Automated-driven Lane; 2802: Automated-driven Lane; 2803: Human-driven Lane; 2804: Human-driven Lane; 2805: Buffer Zone; 2806: Mode Switching Zone; 2807: AV in Automated Mode; 2808: AV in Human-driven Mode.

Figure 29:
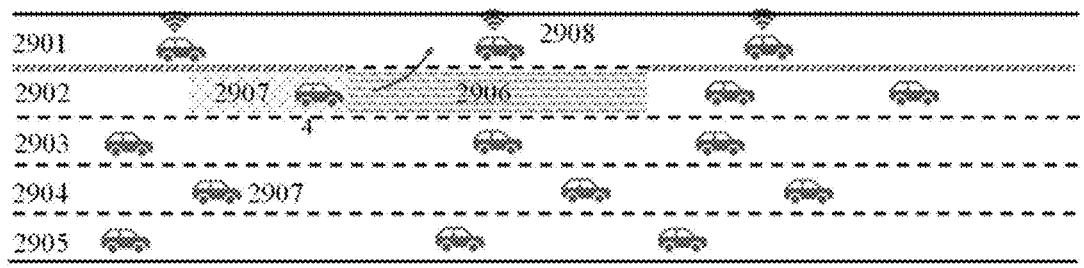

FIG. 29 is a schematic drawing of a Type 1 road design, system, and methods for entry of an AV into an automated lane for a multi-lane (e.g., two-way multi-lane) highway in which the inner lane is an automated lane (e.g., five lanes in each direction and the innermost lane is an automated lane). 2901: Automated-driven Lane; 2902: Human-driven Lane; 2903: Human-driven Lane; 2904: Human-driven Lane; 2905: Human-driven Lane; 2906: Buffer Zone; 2907: Mode Switching Zone; 2908: AV in Automated Mode; 2909: AV in Human-driven Mode.

Figure 30:
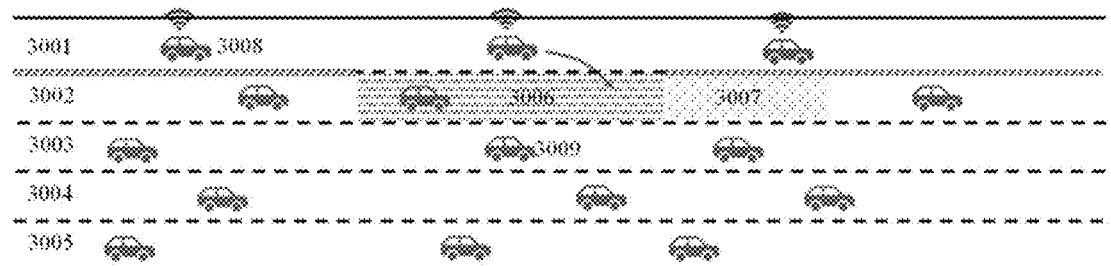

FIG. 30 is a schematic drawing of a Type 1 road design, system, and methods for exit of an AV from an automated lane for a multi-lane (e.g., two-way multi-lane) highway in which the inner lane is an automated lane (e.g., five lanes in each direction and the innermost lane is an automated lane). 3001: Automated-driven Lane; 3002: Human-driven Lane; 3003: Human-driven Lane; 3004: Human-driven Lane; 3005: Human-driven Lane; 3006: Buffer Zone; 3007: Mode Switching Zone; 3008: AV in Automated Mode; 3009: AV in Human-driven Mode.

Figure 31:
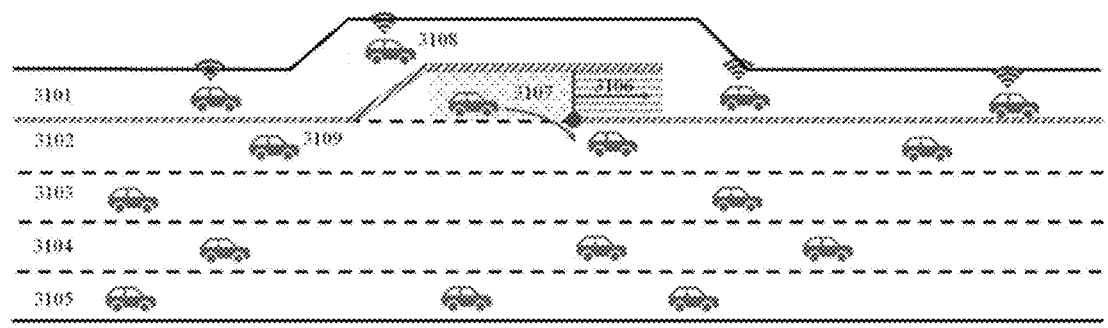

FIG. 31 is a schematic drawing of a Type 2 road design, system, and methods for entry of an AV into an automated lane for a multi-lane (e.g., two-way multi-lane) highway in which the inner lane is an automated lane (e.g., five lanes in each direction and the innermost lane is an automated lane). 3101: Automated-driven Lane; 3102: Human-driven Lane; 3103: Human-driven Lane; 3104: Human-driven Lane; 3105: Human-driven Lane; 3106: Buffer Zone; 3107: Mode Switching Zone; 3108: AV in Automated Mode; 3109: AV in Human-driven Mode.

Figure 32:
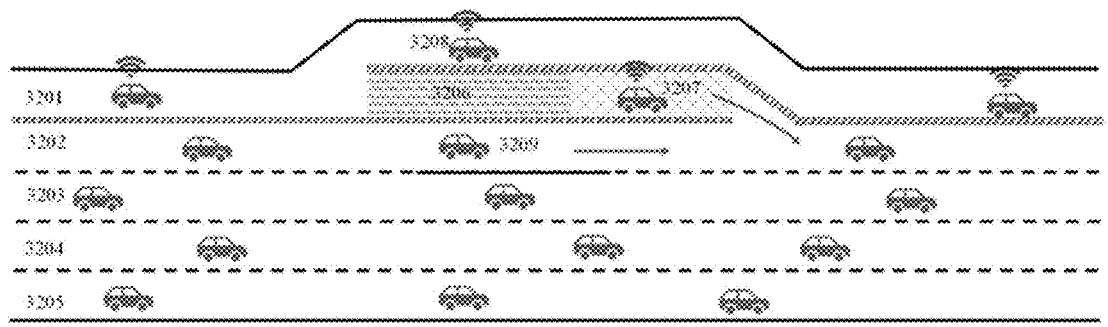

FIG. 32 is a schematic drawing of a Type 2 road design, system, and methods for exit of an AV from an automated lane for a multi-lane (e.g., two-way multi-lane) highway in which the inner lane is an automated lane (e.g., five lanes in each direction and the innermost lane is an automated lane). 3201: Automated-driven Lane; 3202: Human-driven Lane; 3203: Human-driven Lane; 3204: Human-driven Lane; 3205: Human-driven Lane; 3206: Buffer Zone; 3207: Mode Switching Zone; 3208: AV in Automated Mode; 3209: AV in Human-driven Mode.

Figure 33:
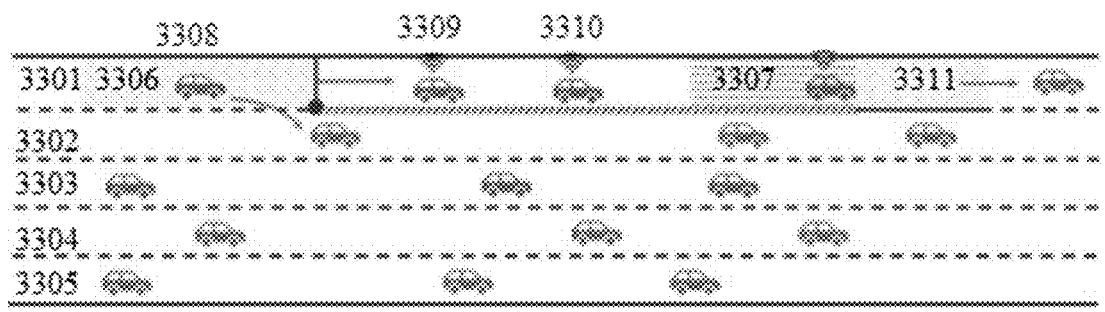

FIG. 33 is a schematic drawing of a Type 3 road design, system, and methods for exit of an AV from an automated lane and entry of an AV into an automated lane for a multi-lane (e.g., two-way multi-lane) highway in which the inner lane is an automated lane (e.g., five lanes in each direction and the innermost lane is an automated lane). 3301: Mixed and/or partially automated and partially human driving lane; 3302: Human driving lane; 3303: Human driving lane; 3304: Human driving lane; 3305: Human driving lane; 3306: Mode switching zone; 3307: Buffer zone; 3308: AV in human-driven mode; 3309: AV in automated mode; 3310: AV in automated mode; 3311: AV in human-driven mode.

Figure 34A:
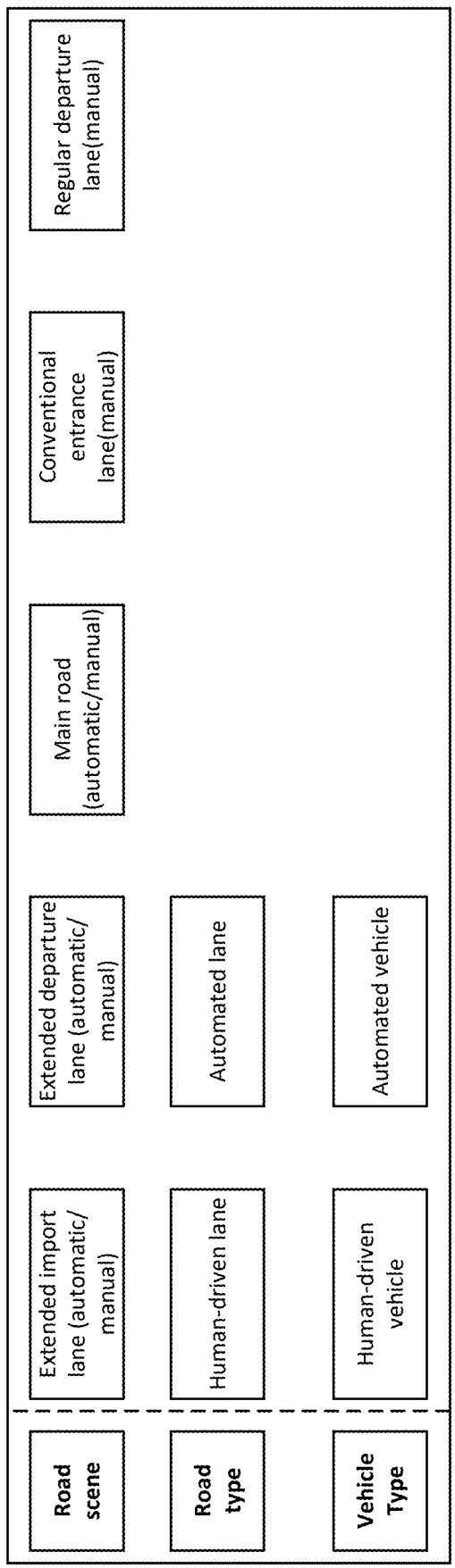
Figure 34B:
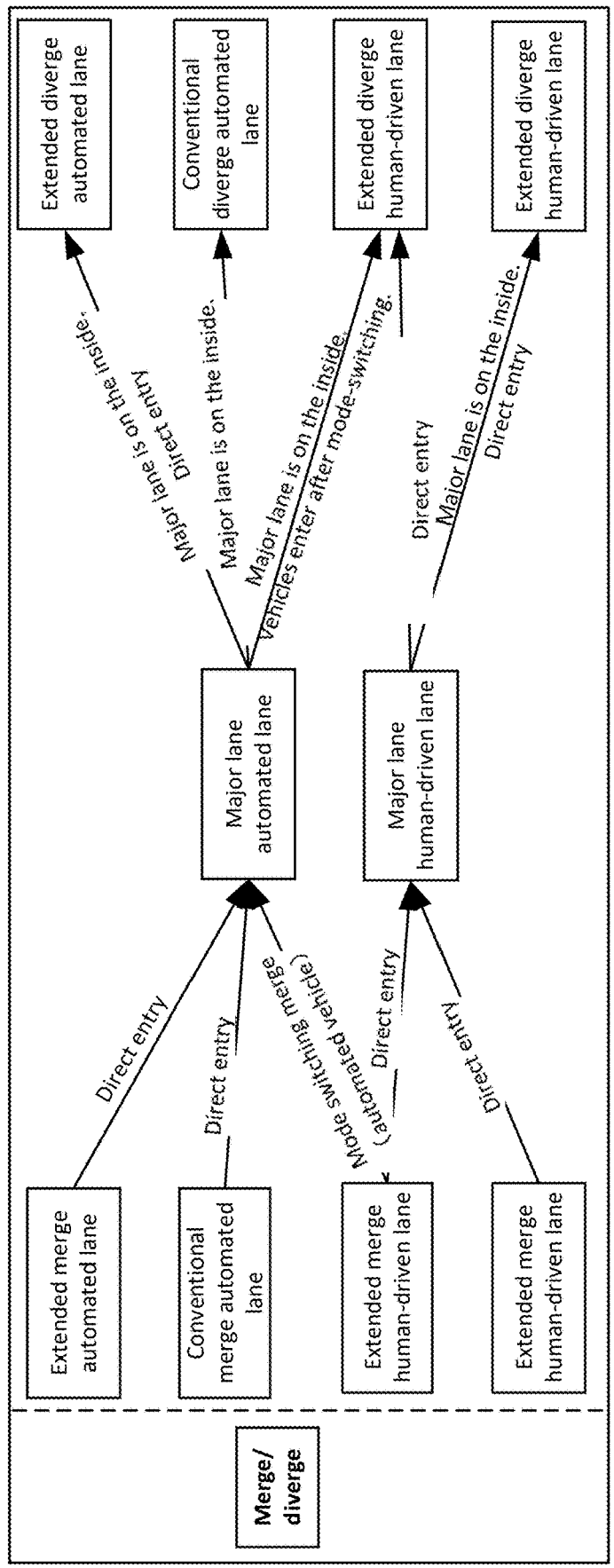
Figure 34C:
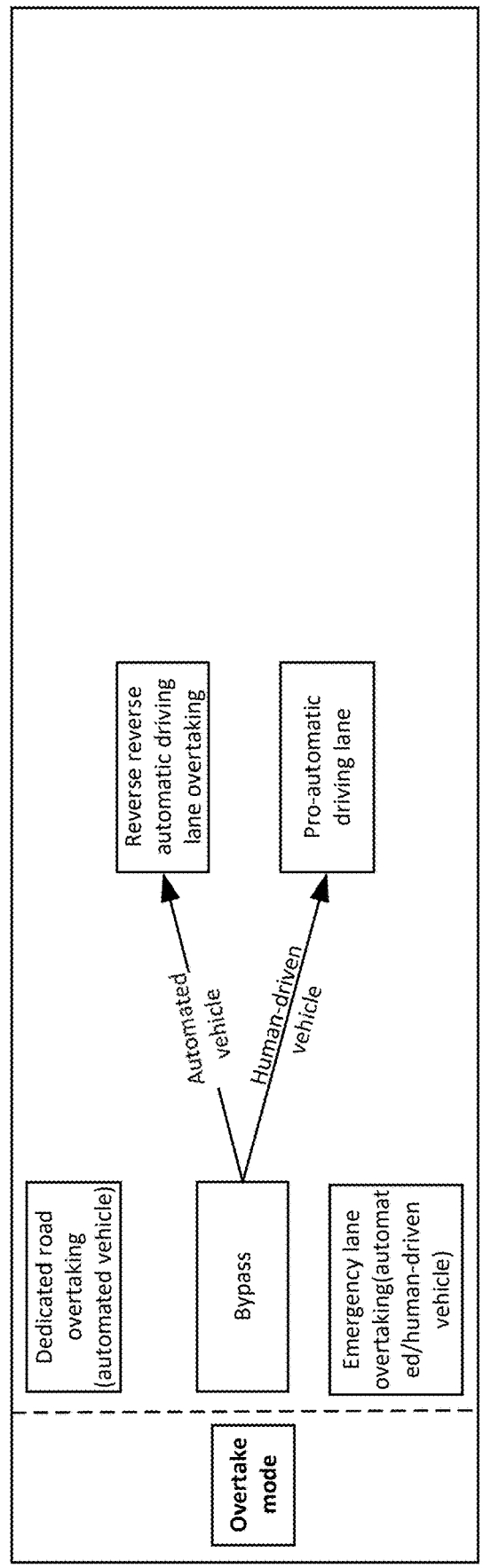

FIG. 34A-34C is a composition diagram showing a system for automated lane merging, lane diverging, and overtaking for a multi-lane (e.g., two-way multi-lane) highway.

Figure 35:
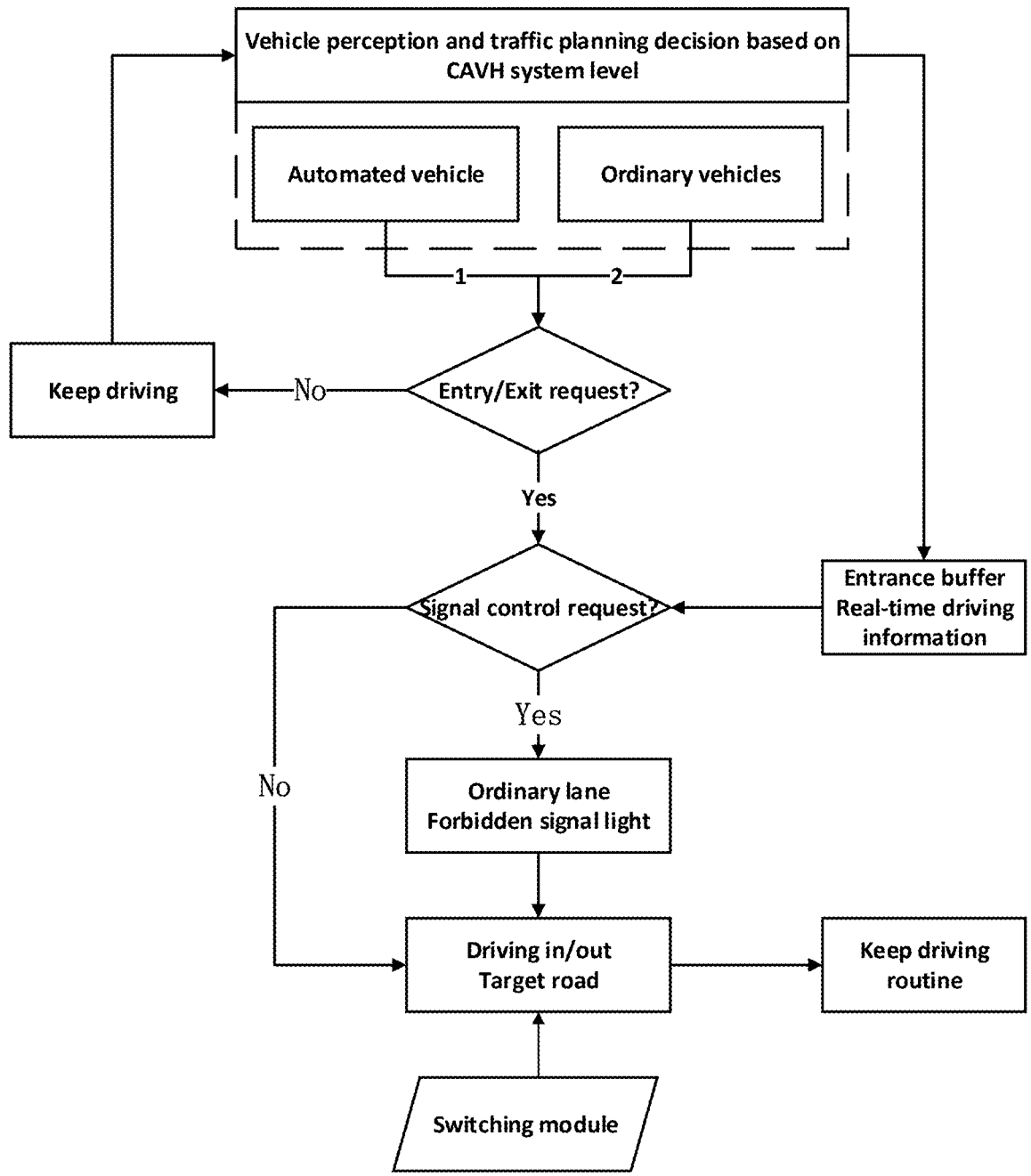

FIG. 35 is a flow chart showing a system for controlling automated merging and diverging.

Figure 36:
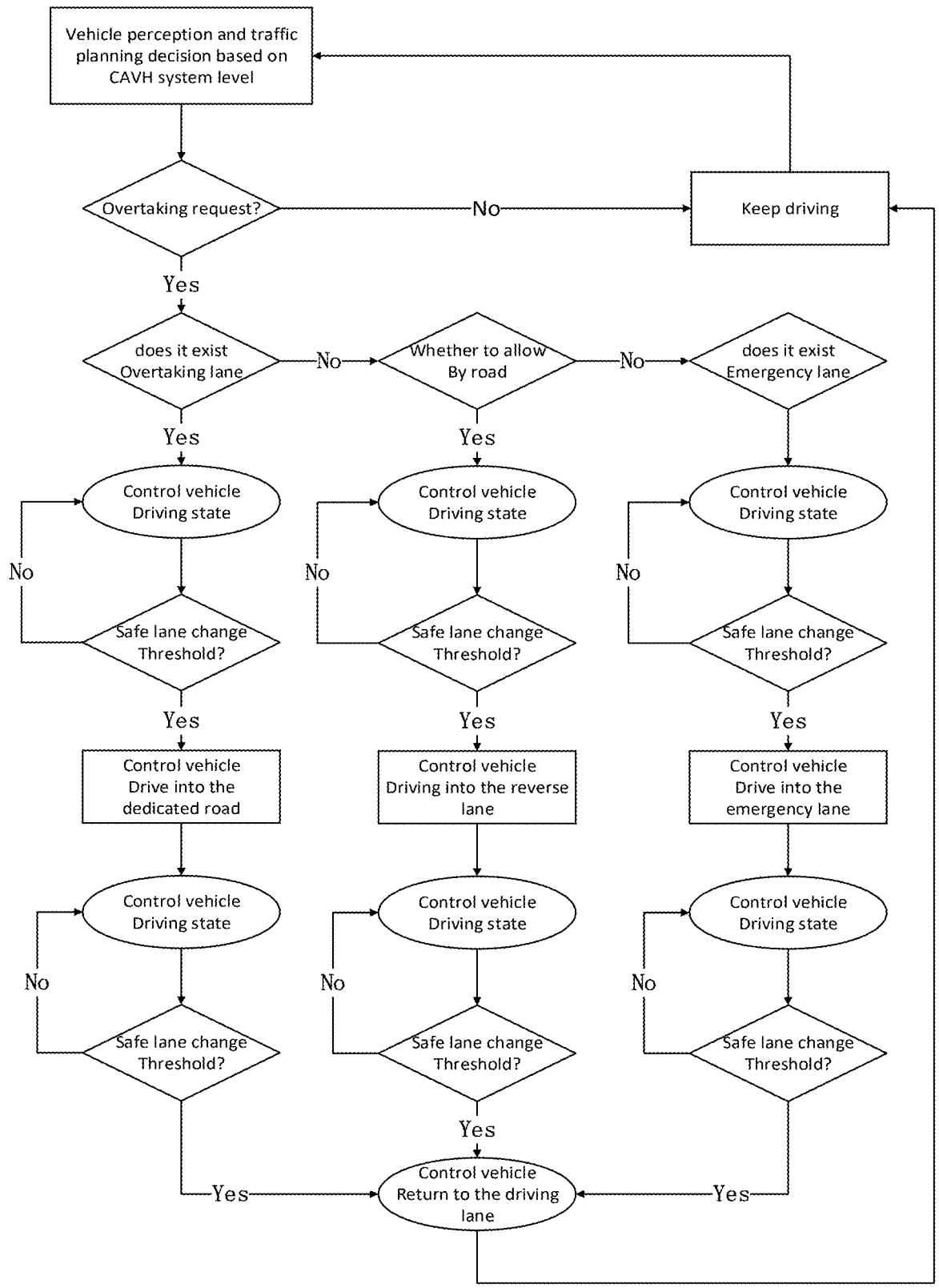

FIG. 36 is a flow chart showing a system for controlling overtaking in an automated lane.

Figure 37:
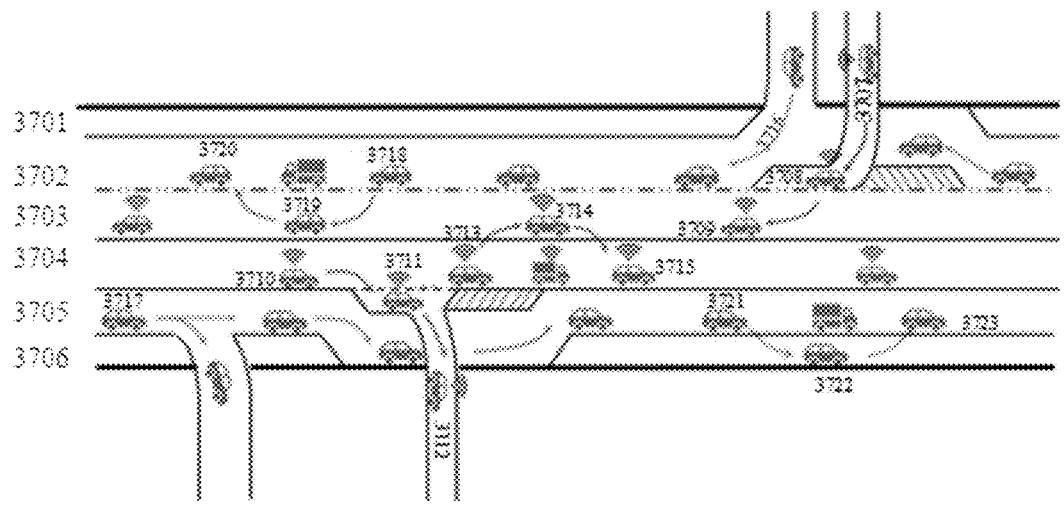

FIG. 37 is a schematic drawing of a mixed scene comprising vehicle merging, diverging, and overtaking for a multi-lane (e.g., two-way multi-lane) highway in which the innermost lanes (e.g., second and third lanes) are automated lanes.

Figure 38:
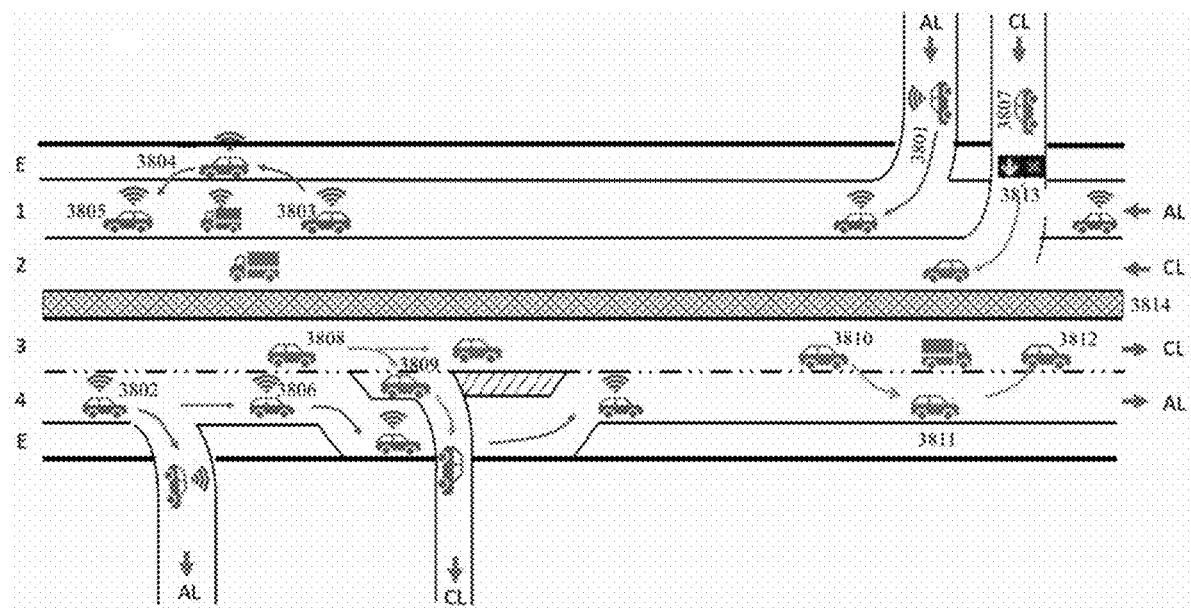

FIG. 38 is a schematic drawing of a mixed scene comprising vehicle merging, diverging, and overtaking for a multi-lane (e.g., two-way multi-lane) highway in which the innermost lanes (e.g., first and fourth lanes) are automated lanes. AL: Automated lane; CL: Conventional (e.g., human-driven) lane; E: Emergency lane (road right shoulder); 1: Automated lane; 2: Human driving lane; 3: Human driving lane; 4: Automated lane; 3801, 3802, 3803, 3804, 3805, and 3806: AV in automated mode; 3807, 3808, 3809, 3810, 3811, and 3812: AV in human-driven mode; 3813: Mode indicators; 3814: Central median.

Figure 39:
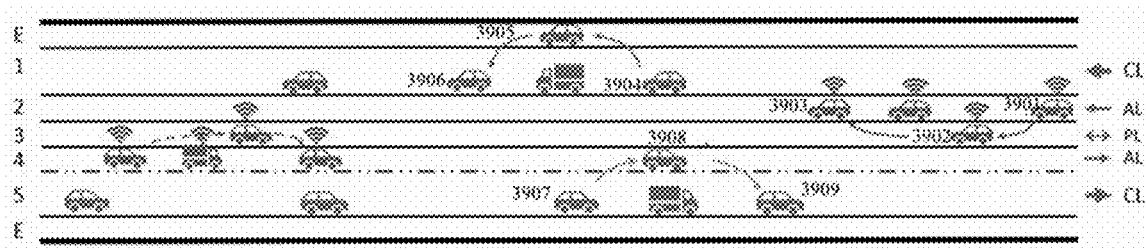

FIG. 39 is a schematic drawing of a road design, system, and methods for overtaking without merge and/or diverge lanes. The three innermost lanes are automated lanes and an automated lane (e.g., a central automated lane) is a special lane that can be used for overtaking. AL: Automated lane; CL: Conventional (e.g., human-driven) lane; PL: Passing lane; E: Emergency lane (road right shoulder); 1: Human driving lane; 2, 3, and 4: Automated lanes; 5: Human driving lane; 3901, 3902, and 3903: AV in automated mode; 3904, 3905, 3906, 3907, 3908, and 3909: AV in human-driven mode.

Figure 40A:
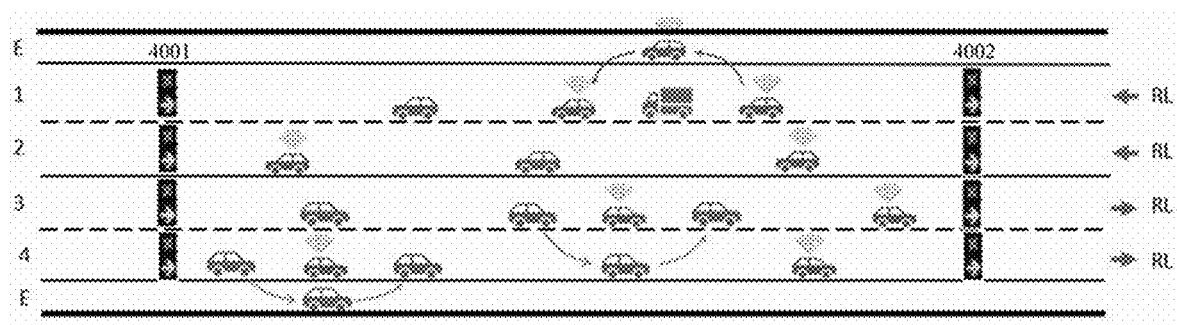

FIG. 40A is a schematic drawing of a road design, system, and methods for overtaking comprising a dynamic barrier and tidal lanes. RL: Reversible lane; E:

Emergency lane (road right shoulder); 1, 2, 3, and 4: Human driving and automated lane; 4001 and 4002: Mode indicators.

Figure 40B:
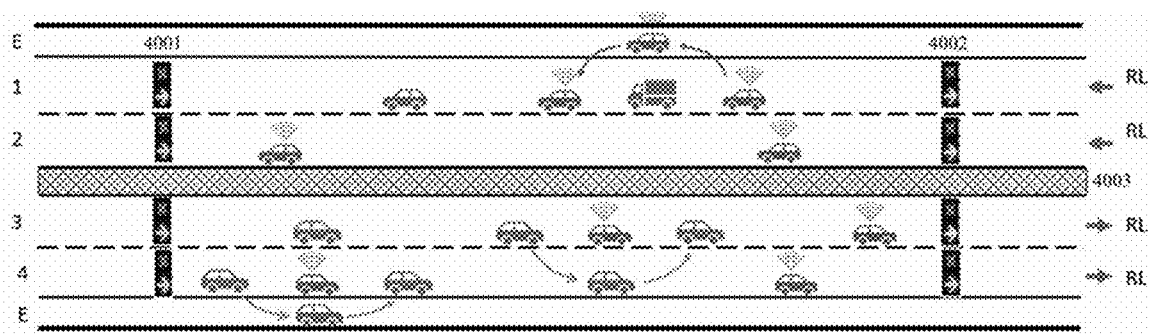

FIG. 40B is a schematic drawing of a road design, system, and methods for overtaking comprising a central median and tidal lanes. RL: Reversible lane; E: Emergency lane (road right shoulder); 1, 2, 3, and 4: Human driving and automated lane; 4001 and 4002: Mode indicators; 4003: Central median.

Figure 41A:
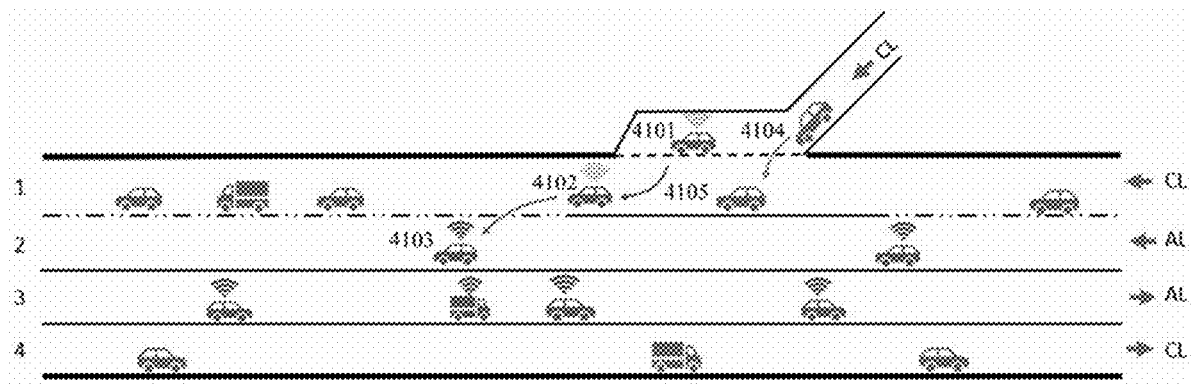

FIG. 41A is a schematic drawing of a road design, system, and methods for merging and/or diverging comprising a dynamic barrier and not comprising (e.g., without) a merge/diverge lane. AL: Automated lane; CL: Conventional (e.g., human-driven) lane; 1 and 4: Human driving lane; 2 and 3: Automated lane; 4101, 4102, and 4103: AV in automated mode; 4104 and 4105: AV in human-driven mode.

Figure 41B:
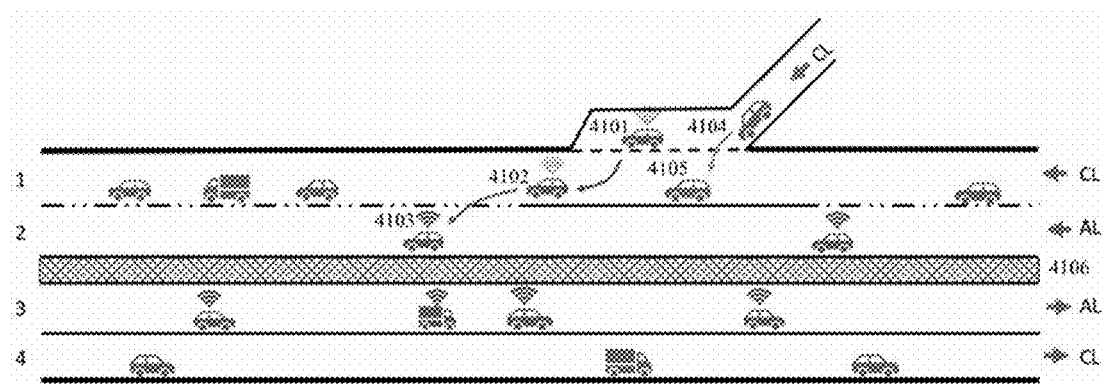

FIG. 41B is a schematic drawing of a road design, system, and methods for merging and/or diverging comprising a central median and not comprising (e.g., without) a merge/diverge lane. AL: Automated lane; CL: Conventional (e.g., human-driven) lane; 1 and 4: Human driving lane; 2 and 3: Automated lane; 4101, 4102, and 4103: AV in automated mode; 4104 and 4105: AV in human-driven mode; 4106: Central median.

Figure 42:
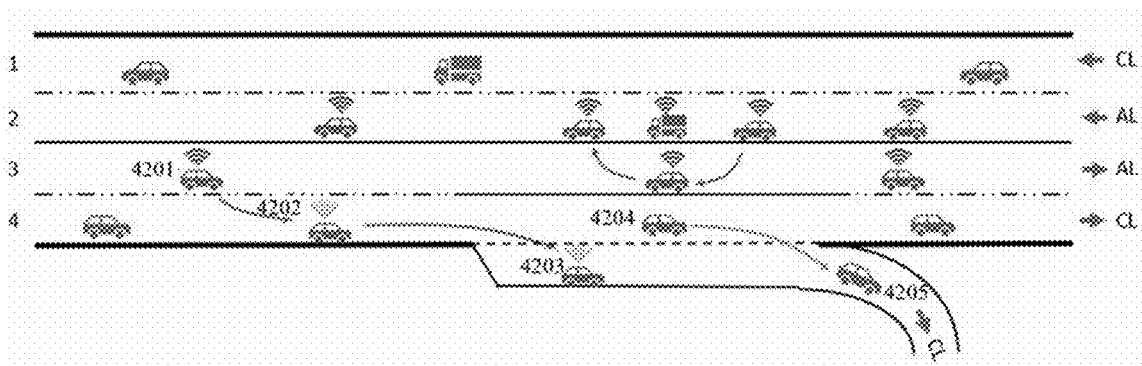

FIG. 42 is a schematic drawing of a road design, system, and methods for merging and/or diverging and not comprising (e.g., without) a merge/diverge lane. AL: Automated lane; CL: Conventional (e.g., human-driven) lane; 1 and 4: Human driving lane; 2 and 3: Automated lane; 4201, 4202, and 4203: AV in automated mode; 4204 and 4205: AV in human-driven mode.

Figure 43:
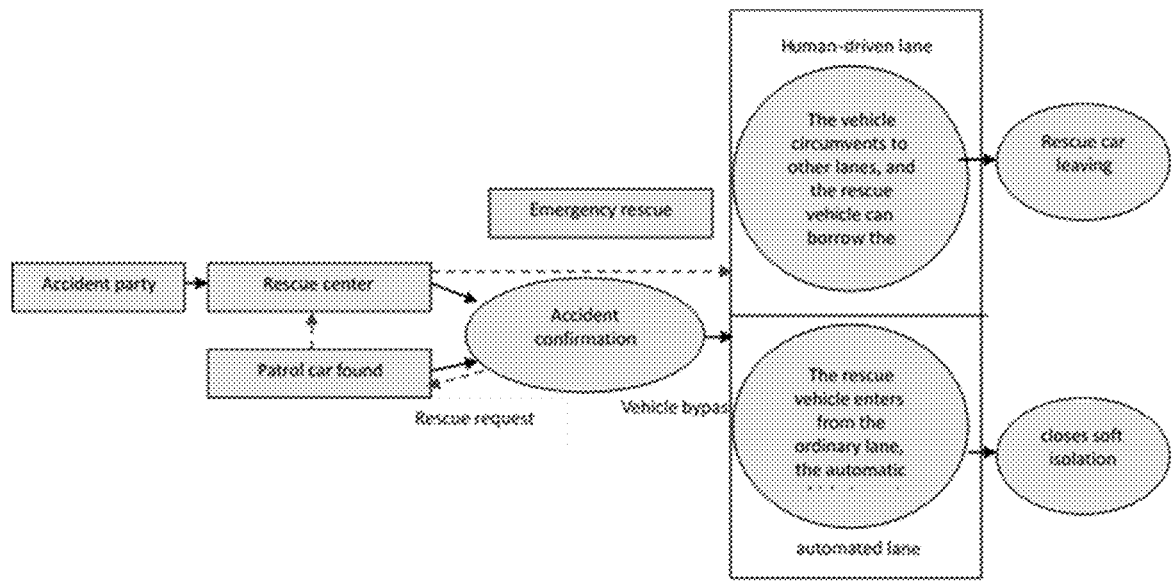

FIG. 43 is a flow diagram showing a process for taking emergency measures, e.g., after an accident.

Figure 44:
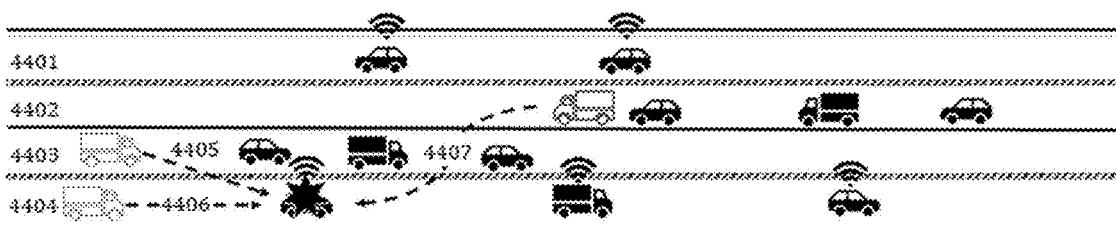

FIG. 44 is a schematic diagram of a system for emergency rescue for a two-way road section. 4401: Automated lane; 4402: Human driving lane; 4403: Human driving lane; 4404: Automated lane; 4405: The route of the rescue vehicle moving from the human-driving lane to the accident point on the automated lane; 4406: The route of the rescue vehicle moving to the accident point on the automated lane; 4407: The route of the rescue vehicle moving from the human-driving lane in the other direction to the accident point on the automated lane.

Figure 45:
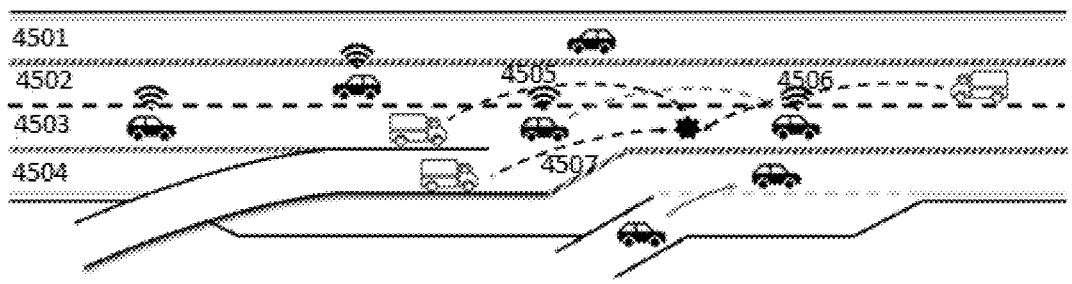

FIG. 45 is a schematic diagram of a system for emergency rescue for an onramp road entrance of a two-way road section. 4501: Human driving lane; 4502: Automated lane; 4503: Automated lane; 4504: Human driving lane; 4505: The route of the rescue vehicle moving to the accident point on the automated lane; 4506: The route of the rescue vehicle moving from the automated lane on the other direction to the accident point on the automated lane; 4507: The route of the rescue vehicle moving from the onramp to the accident point on the automated lane.

Figure 46:
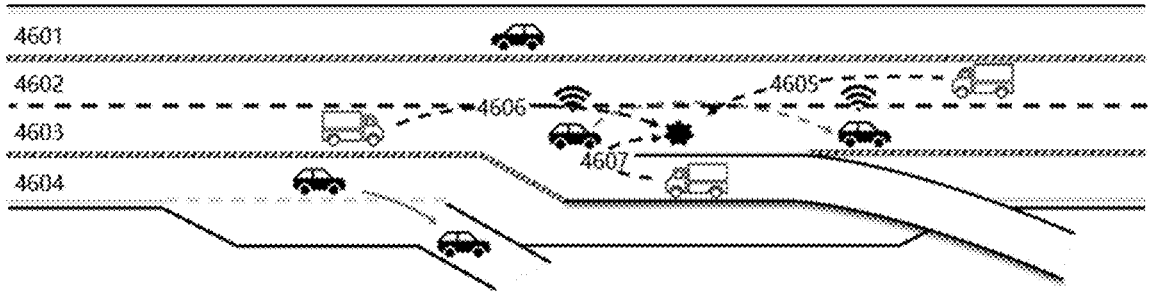

FIG. 46 is a schematic diagram of a system for emergency rescue for an offramp road entrance of a two-way road system. 4601: Human driving lane; 4602: Automated lane; 4603: Automated lane; 4604: Human driving lane; 4605: The route of the rescue vehicle moving from the automated lane on the other direction to the accident point on the automated lane; 4606: The route of the rescue vehicle moving to the accident point on the automated lane; 4607: The route of the rescue vehicle moving from the offramp to the accident point on the automated lane.

Figure 47:
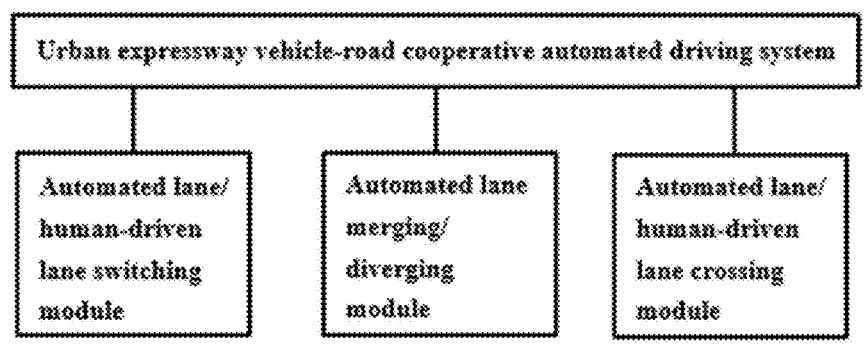

FIG. 47 is a composition diagram of an urban expressway vehicle-road cooperative automated driving system comprising an automated lane/human-driven lane switching module, an automated lane merging/diverging module, and an automated lane/human-driven lane crossing module.

Figure 48:
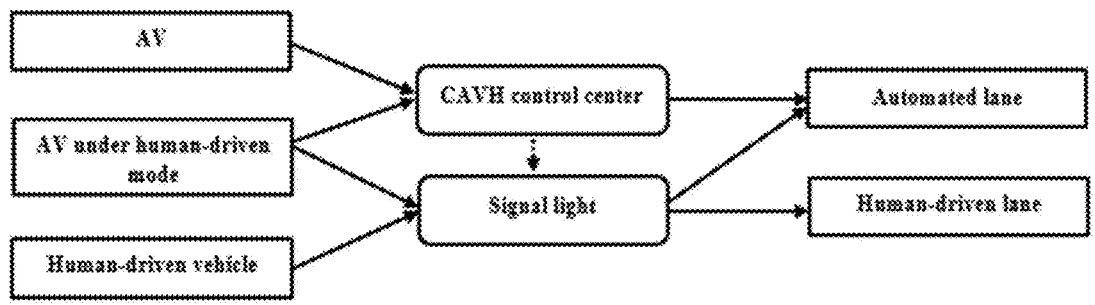

FIG. 48 is a schematic diagram showing a system for control of AV, human-driven vehicle, and AV under human-driven mode for passing through a signal light.

Figure 49:
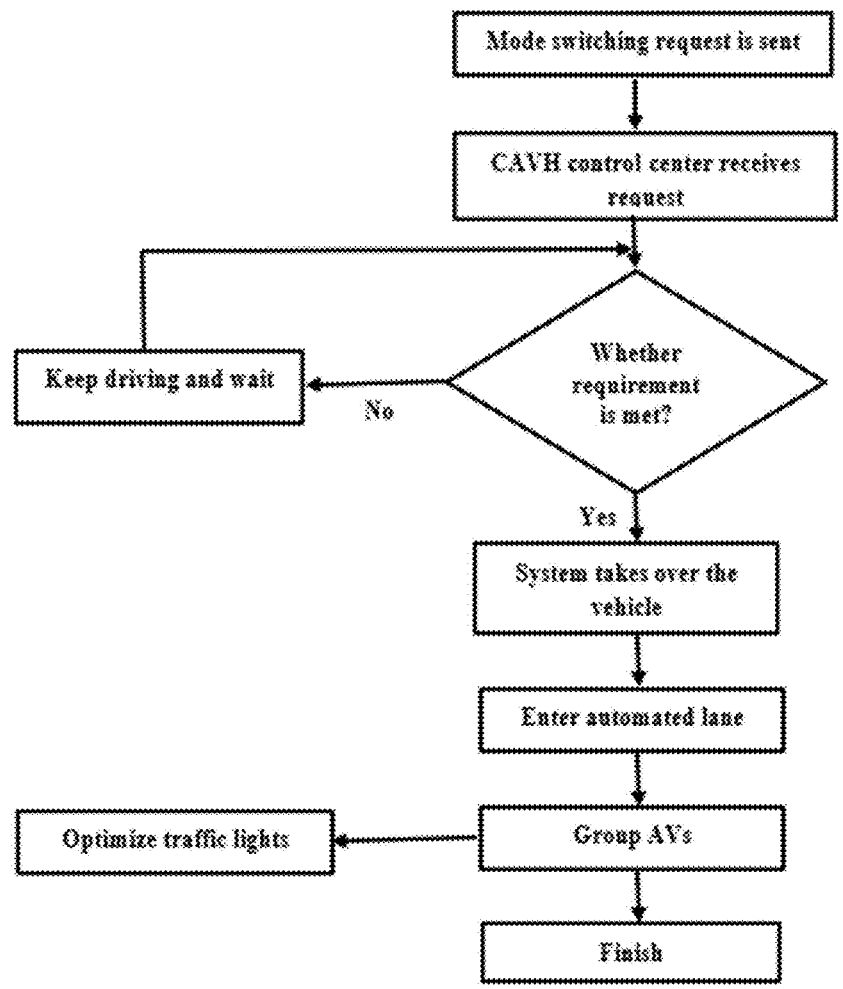

FIG. 49 is a flow chart showing a process for switching an AV from human-driven mode to automated driving mode.

Figure 50:
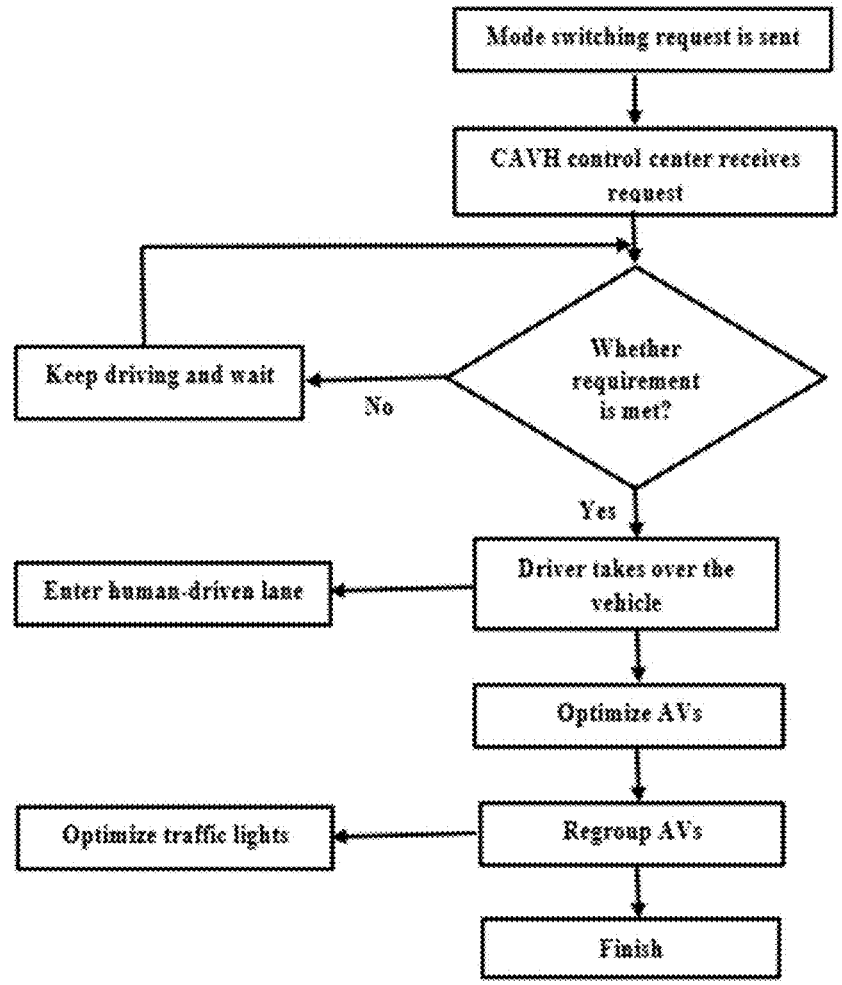

FIG. 50 is a flow chart showing a process for switching an AV from automated driving mode to human-driven mode.

Figure 51:
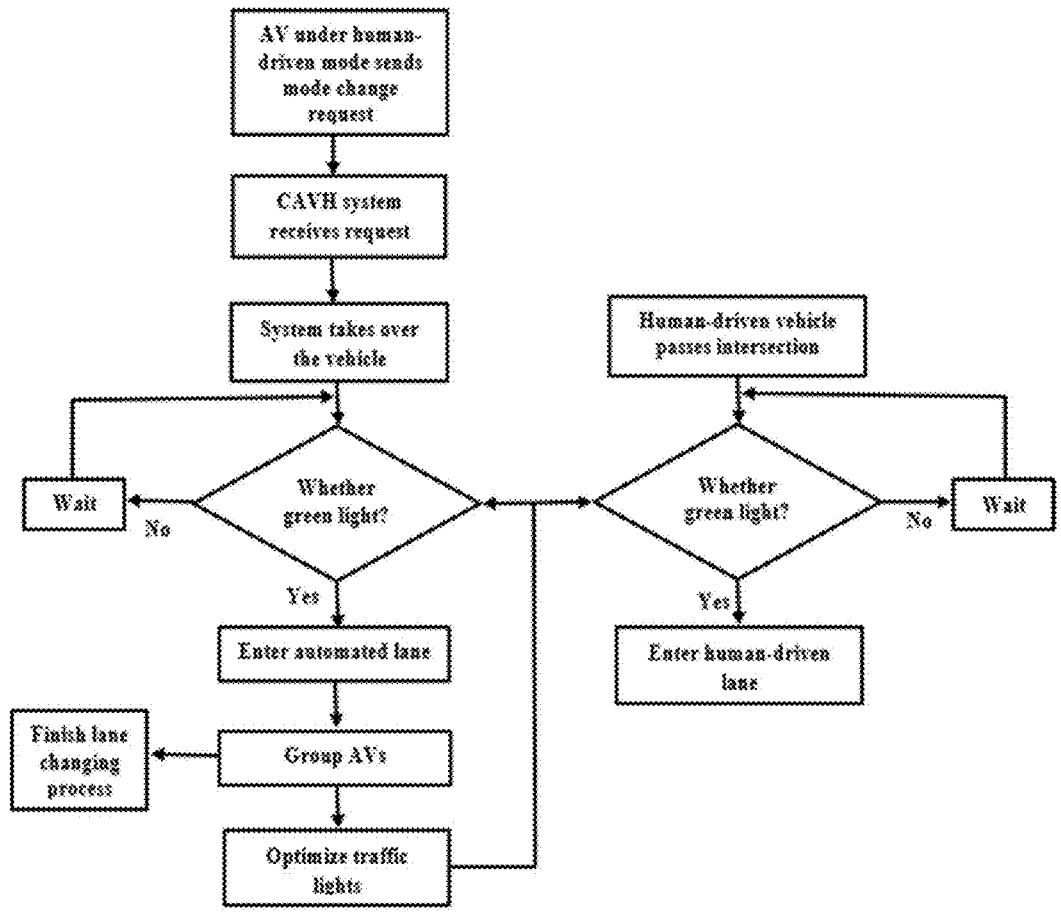

FIG. 51 is a flow chart showing a process and system for controlling automated lanes and/or human driver lanes at a signalized intersection.

Figure 52:
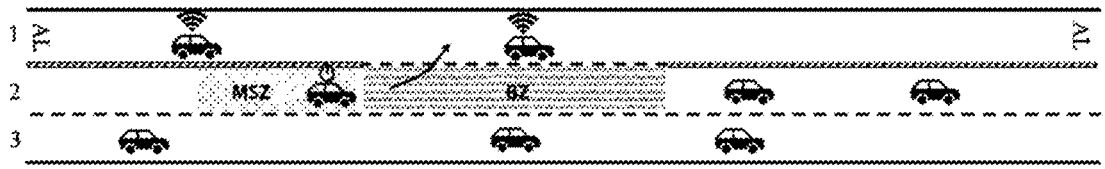

FIG. 52 is a schematic drawing of a road design, system, and methods for an AV switching modes from a human-driven mode to an automated mode to move from a human-driven lane to an automated lane. Lane 1 is an automated lane and lane 2 includes a mode switching zone (MSZ) and a buffer zone (BZ). First, the vehicle switches to the automated mode after passing through the mode switching zone and then merges to the automated lane after passing through the buffer zone.

Figure 53:
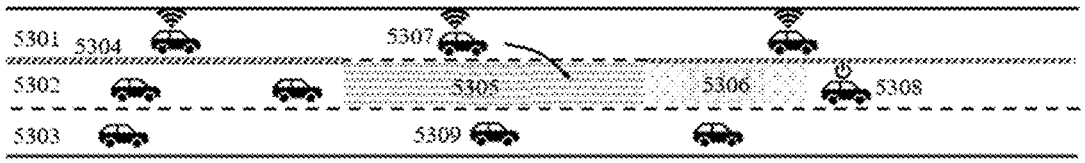

FIG. 53 is a schematic drawing of a Type 1 road design, system, and methods comprising a dedicated inner automated lane and AV diverging from the inner automated lane. 5301: Automated lane; 5302: Human-driven lane; 5303: Human-driven lane; 5304: Movable barrier; 5305: Buffer zone; 5306: Mode switching zone; 5307: Mode switching zone; 5308: AV in automated mode; 5309: AV in human-driven mode.

Figure 54:
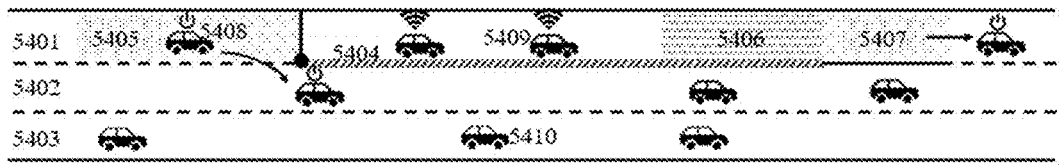

FIG. 54 is a schematic drawing of a Type 2 road design, system, and methods comprising a dedicated inner automated lane and AV merging into and diverging from the inner automated lane. 5401: Automated lane; 5402: Human-driven lane; 5403: Human-driven lane; 5404: Movable barrier; 5405: Mode switching zone; 5406: Buffer zone; 5407: Mode switching zone; 5408: AV in human-driven mode; 5409: AV in automated mode; 5410: AV in human-driven mode.

Figure 55:
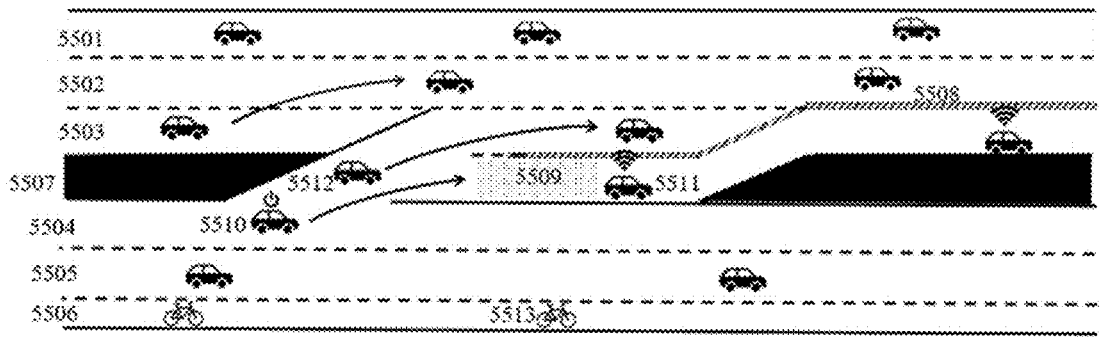

FIG. 55 is a schematic drawing of a Type 1 road design, system, and methods comprising a dedicated lane for entry from a minor road onto an outer automated lane of a major road. 5501 Inner human-driven lane of major road; 5502: Middle human-driven lane of major road; 5503: Outer automated Lane of major road; 5504: Inner human-driven lane of minor road; 5505: Outer human-driven lane of minor road; 5506: Bicycle lane; 5507: Diving strip; 5508: Movable barrier; 5509: Mode switching zone; 5510: AV in human-driven mode; 5511: AV in automated mode; 5512: AV in human-driven mode; 5513: Bicycle.

Figure 56:
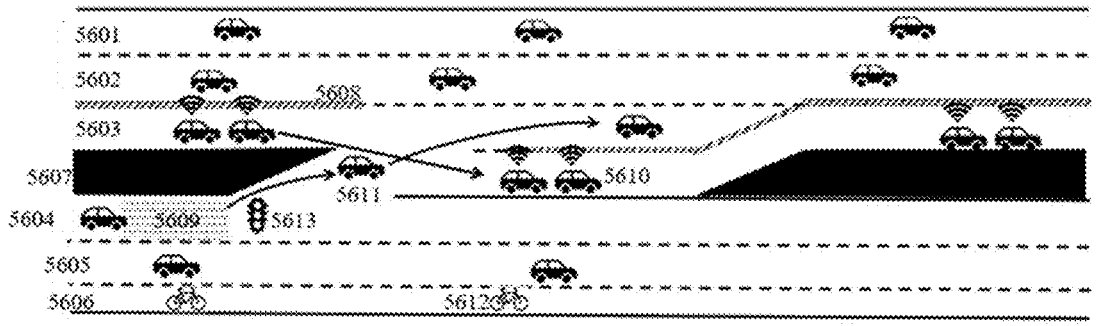

FIG. 56 is a schematic drawing of a Type 2 road design, system, and methods comprising a dedicated lane for entry from a minor road onto an outer automated lane of a major road. 5601: Inner human-driven lane of major road; 5602: Middle human-driven lane of major road; 5603: Outer automated lane of major road; 5604: Inner human-driven lane of minor road; 5605: Outer human-driven lane of minor road; 5606: Bicycle lane; 5607: Diving strip; 5608: Movable barrier; 5609: Waiting Zone; 5610: AV in automated mode; 5611: AV in human-driven mode; 5612: Bicycle; 5613: Traffic Signals.

Figure 57:
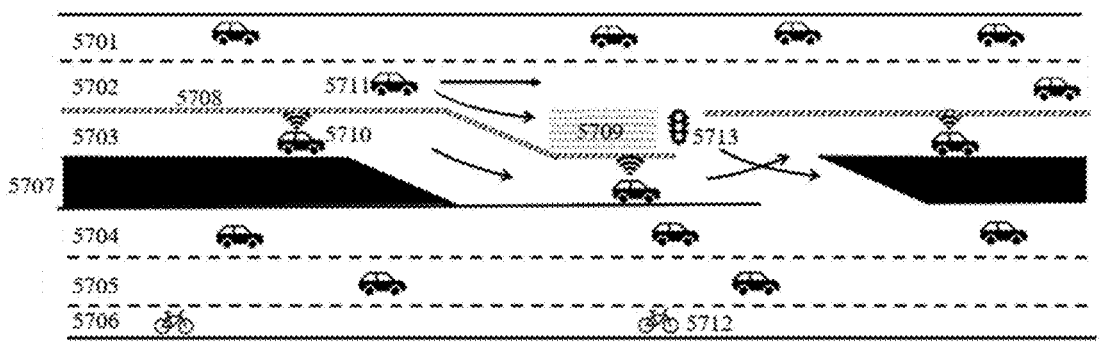

FIG. 57 is a schematic drawing of a Type 1 road design, system, and methods comprising a dedicated lane for exit from an outer automated lane of a major road onto a minor road. 5701: Inner human-driven lane of major road; 5702: Middle human-driven lane of major road; 5703: Outer automated lane of major road; 5704: Inner human-driven lane of minor road; 5705: Outer human-driven lane of minor road; 5706: Bicycle lane; 5707: Diving strip; 5708: Movable barrier; 5709: Waiting zone; 5710: AV in automated mode; 5711: AV in human-driven mode; 5712: Bicycle; 5713: Traffic Signals.

Figure 58:
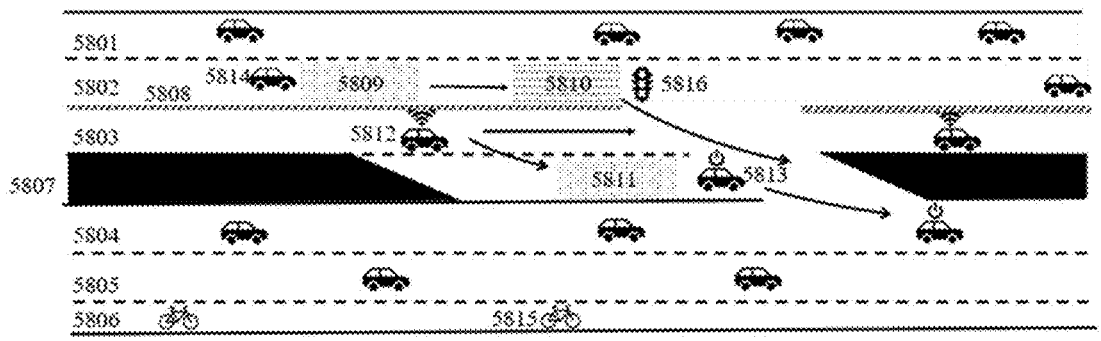

FIG. 58 is a schematic drawing of a Type 2 road design, system, and methods comprising a dedicated lane for exit from an outer automated lane of a major road onto a minor road. 5801: Inner human-driven lane of major road; 5802: Middle human-driven lane of major road; 5803: Outer automated lane of major road; 5804: Inner human-driven lane of minor road; 5805: Outer human-driven lane of minor road; 5806: Bicycle lane; 5807: Diving strip; 5808: Movable barrier; 5809: Waiting zone; 5810: Direction switching zone; 5811: Mode-switching zone; 5812: AV in automated mode; 5813: AV in human-driven mode; 5814: AV in human-driven mode; 5815: Bicycle; 5816: Traffic Signals.

Figure 59:
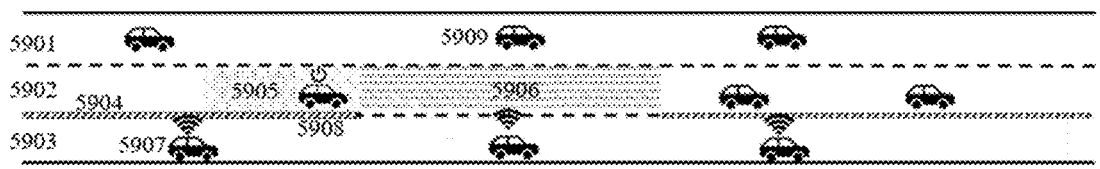

FIG. 59 is a schematic drawing of a Type 2 road design, system, and methods comprising a dedicated lane for entry into an outer automated lane of a major road. 5901 Inner human-driven lane; 5902: Middle human-driven lane; 5903: Outer Automated lane; 5904: Movable barrier; 5905: Mode switching zone; 5906: Buffer zone; 5907: AV in automated mode; 5908: AV in human-driven mode; 5909: AV in human-driven mode.

Figure 60:
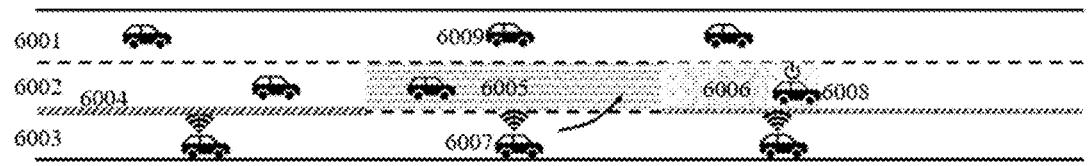

FIG. 60 is a schematic drawing of a Type 1 road design, system, and methods comprising a dedicated lane for exit from an outer automated lane. 6001: Inner human-driven lane; 6002: Middle human-driven lane; 6003: Outer Automated lane; 6004: Movable barrier; 6005: Buffer zone; 6006: Mode switching zone; 6007: AV in automated mode; 6008: AV in human-driven mode; 6009: AV in human-driven mode.

Figure 61:
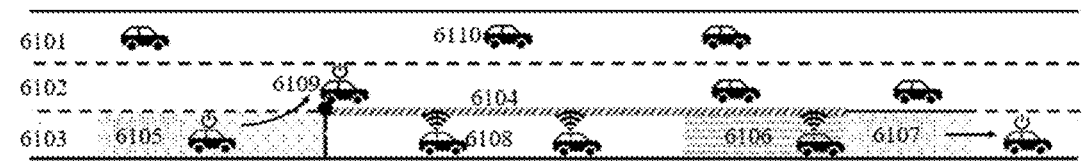

FIG. 61 is a schematic drawing of a Type 3 road design, system, and methods comprising a dedicated lane for entry into an outer automated lane of a major road and for exit from an outer automated lane of a major road. 6101 Inner human-driven lane; 6102 Middle human-driven lane; 6103 Outer Automated lane; 6104 Movable barrier; 6105 Mode switching zone; 6106 Buffer zone; 6107 Mode switching zone; 6108 AV in automated mode; 6109 AV in human-driven mode; 6110 AV in human-driven mode.

Figure 62:
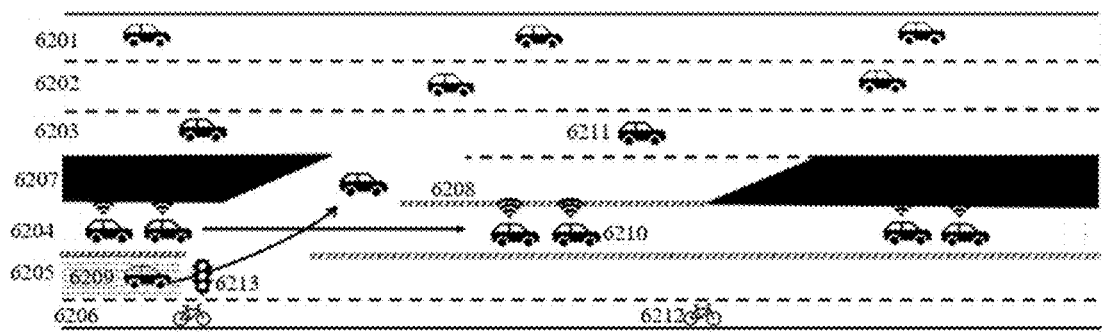

FIG. 62 is a schematic drawing of a road design, system, and methods comprising an automated lane at the entrance to an urban expressway. 6201: Inner human-driven lane of major road. 6202: Middle human-driven lane of major road; 6203: Outer human-driven lane of major road; 6204: Inner automated lane of minor road; 6205: Outer human-driven lane of minor road; 6206: Bicycle lane; 6207: Diving strip; 6208: Movable barrier; 6209: Waiting zone; 6210: AV in automated mode; 6211: AV in human-driven mode; 6212: Bicycle; 6213: Traffic Signals.

Figure 63:
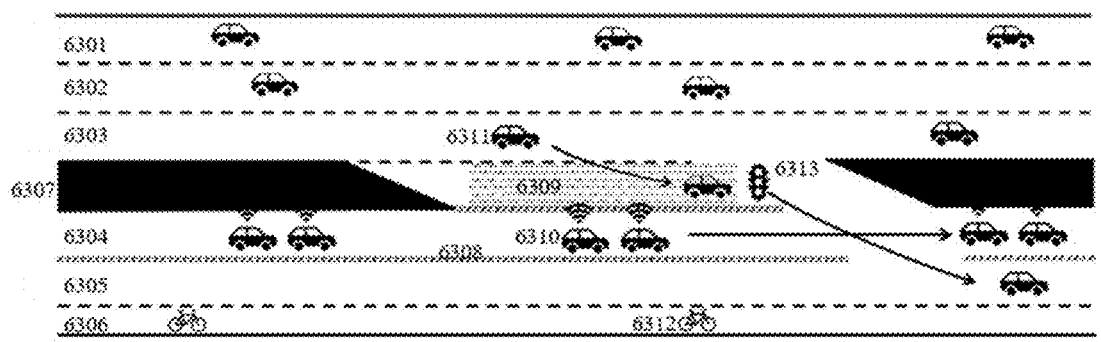

FIG. 63 is a schematic drawing of a road design, system, and methods comprising an automated lane at the exit of an urban expressway. 6301: Inner human-driven lane of major road; 6302: Middle human-driven lane of major road; 6303: Outer human-driven lane of major road; 6304: Inner automated lane of minor road; 6305: Outer human-driven lane of minor road; 6306: Bicycle lane; 6307: Diving strip; 6308: Movable barrier; 6309: Waiting zone; 6310: AV in automated mode; 6311: AV in human-driven mode; 6312: Bicycle; 6313: Traffic Signals.

Figure 64:
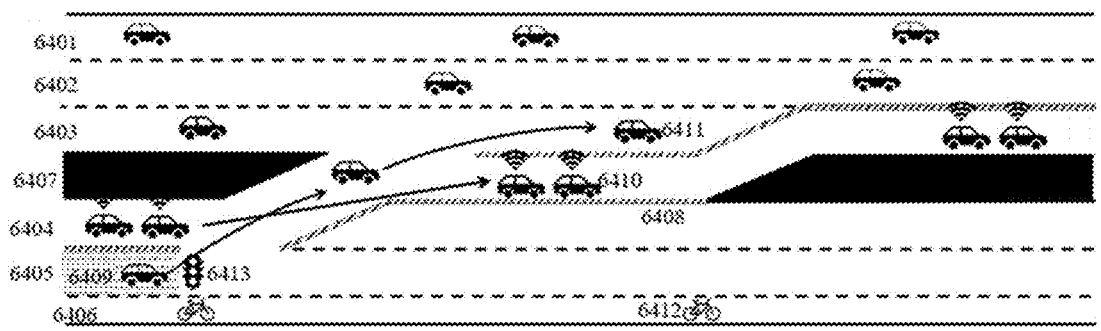

FIG. 64 is a schematic drawing of a road design, system, and methods comprising an automated lane that is alternately located in an inner lane and in an outer lane of an urban expressway. 6401: Inner human-driven lane of major road; 6402: Middle human-driven lane of major road; 6403: Outer lane of major road; 6404: Inner lane of minor road; 6405: Outer human-driven lane of minor road; 6406: Bicycle lane; 6407: Diving strip; 6408: Movable barrier; 6409: Waiting zone; 6410: AV in automated mode; 6411: AV in human-driven mode; 6412: Bicycle; 6413: Traffic Signals.

Figure 65:
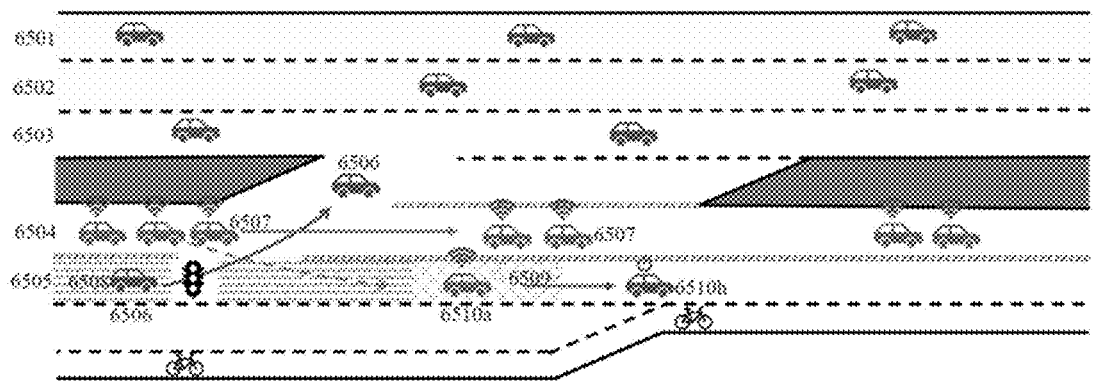

FIG. 65 is a schematic drawing of a road design, system, and methods comprising an automated lane having an entrance at the inner lane of an auxiliary road. 6501: Inner lane of the main road; 6502: Middle lane of the main road; 6503: Outer lane of the main road; 6504: Inner lane of the auxiliary road; 6505: Outer lane of the auxiliary road; 6506:

Human-driven vehicle; 6507: AV; 6508: Waiting zone; 6509: Mode switching zone; 6510(*a, h*): AV switching to the human-driven mode.

Figure 66:
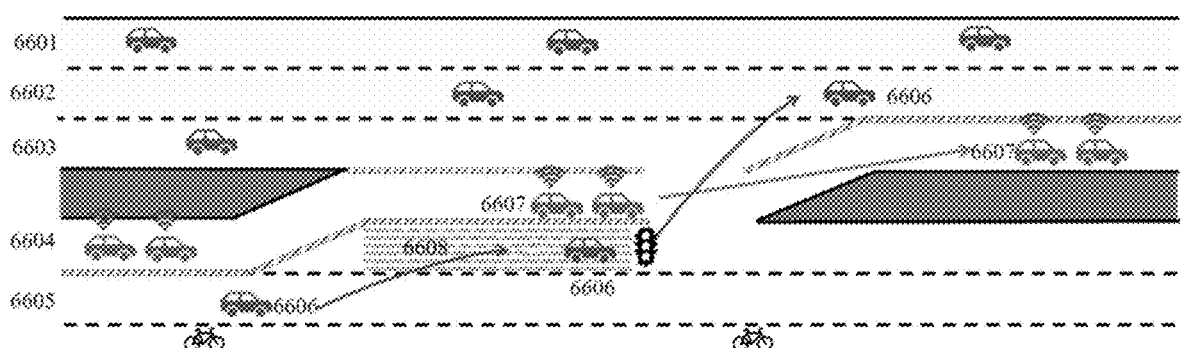

FIG. 66 is a schematic drawing of a road design, system, and methods for entry into a main road comprising an outer automated lane from an auxiliary road comprising an inner automated lane. 6601: Inner lane of the main road; 6602: Middle lane of the main road; 6603: Outer lane of the main road; 6604: Inner lane of the auxiliary road; 6605: Outer lane of the auxiliary road; 6606: Human-driven vehicle; 6607: AV; 6608: Waiting zone.

Figure 67:
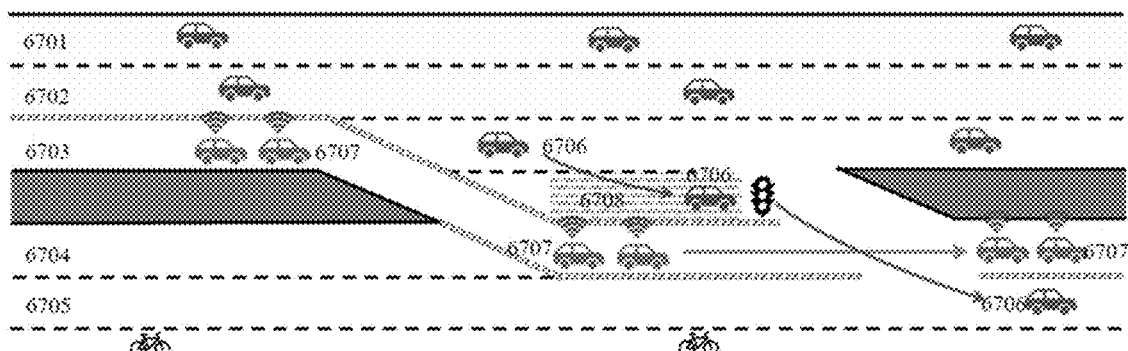

FIG. 67 is a schematic drawing of a road design, system, and methods for exit from a main road comprising an outer automated lane to an auxiliary road comprising an inner automated lane. 6701: Inner lane of the main road; 6702: Middle lane of the main road; 6703: Outer lane of the main road; 6704: Inner lane of the auxiliary road; 6705: Outer lane of the auxiliary road; 6706: Human-driven vehicle; 6707: AV; 6708: Waiting zone.

Figure 68:
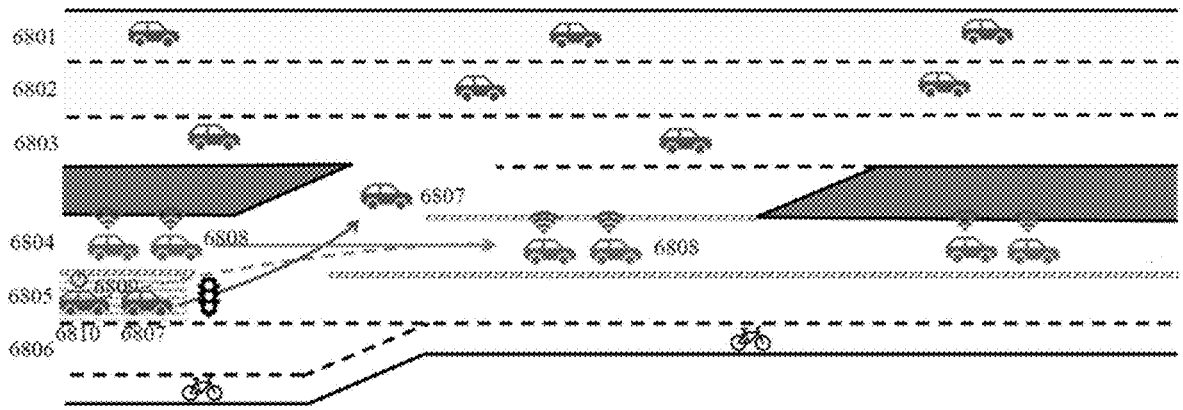

FIG. 68 is a schematic drawing of a road design, system, and methods for entry into a main road from an auxiliary road comprising an inner automated lane. 6801: Inner lane of the main road; 6802: Middle lane of the main road; 6803: Outer lane of the main road; 6804: Inner lane of the auxiliary road; 6805: Middle lane of the auxiliary road; 6806: Outer lane of the auxiliary road; 6807: Human-driven vehicle; 6808: AV; 6809: Waiting zone and/or Mode switching zone; 6810: AV in human-driven mode.

Figure 69:
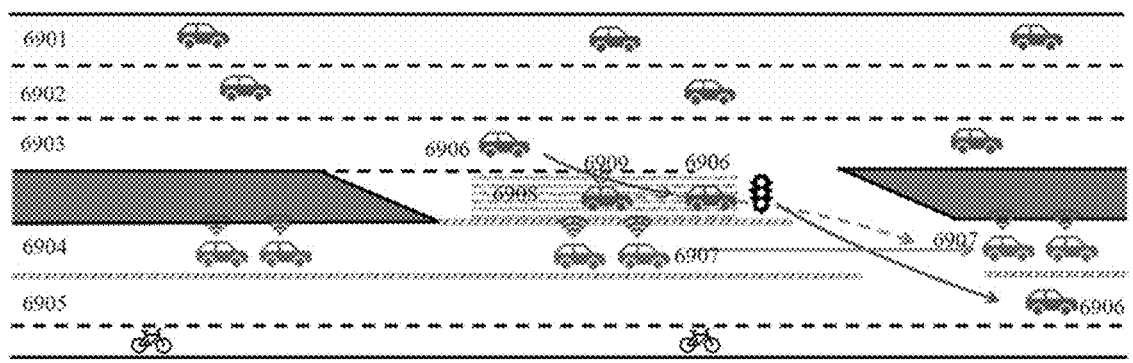

FIG. 69 is a schematic drawing of a road design, system, and methods for exit from a main road to an auxiliary road comprising an inner automated lane. 6901: Inner lane of the main road; 6902: Middle lane of the main road; 6903: Outer lane of the main road; 6904: Inner lane of the auxiliary road; 6905: Outer lane of the auxiliary road; 6906: Human-driven vehicle; 6907: AV; 6908: Waiting zone and/or Mode switching zone; 6909: AV in human-driven mode.

Figure 70:
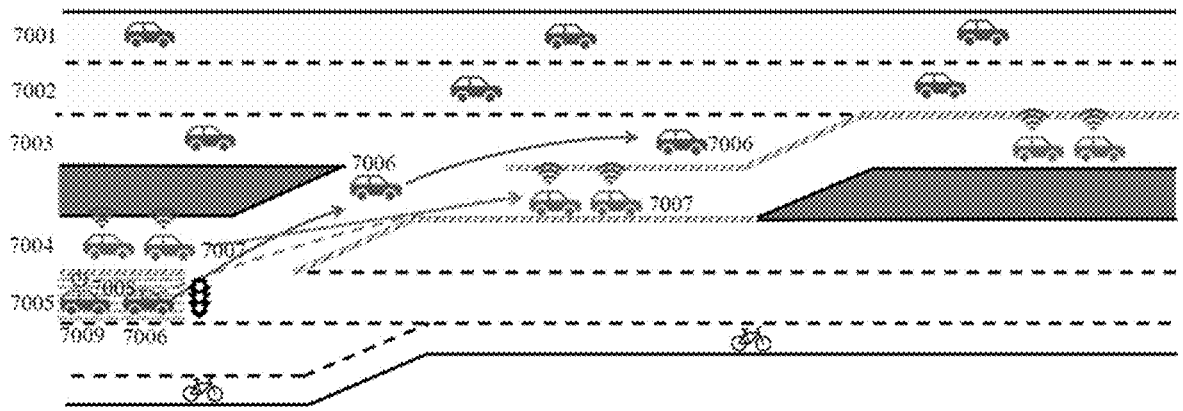

FIG. 70 is a schematic drawing of a road design, system, and methods for entry onto a main road comprising an outer automated lane from an auxiliary road comprising an inner automated lane. 7001: Inner lane of the main road; 7002: Middle lane of the main road; 7003: Outer lane of the main road; 7004: Inner lane of the auxiliary road; 7005: Outer lane of the auxiliary road; 7006: Human-driven vehicle; 7007: AV; 7008: Waiting zone and/or Mode switching zone; 7009: AV in human-driven mode.

Figure 71:
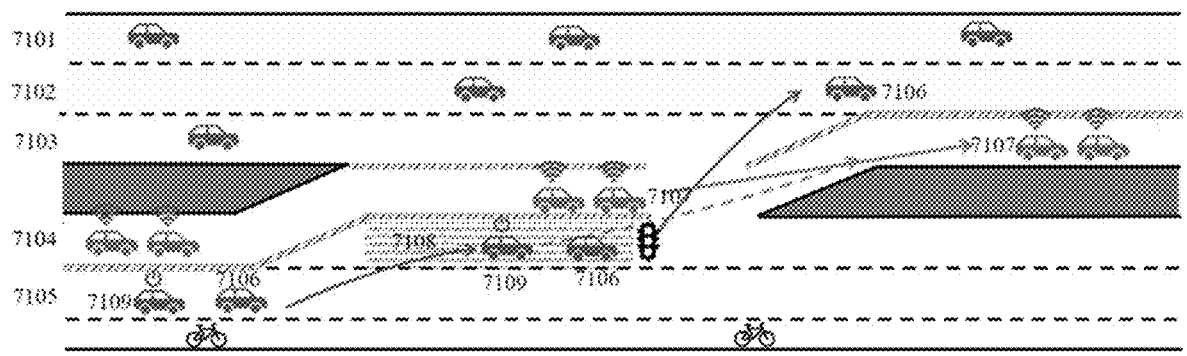

FIG. 71 is a schematic drawing of a road design, system, and methods for entry onto a main road comprising an outer automated lane from an auxiliary road comprising an inner automated lane. 7101: Inner lane of the main road; 7102: Middle lane of the main road; 7103: Outer lane of the main road; 7104: Inner lane of the auxiliary road; 7105: Outer lane of the auxiliary road; 7106: Human-driven vehicle; 7107: AV; 7108: Waiting zone and/or Mode switching zone; 7109: AV in human-driven mode.

Figure 72:
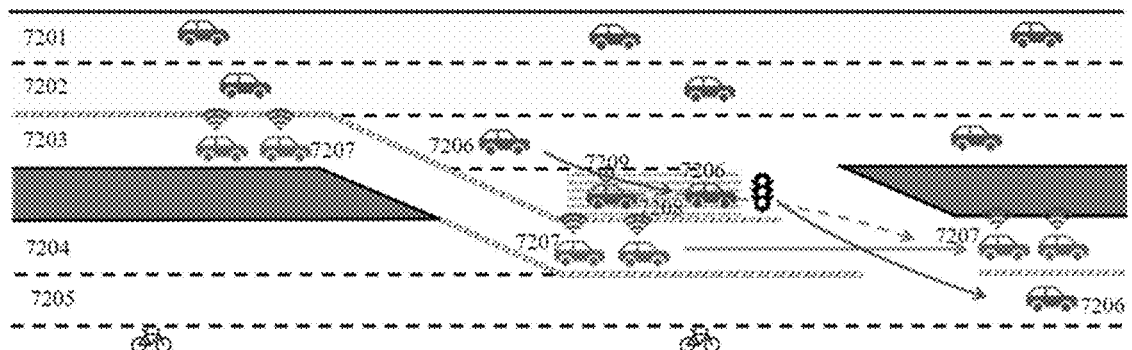

FIG. 72 is a schematic drawing of a road design, system, and methods for exit from a main road comprising an outer automated lane to an auxiliary road comprising an inner automated lane. 7201: Inner lane of the main road; 7202: Middle lane of the main road; 7203: Outer lane of the main road; 7204: Inner lane of the auxiliary road; 7205: Outer lane of the auxiliary road; 7206: Human-driven vehicle; 7207: AV; 7208: Waiting zone and/or Mode switching zone); 7209: AV in human-driven mode.

Figure 73:
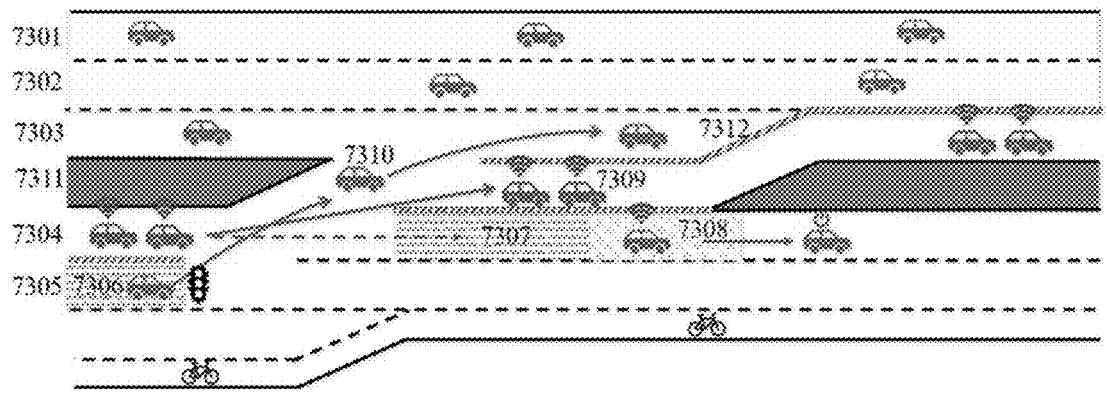

FIG. 73 is a schematic drawing of a road design, system, and methods for entry onto a main road comprising an outer automated lane from an auxiliary road comprising an inner automated lane. 7301: Inner lane of the main road; 7302: Middle lane of the main road; 7303: Outer lane of the main road; 7304: Inner lane of the auxiliary road; 7305: Outer lane of the auxiliary road; 7306: Waiting zone; 7307: Buffer zone; 7308: Mode switching zone; 7309: AV in automated mode; 7310: AV in human-driven mode; 7311: Diving strip; 7312: Movable barrier.

Figure 74:
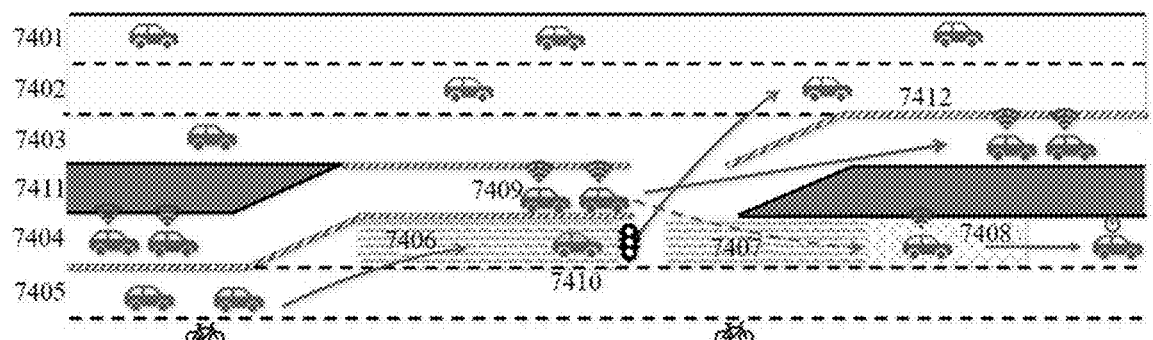

FIG. 74 is a schematic drawing of a road design, system, and methods for entry onto a main road comprising an outer automated lane from an auxiliary road comprising an inner automated lane. 7401: Inner lane of the main road; 7402: Middle lane of the main road; 7403: Outer lane of the main road; 7404: Inner lane of the auxiliary road; 7405: Outer lane of the auxiliary road; 7406: Waiting zone; 7407: Buffer zone; 7408: Mode switching zone; 7409: AV in automated mode; 7410: AV in human-driven mode; 7411: Diving strip; 7412: Movable barrier.

Figure 75:
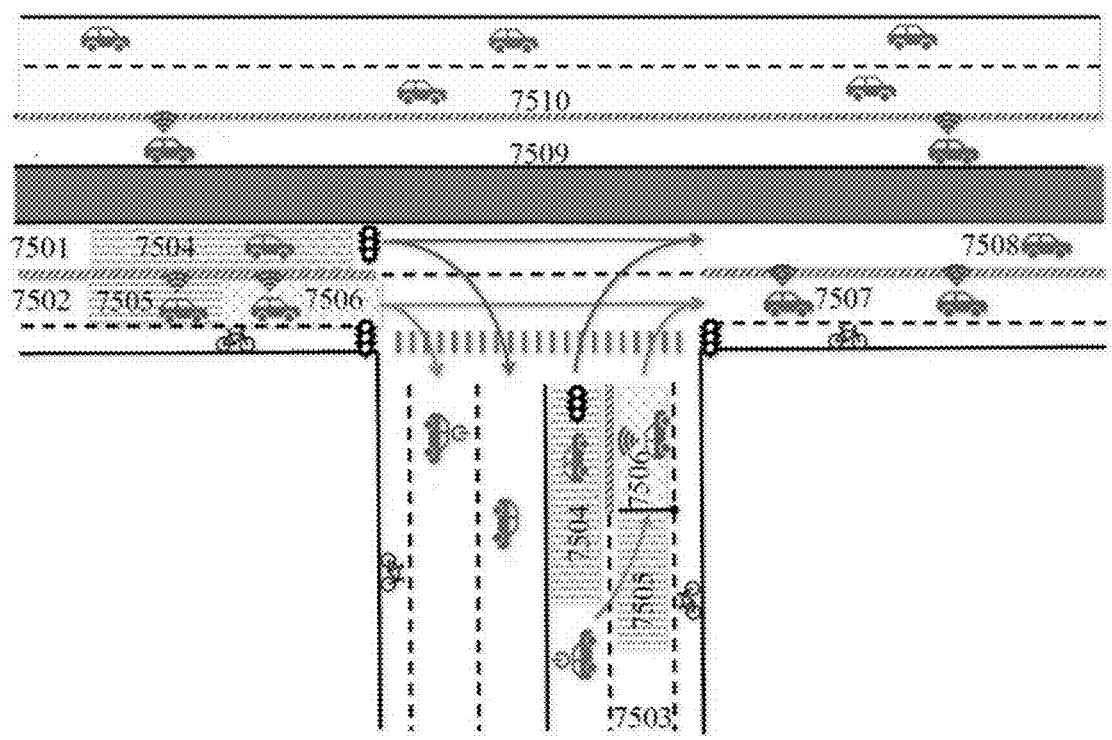

FIG. 75 is a schematic drawing of a road design, system, and methods for a branch road comprising an automated lane and auxiliary road comprising an automated lane. 7501: Inner lane of the auxiliary road; 7502: Outer lane of the auxiliary road; 7503: Outer lane of the branch road from south to north; 7504: Waiting zone; 7505: Buffer zone; 7506: Mode switching zone; 7507: AV in automated mode; 7508: AV in human-driven mode; 7509: Central median; 7510: Movable barrier.

Figure 76:
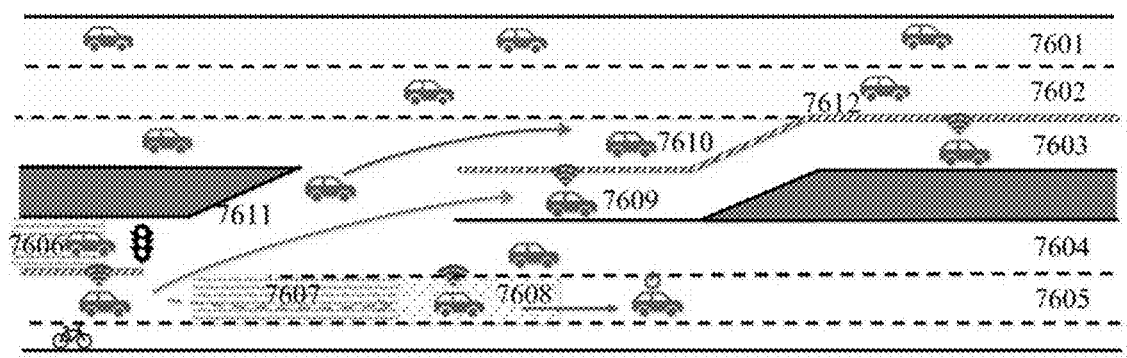

FIG. 76 is a schematic drawing of a road design, system, and methods for entry onto an automated outer lane of a main road from an automated outer lane of an auxiliary road. 7601: Inner lane of the main road; 7602: Middle lane of the main road; 7603: Outer lane of the main road; 7604: Inner lane of the auxiliary road; 7605: Outer lane of the auxiliary road; 7606: Waiting zone; 7607: Buffer zone; 7608: Mode switching zone; 7609: AV in automated mode; 7610: AV in human-driven mode; 7611: Diving strip; 7612: Movable barrier.

Figure 77:
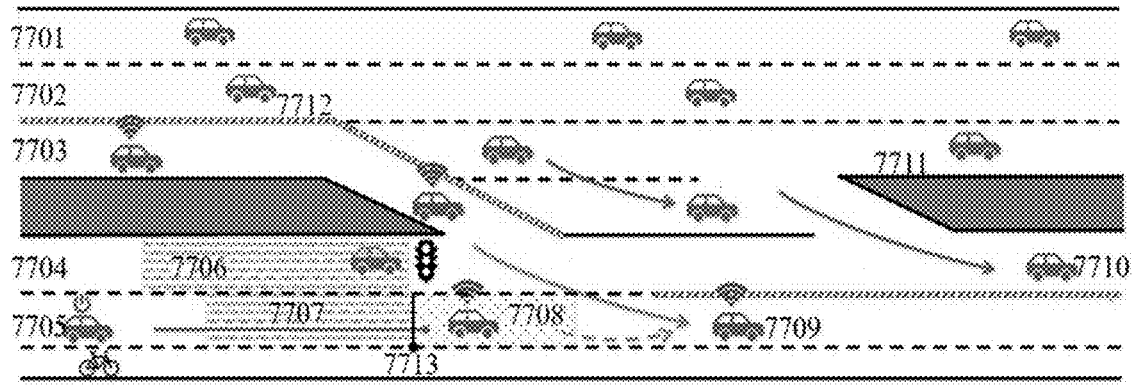

FIG. 77 is a schematic drawing of a road design, system, and methods for exit from an automated outer lane of a main road to an automated outer lane of an auxiliary road. 7701: Inner lane of the main road; 7702: Middle lane of the main road; 7703: Outer lane of the main road; 7704: Inner lane of the auxiliary road; 7705: Outer lane of the auxiliary road; 7706: Waiting zone; 7707: Buffer zone; 7708: Mode switching zone; 7709: AV in automated mode; 7710: AV in human-driven mode; 7711: Diving strip; 7712: Movable barrier; 7713: Barrier arm gate.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control. The section headings used herein are for organizational purposes only and are not to be construed as limiting the described subject matter in any way.

Definitions

To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, the terms "about", "approximately", "substantially", and "significantly" are understood by persons of ordinary skill in the art and will vary to some extent on the context in which they are used. If there are uses of these terms that are not clear to persons of ordinary skill in the art given the context in which they are used, "about" and "approximately" mean plus or minus less than or equal to 10% of the particular term and "substantially" and "significantly" mean plus or minus greater than 10% of the particular term.

As used herein, disclosure of ranges includes disclosure of all values and further divided ranges within the entire range, including endpoints and sub-ranges given for the ranges.

As used herein, the suffix "-free" refers to an embodiment of the technology that omits the feature of the base root of the word to which "-free" is appended. That is, the term "X-free" as used herein means "without X", where X is a feature of the technology omitted in the "X-free" technology. For example, a "controller-free" system does not comprise a controller, a "sensing-free" method does not comprise a sensing step, etc.

Although the terms "first", "second", "third", etc. may be used herein to describe various steps, elements, compositions, components, regions, layers, and/or sections, these steps, elements, compositions, components, regions, layers, and/or sections should not be limited by these terms, unless otherwise indicated. These terms are used to distinguish one step, element, composition, component, region, layer, and/or section from another step, element, composition, component, region, layer, and/or section. Terms such as "first", "second", and other numerical terms when used herein do not imply a sequence or order unless clearly indicated by the context. Thus, a first step, element, composition, component, region, layer, or section discussed herein could be termed a second step, element, composition, component, region, layer, or section without departing from technology.

As used herein, the word "presence" or "absence" (or, alternatively, "present or "absent") is used in a relative sense to describe the amount or level of a particular entity. For example, when a feature, component, entity, step, etc. is the to be "present", it means the level or amount of this feature, component, entity, step, etc. is detectable and/or above a pre determined threshold); conversely, when an feature, component, entity, step, etc. is said to be "absent", it means the level or amount of feature, component, entity, step, etc. is undetectable and/or below a pre-determined threshold. The pre-determined threshold may be the threshold for detectability associated with a particular sensor or method used to detect the feature, component, entity, step, etc. or any other threshold. When feature is "detected" it is "present"; when a feature, component, entity, step, etc. is "not detected" it is "absent".

As used herein, an "increase" or a "decrease" refers to a detectable (e.g., measured) positive or negative change, respectively, in the value of a variable relative to a previously measured value of the variable, relative to a pre-established value, and/or relative to a value of a standard control. An increase is a positive change preferably at least 10%, more preferably 50%, still more preferably 2-fold, even more preferably at least 5-fold, and most preferably at least 10-fold relative to the previously measured value of the variable, the pre-established value, and/or the value of a standard control. Similarly, a decrease is a negative change preferably at least 10%, more preferably 50%, still more preferably at least 80%, and most preferably at least 90% of the previously measured value of the variable, the pre-established value, and/or the value of a standard control. Other terms indicating quantitative changes or differences, such as "more" or "less," are used herein in the same fashion as described above.

As used herein, a "system" refers to a plurality of real and/or abstract components operating together for a common purpose. In some embodiments, a "system" is an integrated assemblage of hardware and/or software components. In some embodiments, each component of the system interacts with one or more other components and/or is related to one or more other components. In some embodiments, a system refers to a combination of components and software for controlling and directing methods.

As used herein, the term "mode" refers to the driving mode of a vehicle (e.g., an automated vehicle). A "human-driven mode" refers to a mode in which a vehicle is controlled by a human. An "automated mode" refers to a mode in which a vehicle is controlled by an automated driving system (e.g., a CAVH system) and human control of the vehicle is decreased, minimized, and/or eliminated. In some embodiments, an automated vehicle may be controlled (e.g., driven) in a human-driven mode or an automated mode.

As used herein the term "mode switching" refers to changing the mode of an automated vehicle from a "human-driven mode" to an "automated mode" or changing the mode of an automated vehicle from an "automated mode" to a "human-driven mode". The term "mode switching" may refer to the switching event itself and/or to a process to effect mode switching.

As used herein, the term "automated lane" refers to a lane reserved for, dedicated to, and/or supporting automated vehicles. In some embodiments, an automated lane is supported by a CAVH system (e.g., a roadway design and traffic control system as described herein). As used herein, the term "CAVH dedicated lane" refers to an automated lane that is supported by a CAVH system.

As used herein, the term "human-driven lane" or "normal lane" refers to a lane for use by vehicles under human control.

As used herein, the term "buffer zone" refers to a road segment and/or road design that provides an interface between an automated lane and a human-driven lane. In some embodiments, a buffer zone is supported by a CAVH system. In some embodiments, a buffer zone provides a road segment and/or road design in which a vehicle accelerates or decelerates when moving from a human-driven lane to an automated lane or moving from an automated lane to a human-driven lane. See, e.g., FIGS. 1-77.

As used herein, the term "mode switching zone" refers to a road segment and/or road design that provides an area in which an automated vehicle switches driving modes from an automated mode to a human-driven mode or from a human-driven mode to an automated mode. In some embodiments, a mode switching zone is supported by a CAVH system. In some embodiments, a vehicle in a mode switching zone sends a mode switching request to a roadway design and traffic control system as described herein that reviews the request for mode switching and grants or denies the request based on criteria describing the vehicle, traffic, road design, and environment. See, e.g., FIGS. 1-77.

As used herein, the term "waiting zone" refers to a road segment and/or road design that provides an area where a vehicle waits (e.g., while stopped in the waiting zone) for a signal (e.g., a traffic light signal) indicating that the vehicle may continue traveling, e.g., through an intersection, into another lane, into an offramp, into an onramp, onto another road, etc. See, e.g., FIGS. 56-77.

As used herein, the term "waiting/switching zone" refers to a road segment and/or road design that provides and/or combines the functions of a waiting zone and a mode switching zone.

As used herein, the term "CAVH signalized intersection" refers to an intersection of a first road comprising an automated lane with a second road comprising an automated lane and/or a human-driven lane.

As used herein, the term "direction switch" refers to a change in the direction of a vehicle, e.g., a change in the direction of a vehicle when the vehicle passes an intersection, the vehicle enters the direction switching zone, and/or the driver switches the direction according to the driving path.

As used herein, the term "direction switching zone" refers to a road segment and/or road design that provides and/or combines the functions of a waiting zone and a direction switching zone.

As used herein, the term "tidal lane" or "reversible lane" refers to a reversible traffic lane in which traffic may travel in either direction. In some embodiments, vehicles may travel in both directions at the same time on a tidal lane. In some embodiments, vehicles may only travel in one direction on a tidal lane at any given time. In some embodiments, the direction of traffic on a tidal lane is controlled by the CAVH system, e.g., depending on traffic capacity, predicted traffic needs, time of day, emergency, special events, etc. In some embodiments, signals and/or signs indicate the allowed direction of traffic on a tidal lane.

As used herein, the term "contraflow lane" is a relative term describing a lane in which traffic flows in the direction opposite to another lane. In some embodiments, a contraflow lane is a lane in which traffic flows in the opposite direction of the surrounding lanes.

As used herein, the term "vehicle" refers to any type of powered transportation device, which includes, and is not limited to, an automobile, truck, bus, motorcycle, or boat. The vehicle may normally be controlled by an operator or may be unmanned and remotely or autonomously operated in another fashion, such as using controls other than the steering wheel, gear shift, brake pedal, and accelerator pedal.

As used herein, the term "human-driven vehicle" refers to a traditional human-driven vehicle (e.g., non-autonomous vehicle) and/or to an automated vehicle in a human-driven mode (e.g., an automated vehicle at any level of automation in a human-driven mode).

As used herein, the term "automated vehicle" (abbreviated as "AV") refers to an automated vehicle in an automated mode, e.g., at any level of automation (e.g., as defined by SAE International Standard J3016, "Taxonomy and Definitions for Terms Related to Driving Automation Systems for On-Road Motor Vehicles" (published in 2014 (J3016_201401) and as revised in 2016 (J3016_201609) and 2018 (J3016_201806), each of which is incorporated herein by reference).

As used herein, the term "configured" refers to a component, module, system, subsystem, etc. (e.g., hardware and/or software) that is constructed and/or programmed to carry out the indicated function.

As used herein, the terms "determine," "calculate," "compute," and variations thereof, are used interchangeably to any type of methodology, processes, mathematical operation, or technique.

As used herein, the term "support" when used in reference to one or more components of the CAVH system (e.g., comprising road design and traffic control system provided herein) providing support to and/or supporting one or more other components of the CAVH system refers to, e.g., exchange of information and/or data between components and/or levels of the CAVH system, sending and/or receiving instructions between components and/or levels of the CAVH system, and/or other interaction between components and/or levels of the CAVH system that provide functions such as information exchange, data transfer, messaging, and/or alerting.

As used herein, the term "CAVH system component" and "component of a CAVH system" refers individually and/or collectively to one or more of an OBU, RSU, TCC, TCU, TCC/TCU, TOC, and/or CAVH cloud component.

As used herein, the term "85% reaction time" refers to the 85th percentile of perception and response times for a driver (e.g., the time interval from the appearance of some situation in the field of view to the initiation of a reaction by the driver). Perception and response times often follow a log-normal or similar distribution. In some embodiments, the 85% reaction time is approximately 1 to 3 seconds (e.g., 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0 seconds). See, e.g., "A Policy on Geometric Design of Highways and Streets", American Association of State Highway and Transportation Officials (2011), incorporated herein by reference.

One of ordinary skill in the art may refer to SAE International Standard J3016, "Taxonomy and Definitions for Terms Related to Driving Automation Systems for On-Road Motor Vehicles" (published in 2014 (J3016_201401) and as revised in 2016 (J3016_201609) and 2018 (J3016_201806)), which provides additional understanding of terms used in the art and herein.

DESCRIPTION

Provided herein is technology relating to roadway design and traffic control systems and methods for connected and automated vehicle and highway (CAVH) systems, and particularly, but not exclusively, to systems and methods for controlling switching of vehicles between automated mode and human-driven mode, systems and methods for vehicle merging, diverging, and overtaking on automated lanes of multiple lane highways, systems and methods for emergency management and roadside assistance on automated lanes, and/or systems and methods for managing automated vehicle lanes on urban major and minor expressways.

CAVH Systems

In some embodiments, the technology provides a vehicle operations and control system (e.g., a connected automated vehicle and highway (CAVH) systems and technologies as described herein) comprising one or more of a roadside unit (RSU) network; a Traffic Control Unit (TCU) and Traffic Control Center (TCC) network (e.g., TCU/TCC network); a vehicle comprising an onboard unit (OBU), e.g., as described herein; and/or a Traffic Operations Center (TOC).

In some embodiments, the technology provides a system (e.g., a vehicle operations and control system comprising a RSU network; a TCU/TCC network; a vehicle comprising an onboard unit OBU; a TOC; and a cloud-based platform configured to provide information and computing services (see, e.g., U.S. patent application Ser. No. 16/454,268, incorporated herein by reference)) configured to provide sensing functions, transportation behavior prediction and management functions, planning and decision making functions, and/or vehicle control functions. In some embodiments, the system comprises wired and/or wireless communications media. In some embodiments, the system comprises a power supply network. In some embodiments, the system comprises a cyber-safety and security system. In some embodiments, the system comprises a real-time communication function.

In some embodiments, the RSU network of embodiments of the systems provided herein comprises an RSU subsystem. In some embodiments, the RSU subsystem comprises a sensing module configured to measure characteristics of the driving environment; a communication module configured to communicate with vehicles, TCUs, and the cloud; a data processing module configured to process, fuse, and compute data from the sensing and/or communication modules; an interface module configured to communicate between the data processing module and the communication module; and an adaptive power supply module configured to provide power and to adjust power according to the conditions of the local power grid. In some embodiments, the adaptive power supply module is configured to provide backup redundancy. In some embodiments, communication module communicates using wired or wireless media.

In some embodiments, the sensing module comprises a radar based sensor. In some embodiments, the sensing module comprises a vision based sensor. In some embodiments, the sensing module comprises a radar based sensor and a vision based sensor and wherein said vision based sensor and said radar based sensor are configured to sense the driving environment and vehicle attribute data. In some embodiments, the radar based sensor is a LIDAR, microwave radar, ultrasonic radar, or millimeter radar. In some embodiments, the vision based sensor is a camera, infrared camera, or thermal camera. In some embodiments, the camera is a color camera.

In some embodiments, the sensing module comprises a satellite based navigation system. In some embodiments, the sensing module comprises an inertial navigation system. In some embodiments, the sensing module comprises a satellite based navigation system and an inertial navigation system and the sensing module and/or the inertial navigation system are configured to provide vehicle location data. In some embodiments, the satellite based navigation system is a Differential Global Positioning Systems (DGPS), a BeiDou Navigation Satellite System (BDS) System, or a GLONASS Global Navigation Satellite System. In some embodiments, the inertial navigation system comprises an inertial reference unit.

In some embodiments, the sensing module comprises a vehicle identification device. In some embodiments, the vehicle identification device comprises RFID, Bluetooth, Wi-fi (IEEE 802.11), or a cellular network radio, e.g., a 4G or 5G cellular network radio.

In some embodiments, the RSU subsystem is deployed at a fixed location near a road comprising automated lanes and, optionally, human-driven lanes. In some embodiments, the RSU subsystem is deployed at a fixed location near road infrastructure. In some embodiments, the RSU subsystem is deployed near a highway roadside, a highway onramp, a highway offramp, an interchange, intersection, a bridge, a tunnel, a toll station, or on a drone over a critical location. In some embodiments, the RSU subsystem is deployed on a mobile component. In some embodiments, the RSU subsystem is deployed on a vehicle drone over a critical location, on an unmanned aerial vehicle (UAV), at a site of traffic congestion, at a site of a traffic accident, at a site of highway construction, at a site of extreme weather. In some embodiments, an RSU subsystem is positioned according to road geometry, traffic amount, traffic capacity, vehicle type using a road, road size, and/or geography of the area. In some embodiments, the RSU subsystem is installed on a gantry (e.g., an overhead assembly, e.g., on which highway signs or signals are mounted). In some embodiments, the RSU subsystem is installed using a single cantilever or dual cantilever support.

In some embodiments, the TCC network is configured to provide traffic operation optimization, data processing and archiving. In some embodiments, the TCC network comprises a human operations interface. In some embodiments, the TCC network is a macroscopic TCC, a regional TCC, or a corridor TCC based on the geographical area covered by the TCC network. See, e.g., U.S. Pat. No. 10,380,886; U.S. Pat. App. Pub. No. 20190244521; U.S. Pat. App. Pub. No. 20190096238; U.S. patent application Ser. No. 16/454,268; and U.S. patent application Ser. No. 16/505,034, each of which is incorporated herein by reference.

In some embodiments, the TCU network is configured to provide real-time vehicle control and data processing. In some embodiments, the real-time vehicle control and data processing are automated based on preinstalled algorithms. In some embodiments, the TCU network is a segment TCU or a point TCUs based on based on the geographical area covered by the TCU network. See, e.g., U.S. Pat. No. 10,380,886; U.S. Pat. App. Pub. No. 20190244521; U.S. Pat. App. Pub. No. 20190096238; U.S. patent application Ser.

No. 16/454,268; and U.S. patent application Ser. No. 16/505,034, each of which is incorporated herein by reference. In some embodiments, the system comprises a point TCU physically combined or integrated with an RSU. In some embodiments, the system comprises a segment TCU physically combined or integrated with a RSU.

In some embodiments, the TCC network comprises macroscopic TCCs configured to process information from regional TCCs and provide control targets to regional TCCs; regional TCCs configured to process information from corridor TCCs and provide control targets to corridor TCCs; and corridor TCCs configured to process information from macroscopic and segment TCUs and provide control targets to segment TCUs. See, e.g., U.S. Pat. No. 10,380,886; U.S. Pat. App. Pub. No. 20190244521; U.S. Pat. App. Pub. No. 20190096238; U.S. patent application Ser. No. 16/454,268; and U.S. patent application Ser. No. 16/505,034, each of which is incorporated herein by reference.

In some embodiments, the TCU network comprises segment TCUs configured to process information from corridor and/or point TOCs and provide control targets to point TCUs; and point TCUs configured to process information from the segment TCU and RSUs and provide vehicle-based control instructions to an RSU. See, e.g., U.S. Pat. No. 10,380,886; U.S. Pat. App. Pub. No. 20190244521; U.S. Pat. App. Pub. No. 20190096238; U.S. patent application Ser. No. 16/454,268; and U.S. patent application Ser. No. 16/505,034, each of which is incorporated herein by reference.

In some embodiments, the RSU network provides vehicles with customized traffic information and control instructions and receives information provided by vehicles.

In some embodiments, the TCC network comprises one or more TCCs comprising a connection and data exchange module configured to provide data connection and exchange between TCCs. In some embodiments, the connection and data exchange module comprises a software component providing data rectify, data format convert, firewall, encryption, and decryption methods. In some embodiments, the TCC network comprises one or more TCCs comprising a transmission and network module configured to provide communication methods for data exchange between TCCs. In some embodiments, the transmission and network module comprises a software component providing an access function and data conversion between different transmission networks within the cloud platform. In some embodiments, the TCC network comprises one or more TCCs comprising a service management module configured to provide data storage, data searching, data analysis, information security, privacy protection, and network management functions. In some embodiments, the TCC network comprises one or more TCCs comprising an application module configured to provide management and control of the TCC network. In some embodiments, the application module is configured to manage cooperative control of vehicles and roads, system monitoring, emergency services, and human and device interaction.

In some embodiments, TCU network comprises one or more TCUs comprising a sensor and control module configured to provide the sensing and control functions of an RSU. In some embodiments, the sensor and control module is configured to provide the sensing and control functions of radar, camera, RFID, and/or V2I (vehicle-to-infrastructure) equipment. In some embodiments, the sensor and control module comprises a DSRC, GPS, 4G, 5G, and/or wireless (e.g., IEEE 802.11) radio. In some embodiments, the TCU network comprises one or more TCUs comprising a transmission and network module configured to provide communication network function for data exchange between an automated vehicles and a RSU. In some embodiments, the TCU network comprises one or more TCUs comprising a service management module configured to provide data storage, data searching, data analysis, information security, privacy protection, and network management. In some embodiments, the TCU network comprises one or more TCUs comprising an application module configured to provide management and control methods of an RSU. In some embodiments, the management and control methods of an RSU comprise local cooperative control of vehicles and roads, system monitoring, and emergency service. In some embodiments, the TCC network comprises one or more TCCs further comprising an application module and said service management module provides data analysis for the application module. In some embodiments, the TCU network comprises one or more TCUs further comprising an application module and said service management module provides data analysis for the application module.

In some embodiments, the TOC comprises interactive interfaces. In some embodiments, the interactive interfaces provide control of said TCC network and data exchange. In some embodiments, the interactive interfaces comprise information sharing interfaces and vehicle control interfaces. In some embodiments, the information sharing interfaces comprise an interface that shares and obtains traffic data; an interface that shares and obtains traffic incidents; an interface that shares and obtains passenger demand patterns from shared mobility systems; an interface that dynamically adjusts prices according to instructions given by said vehicle operations and control system; and/or an interface that allows a special agency (e.g., a vehicle administrative office or police) to delete, change, and share information. In some embodiments, the vehicle control interfaces comprise an interface that allows a vehicle operations and control system to assume control of vehicles; an interface that allows vehicles to form a platoon with other vehicles; and/or an interface that allows a special agency (e.g., a vehicle administrative office or police) to assume control of a vehicle. In some embodiments, the traffic data comprises vehicle density, vehicle velocity, and/or vehicle trajectory. In some embodiments, the traffic data is provided by the vehicle operations and control system and/or other shared mobility systems. In some embodiments, traffic incidents comprise extreme conditions, major and/or minor accident, and/or a natural disaster. In some embodiments, an interface allows the vehicle operations and control system to assume control of vehicles upon occurrence of a traffic event, extreme weather, or pavement breakdown when alerted by said vehicle operations and control system and/or other share mobility systems. In some embodiments, an interface allows vehicles to form a platoon with other vehicles when they are driving in the same automated vehicle dedicated lane.

In some embodiments, the OBU comprises a communication module configured to communicate with an RSU. In some embodiments, the OBU comprises a communication module configured to communicate with another OBU. In some embodiments, the OBU comprises a data collection module configured to collect data from external vehicle sensors and internal vehicle sensors; and to monitor vehicle status and driver status. In some embodiments, the OBU comprises a vehicle control module configured to execute control instructions for driving tasks. In some embodiments, the driving tasks comprise car following and/or lane changing. In some embodiments, the control instructions are received from an RSU. In some embodiments, the OBU is configured to control a vehicle using data received from an RSU. In some embodiments, the data received from said RSU comprises: vehicle control instructions; travel route and traffic information; and/or services information. In some embodiments, the vehicle control instructions comprise a longitudinal acceleration rate, a lateral acceleration rate, and/or a vehicle orientation. In some embodiments, the travel route and traffic information comprise traffic conditions, incident location, intersection location, entrance location, and/or exit location. In some embodiments, the services data comprises the location of a fuel station and/or location of a point of interest. In some embodiments, OBU is configured to send data to an RSU. In some embodiments, the data sent to said RSU comprises driver input data; driver condition data; and/or vehicle condition data. In some embodiments, the driver input data comprises origin of the trip, destination of the trip, expected travel time, and/or service requests. In some embodiments, the driver condition data comprises driver behaviors, fatigue level, and/or driver distractions. In some embodiments, the vehicle condition data comprises vehicle ID, vehicle type, and/or data collected by a data collection module.

In some embodiments, the OBU is configured to collecting data comprising vehicle engine status; vehicle speed; surrounding objects detected by vehicles; and/or driver conditions. In some embodiments, the OBU is configured to assume control of a vehicle. In some embodiments, the OBU is configured to assume control of a vehicle when the automated driving system fails. In some embodiments, the OBU is configured to assume control of a vehicle when the vehicle condition and/or traffic condition prevents the automated driving system from driving said vehicle. In some embodiments, the vehicle condition and/or traffic condition is adverse weather conditions, a traffic incident, a system failure, and/or a communication failure.

Roadway Design and Traffic Control Systems for CAVH Systems

Figure 1:
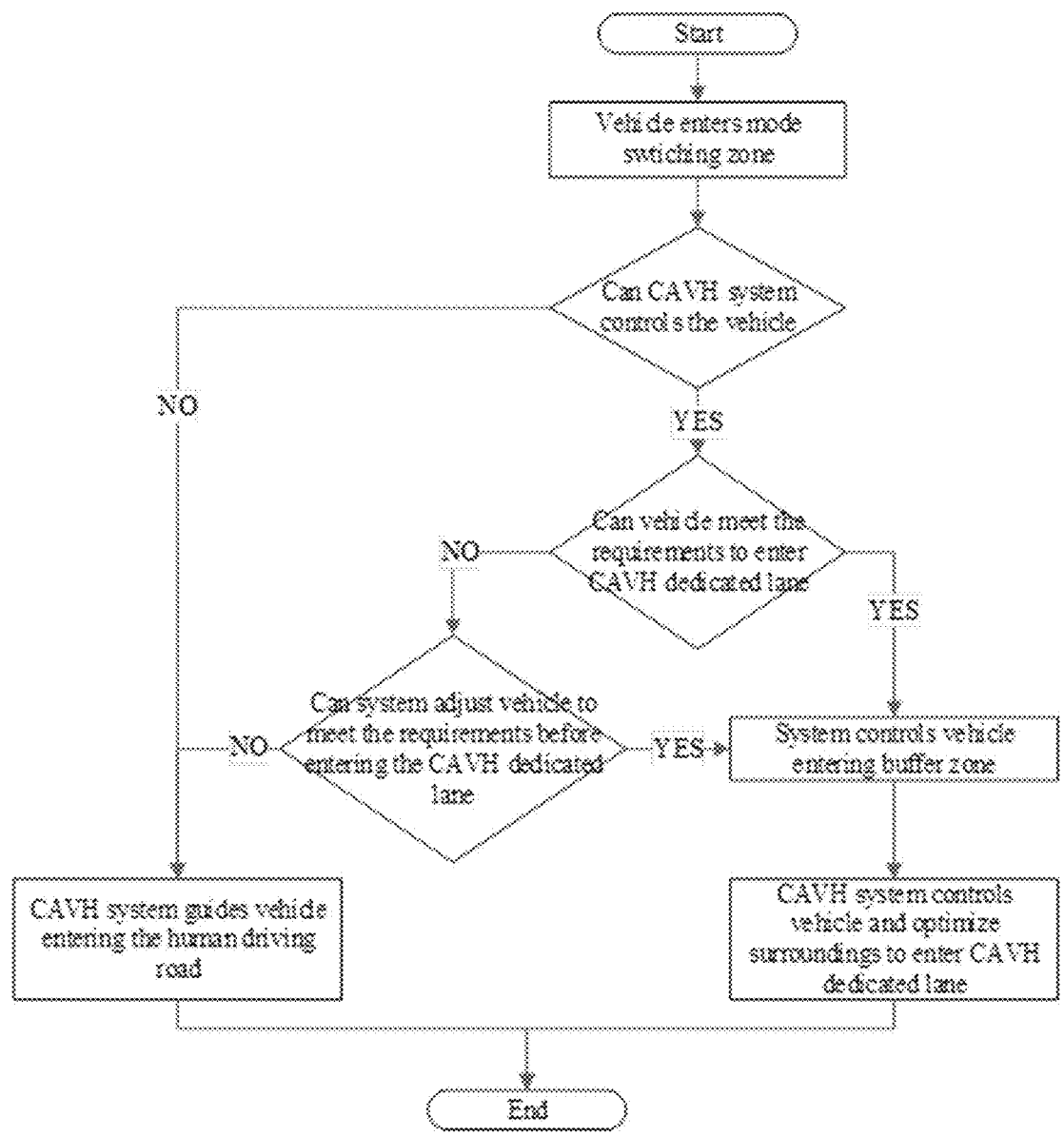
FIG. 1 is a flow chart showing a mode switching process for switching an AV from human-driven mode to automated mode upon the AV entering into a CAVH dedicated lane.

As shown in FIG. 1, in some embodiments, the technology provides a mode switching process for switching an AV from human-driven mode to automated mode upon entrance of the AV into a CAVH dedicated lane (e.g., from a human driving lane). In some embodiments, the mode switching process comprises identifying and/or detecting a vehicle entering a mode switching zone and the CAVH system determining if it can control the vehicle or not. If the system cannot control the vehicle, the system guides the vehicle to enter the human driving lane. If the system can control the vehicle, the system continues to determine if the vehicle meets requirements of the CAVH system (e.g., vehicle automation level, speed, hardware, and software) to use the CAVH dedicated lane. If the vehicle meets the requirements, the system directly controls the vehicle to enter the buffer zone, prepares the vehicle, and optimizes surroundings until the vehicle enters the CAVH dedicated lane. If the vehicle does not meet the requirements, the system then determines whether it can adjust the vehicle to meet the requirements before entering the buffer zone. If not, the system guides the vehicle to enter the human driving lane.

Figure 2:
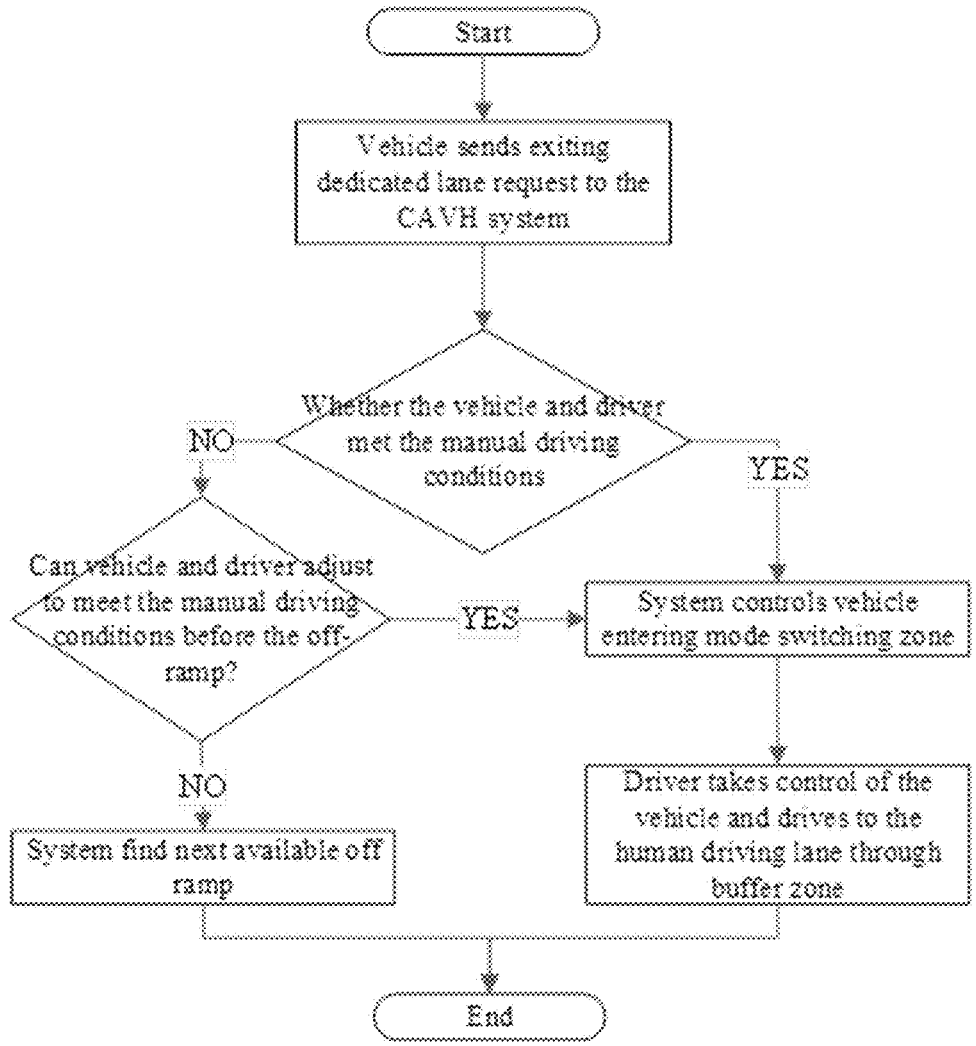
FIG. 2 is a flow chart showing a mode switching process for switching an AV from automated mode to human-driven mode upon the AV exiting from a CAVH dedicated lane.

As shown in FIG. 2, in some embodiments, the technology provides a mode switching process for switching an AV from automated mode to human-driven mode upon exit of the AV from a CAVH dedicated lane (e.g., to a human driving lane). In some embodiments, the mode switching process starts when a vehicle sends a request to the CAVH system to exit the CAVH dedicated lane and enter a human-driving lane. The system then determines if the vehicle and driver meet the manual driving conditions for human-driven mode. If conditions for human driving are met by the vehicle, the system controls the vehicle to enter a mode switch zone, allows the driver to assume control of the vehicle, and guides the vehicle to exit the CAVH dedicated lane and to enter a human driving lane through a buffer zone. If conditions for human driving are not met by the vehicle, the system determines if the vehicle and/or driver can adjust to meet the human driving conditions before the off-ramp. If the vehicle and/or driver cannot adjust to meet the human driving conditions before the off-ramp, the system finds the next available off-ramp. If the vehicle and/or driver can adjust to meet the human driving conditions before the off-ramp, the system controls the vehicle to enter the mode switch zone and guides the vehicle to the human driving lane.

Figure 3:
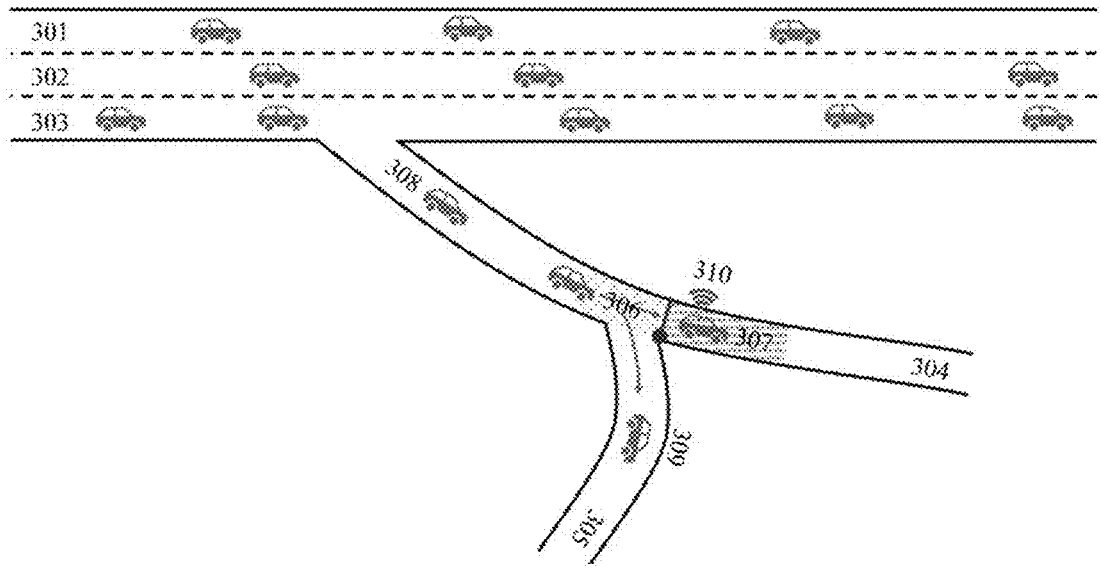
FIG. 3 is a schematic diagram showing a Type 1 on-ramp lane design for AVs entering a CAVH dedicated lane (e.g., to move from a minor road to a major road). 301: Inner lane of the minor road; 302: Middle lane of the minor road; 303: Outer lane of the minor road; 304: CAVH dedicated lane from minor to major road; 305: Ramp to the human driving road; 306: Mode switching zone; 307: Buffer zone; 308: AV in human-driven mode; 309: AV in human-driven mode; 310: AV in automated mode.

As shown in FIG. 3, in some embodiments, the technology provides a Type 1 on-ramp entry lane design for AVs entering a CAVH dedicated lane and a related mode switching process for AVs entering a CAVH dedicated lane using a Type 1 on-ramp. In some embodiments, the on-ramp provides a lane for AVs to travel from minor roads to major roads. The outer lane (303) of the minor road is connected to the inner CAVH dedicated lane (304) of the major road. If the AV meets the switching requirements, the system allows AV to complete the human-driven to AV automated mode switching process in the mode switching zone (306) on the ramp and accelerates in the buffer zone (307) to enter the CAVH dedicated lane (304). If not, the AV diverges to the human driving road through the ramp (305).

Figure 4:
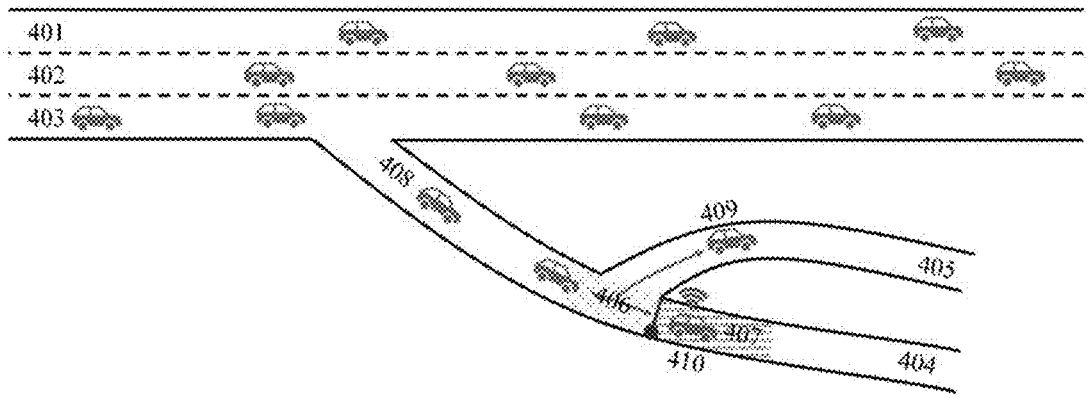
FIG. 4 is a schematic diagram showing a Type 2 on-ramp lane design for AVs entering a CAVH dedicated lane (e.g., to move from a minor road to a major road). 401: Inner lane of the minor road; 402: Middle lane of the minor road; 403: Outer lane of the minor road; 404: CAVH dedicated lane from minor to major road; 405: Ramp to the human driving road; 406: Mode switching zone; 407: Buffer zone; 408: AV in human-driven mode; 409: AV in human-driven mode; 410: AV in automated mode.

As shown in FIG. 4, in some embodiments, the technology provides a Type 2 on-ramp entry lane design for AVs entering a CAVH dedicated lane and a related mode switching process for AVs entering a CAVH dedicated lane using a Type 2 on-ramp. In some embodiments, the on-ramp provides a lane for AVs to travel from minor roads to major roads. The outer lane (403) of the minor road is connected to the inner CAVH dedicated lane (404) of the major road. If an AV meets the switching requirements, the system allows the AV to complete the human-driven to AV automated mode switching process in the mode switching zone (406) on the ramp and accelerates in the buffer zone (407) to enter the CAVH dedicated lane (404). If not, it diverges to the human driving lane through the ramp (405).

Figure 5:
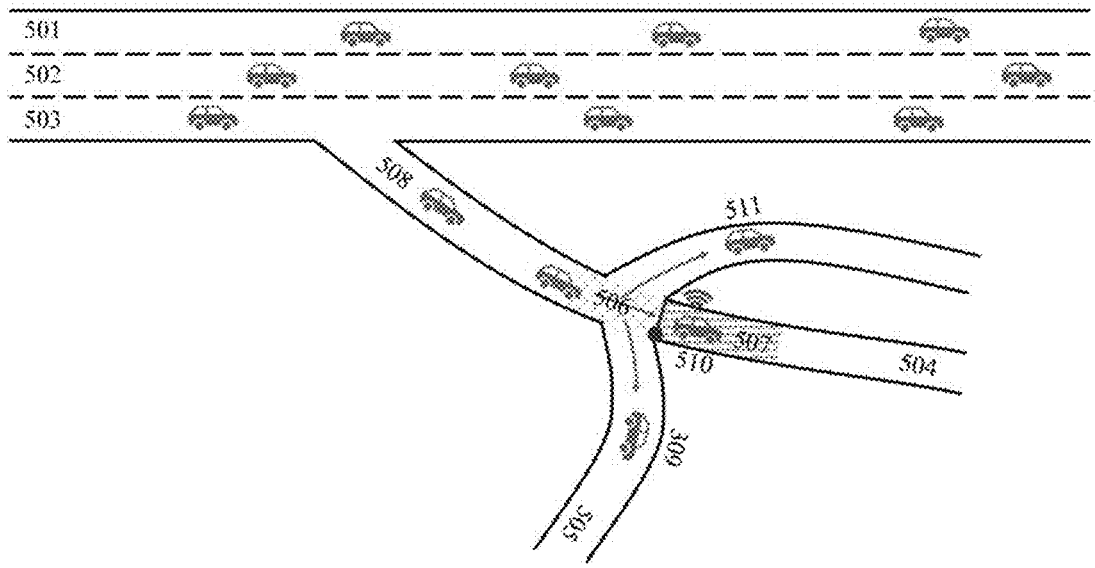
FIG. 5 is a schematic drawing showing a Type 3 on-ramp lane design for AVs entering a CAVH dedicated lane (e.g., to move from a minor road to a major road). 501: Inner lane of the minor road; 502: Middle lane of the minor road; 503.

As shown in FIG. 5, in some embodiments, the technology provides a Type 3 on-ramp lane design for AVs entering a CAVH dedicated lane and a related mode switching process for AVs entering a CAVH dedicated lane using a Type 3 on-ramp. In some embodiments, the on-ramp provides a lane for AVs to travel from minor roads to major roads. The outer lane (503) of the minor road is connected to the inner CAVH dedicated lane (504) of the major road. If the AV meets the mode switching requirements, the system allows the AV to complete the human-driven to AV automated mode switching process in the mode switching zone (506) on the ramp and accelerates in the buffer zone (507) to enter the CAVH dedicated lane (504). If not, it diverges to the human driving lane through the ramp (505).

As shown in FIG. 6, in some embodiments, the technology provides a Type 1 off-ramp lane design for AVs exiting a CAVH dedicated lane and a related mode switching process for AVs exiting a CAVH dedicated lane using a Type 1 off-ramp. In some embodiments, the off-ramp provides a lane for AVs to travel from a major road to a minor road. The inner CAVH dedicated lane (604) of the major road is connected to the outer lane of the minor road (603). The vehicle decelerates through the buffer zone (606) and enters the mode switching zone (607). In the mode switching zone (607), the system allows the AV to switch from automated mode (608) to the human-driven mode (610), and the AV merges into the outer lane (603) of the minor road.

As shown in FIG. 7, in some embodiments, the technology provides a Type 2 off-ramp lane design for AVs exiting a CAVH dedicated lane and a related mode switching process for AVs exiting a CAVH dedicated lane using a Type 2 off-ramp. In some embodiments, the off-ramp provides a lane for AVs to travel from a major road to a minor road. The inner CAVH dedicated lane (705) of the major road is connected to the outer lane (703) of the minor road. The vehicle decelerates through the buffer zone (706) and enters the mode switching zone (707). In the mode switching zone (707), the system allows the AV to switch from automated mode (706) to the human-driven mode (710), and the vehicle merges into the outer lane (703) of the minor road.

As shown in FIG. 8, in some embodiments, the technology provides a Type 3 off-ramp lane design for AVs exiting a CAVH dedicated lane and a related mode switching process for AVs exiting a CAVH dedicated lane using a Type 3 off-ramp. In some embodiments, the off-ramp provides a lane for AVs to travel from a major road to a minor road. The inner CAVH dedicated lane (805) of the major road is connected to the outer lane (803) of the minor road. The vehicle decelerates through the buffer zone (807) and enters the mode switching zone (808). In the mode switching zone (808), the system allows the AV to switch from automated mode (810) to the human-driven mode (812), and the vehicle merges into the outer lane (803) of the minor road.

As shown in FIG. 9, in some embodiments, the technology provides a Type 1 road design, system, and methods for entry of an AV into an inner automated lane on a multi-lane (e.g., two-way multi-lane) highway. In the particular embodiment shown in FIG. 9, the road section is a two-way six-lane highway, the inner lane is an automated lane, and the middle lane comprises a mode switching zone and a buffer zone. The vehicle passes through the mode switching zone and switches from the human-driven mode to the automated mode. Then, the vehicle accelerates its speed to merge into the inner automated mode lane through the buffer zone.

As shown in FIG. 10, in some embodiments, the technology provides a Type 1 road design, system, and methods for exit of an AV from an inner automated lane of a multi-lane (e.g., two-way multi-lane) highway. In the particular embodiment shown in FIG. 10, the road section is a two-way six-lane highway, the inner lane is an automated lane, and the middle lane comprises a mode switching zone and a buffer zone. The vehicle decelerates in the buffer zone and automatically switches to human-driven mode through the mode switching zone.

As shown in FIG. 11, in some embodiments, the technology provides a Type 2 road design, system, and methods for entry of an AV into an inner automated lane on a multi-lane (e.g., two-way multi-lane) highway. In the particular embodiment shown in FIG. 11, the road section is a two-way six-lane highway comprising a mode switching area that broadens for one lane for mode switching. An AV enters the mode switching area. If the requirements for automated driving are met, the AV is accelerated through the buffer zone and into the automated lane to complete the switching process from human-driven mode to automated mode. If the requirements for automated driving are not met, the vehicle moves out of the mode switching area into the normal lane.

As shown in FIG. 12, in some embodiments, the technology provides a Type 2 road design, system, and methods for exit of an AV from an inner automated lane on a multi-lane (e.g., two-way multi-lane) highway. In the particular embodiment shown in FIG. 12, the road section is a two-way six-lane highway comprising a mode switching area that broadens for one lane for mode switching. The vehicle that needs to drive out of the automated lane enters the buffer zone to slow down. Then, it enters the mode switching area, switches from automated mode to human-driven mode, and finally moves into the human-driven lane.

As shown in FIG. 13, in some embodiments, the technology provides a Type 3 road design, system, and methods for controlling entry of vehicles (e.g., human-driven and/or automated vehicles) into an automated lane of a multi-lane (e.g., a two-way multi-lane) highway. In the particular embodiment shown in FIG. 13, the road section is a two-way six-lane highway and the innermost lane is an automated lane comprising a mode switching zone and a buffer zone. For switching from human-driven mode to automated driving mode, the vehicle passes through the mode switching area. If the requirements for automated driving are met, the vehicle switches from human-driven mode to automated mode and the vehicle continues straight into the automated lane. Otherwise, the vehicle moves into the normal lane. For switching automated driving mode to human-driven mode, the vehicle enters the mode switching zone after decelerating through the buffer zone, switches from automated mode to human-driven mode, and continues straight into the normal lane to complete the automated mode to human-driven mode switching process.

As shown in FIG. 14, in some embodiments, the technology provides a Type 1 road design, system, and methods for entry of an AV into a middle automated lane of a multi-lane (e.g., two-way multi-lane) highway. In the particular embodiment shown in FIG. 14, the road section is a two-way six-lane highway, the middle lane is an automated lane, and the innermost lane and the outermost lane are normal lanes. One or both of the normal lanes comprise a mode switching zone and a buffer zone. The vehicle switches to automated mode while passing through the mode switching zone and accelerates into the middle automated lane through the buffer zone. The positions of the mode switching zones and the buffer zones of the innermost lane and the outermost lane are not limited in their positions relative to each other and may be different than shown in the figure.

As shown in FIG. 15, in some embodiments, the technology provides a Type 1 road design, system, and methods for exit of an AV from a middle automated lane of a multi-lane (e.g., two-way multi-lane) highway. In the particular embodiment shown in FIG. 15, the road section is a two-way six-lane highway, the middle lane is an automated lane, and the innermost lane and the outermost lane are normal lanes. One or both of the normal lanes comprise a mode switching zone and a buffer zone. The vehicle decelerates in the buffer zone and switches from automated mode to human-driven mode while passing through the mode switching zone. The positions of the mode switching zones and the buffer zones of the innermost lane and the outermost lane are not limited in their positions relative to each other and may be different than shown in the figure.

As shown in FIG. 16, in some embodiments, the technology provides a Type 2 road design, system, and methods for entry of an AV into a middle automated lane of a multi-lane (e.g., two-way multi-lane) highway. In the particular embodiment shown in FIG. 16, the road section is a two-way six-lane highway, the middle lane is an automated lane, and the innermost lane and the outermost lane are normal lanes. The two normal lanes are widened to provide mode switching zones for mode switching. The AV enters the mode switching zone before driving into the automated lane. If the automated driving requirements are met, the AV moves into the automated lane through the buffer zone to switch from human-driven to automated mode. If the automated driving requirements are not met, the AV exits the mode switching zone and moves to the human-driven lane. The positions of the widened segments of the innermost lane and the outermost lane to provide the mode switching zones are not limited in their positions relative to each other and may be different than shown in the figure.

As shown in FIG. 17, in some embodiments, the technology provides a Type 2 road design, system, and methods for exit of an AV from a middle automated lane of a multi-lane (e.g., two-way multi-lane) highway. In the particular embodiment shown in FIG. 17, the road section is a two-way six lane highway, the middle lane is an automated lane, and the innermost and the outermost lane are normal lanes. The two normal lanes are widened to provide mode switching zones for mode switching. The AV enters the buffer zone and slows, then enters the mode switching zone and switches from automated mode to human-driven mode, and finally moves from the automated lane into the human-driven lane. The positions of the widened segments of the innermost lane and the outermost lane to provide the mode switching zones are not limited in their positions relative to each other and may be different than shown in the figure.

As shown in FIG. 18, in some embodiments, the technology provides a Type 3 road design, system, and methods for entry of an AV into a middle automated lane of a multi-lane (e.g., two-way multi-lane) highway and exit of an AV from a middle automated lane of a multi-lane (e.g., two-way multi-lane) highway. In the particular embodiment shown in FIG. 18, the road section is a two-way six-lane highway, the middle lane is an automated lane comprising mode switching zones and buffer zones, and the innermost and the outermost lane are normal lanes. For switching from human-driven mode to automated mode, a vehicle passes through a mode switching zone. If the requirements for automated driving are met, the vehicle switches from human-driven mode to automated mode and goes continues straight into the automated lane. Otherwise, the vehicle moves into the normal lane. For switching from automated mode to human-driven mode, the vehicle enters the mode switching zone after slowing in the buffer zone, switches from automated mode to human-driven mode, and continues straight into the human-driven lane to complete the switching process.

As shown in FIG. 19, in some embodiments, the technology provides a Type 1 road design, system, and methods for entry of an AV into an outer automated lane on a multi-lane (e.g., two-way multi-lane) highway. In the particular embodiment shown in FIG. 19, the road section is a two-way six lane highway, the outer lane is an automated lane, and the middle lane comprises a mode switching zone and a buffer zone. The vehicle passes through the mode switching zone and switches from human-driven mode to automated mode. Then, the vehicle accelerates its speed to merge into the automated mode lane through the buffer zone.

As shown in FIG. 20, in some embodiments, the technology provides a Type 1 road design, system, and methods for exit of an AV from an outer automated lane of a multi-lane (e.g., two-way multi-lane) highway. In the particular embodiment shown in FIG. 20, the road section is a two-way six lane highway, the outer lane is an automated lane, and the middle lane comprises a mode switching zone and a buffer zone. The vehicle decelerates in the buffer zone and automatically switches to human-driven mode while passing through the mode switching zone.

As shown in FIG. 21, in some embodiments, the technology provides a Type 2 road design, system, and methods for entry of an AV into an outer automated lane on a multi-lane (e.g., two-way multi-lane) highway. In the particular embodiment shown in FIG. 21, the road section is a two-way six-lane highway comprising a mode switching area that broadens for one lane for mode switching. An AV enters the mode switching area. If the requirements for automated driving are met, the AV is accelerated through the buffer zone into the automated lane to complete the switching process from the human-driven mode to the automated mode. If the requirements for automated driving are not met, the vehicle moves out of the mode switching area into the normal lane.

As shown in FIG. 22, in some embodiments, the technology provides a Type 2 road design, system, and methods for exit of an AV from an outer automated lane on a multi-lane (e.g., two-way multi-lane) highway. In the particular embodiment shown in FIG. 22, the road section is a two-way six-lane highway comprising a mode switching area that broadens for one lane for mode switching. The vehicle that needs to drive out of the automated lane enters the buffer zone to slow down. Then, it enters the mode switching area, switches from automated mode to human-driven mode, and finally moves into the human-driven lane.

As shown in FIG. 23, in some embodiments, the technology provides a Type 3 road design, system, and methods for controlling entry of vehicles (e.g., human-driven and/or automated vehicles) into an automated lane of a multi-lane (e.g., a two-way multi-lane) highway. In the particular embodiment shown in FIG. 23, the road section is a two-way six-lane highway and the outermost lane is an automated lane comprising a mode switching zone and a buffer zone. For switching from human-driven mode to automated mode, the vehicle passes through the mode switching area. If the requirements for automated driving are met, the vehicle switches from human-driven mode to automated mode and the vehicle continues straight into the automated lane. Otherwise, the vehicle moves into the normal lane. For switching from automated driving mode to human-driven mode, the vehicle enters the mode switching zone after decelerating through the buffer zone, switches from automated mode to human-driven mode, and continues straight into the normal lane to complete the automated mode to human-driven mode switching process.

As shown in FIG. 24, in some embodiments, the technology provides a Type 1 road design, system, and methods for entry of an AV into an inner automated lane on a multi-lane (e.g., two-way multi-lane) highway. In the particular embodiment shown in FIG. 24, the road section is a two-way eight-lane highway, the two innermost lanes are automated lanes, and a lane adjacent to the automated lanes (e.g., the third lane) comprises a mode switching zone and a buffer zone. The vehicle passes through the mode switching zone and switches from the human-driven mode to the automated mode. Then, the vehicle accelerates its speed to merge into the inner automated mode lane through the buffer zone.

As shown in FIG. 25, in some embodiments, the technology provides a Type 1 road design, system, and methods for exit of an AV from an inner automated lane of a multi-lane (e.g., two-way multi-lane) highway. In the particular embodiment shown in FIG. 25, the road section is a two-way eight-lane highway, the two innermost lanes are automated lanes, and a lane adjacent to the automated lanes (e.g., the third lane) comprises a mode switching zone and a buffer zone. The vehicle decelerates in the buffer zone and automatically switches to human-driven mode through the mode switching zone.

As shown in FIG. 26, in some embodiments, the technology provides a Type 2 road design, system, and methods for entry of an AV into an inner automated lane on a multi-lane (e.g., two-way multi-lane) highway. In the particular embodiment shown in FIG. 26, the road section is a two-way eight-lane highway comprising a mode switching area that broadens for one lane for mode switching. An AV enters the mode switching area. If the requirements for automated driving are met, the AV is accelerated through the buffer zone and into the automated lane to complete the switching process from human-driven mode to automated mode. If the requirements for automated driving are not met, the vehicle moves out of the mode switching area into the normal lane.

As shown in FIG. 27, in some embodiments, the technology provides a Type 2 road design, system, and methods for exit of an AV from an inner automated lane on a multi-lane (e.g., two-way multi-lane) highway. In the particular embodiment shown in FIG. 27, the road section is a two-way eight lane highway comprising a mode switching area that broadens for one lane for mode switching. The vehicle that needs to drive out of the automated lane enters the buffer zone to slow down. Then, it enters the mode switching area, switches from automated mode to human-driven mode, and finally moves into the human-driven lane.

As shown in FIG. 28, in some embodiments, the technology provides a Type 3 road design, system, and methods for controlling entry of vehicles (e.g., human-driven and/or automated vehicles) into an automated lane of a multi-lane (e.g., a two-way multi-lane) highway. In the particular embodiment shown in FIG. 28, the road section is a two-way eight-lane highway and the two innermost lanes are automated lanes. One or both of the automated lanes comprise a mode switching zone and a buffer zone. For switching from human-driven mode to automated driving mode, the vehicle passes through the mode switching area. If the requirements for automated driving are met, the vehicle switches from human-driven mode to automated mode and the vehicle continues straight into the automated lane. Otherwise, the vehicle moves into the normal lane. For switching automated driving mode to human-driven mode, the vehicle enters the mode switching zone after decelerating through the buffer zone, switches from automated mode to human-driven mode, and continues straight into the normal lane to complete the automated mode to human-driven mode switching process.

As shown in FIG. 29, in some embodiments, the technology provides a Type 1 road design, system, and methods for entry of an AV into an inner automated lane on a multi-lane (e.g., two-way multi-lane) highway. In the particular embodiment shown in FIG. 29, the road section is a two-way ten-lane highway, the inner lane is an automated lane, and a lane adjacent to the automated lane (e.g., the second lane) comprises a mode switching zone and a buffer zone. The vehicle passes through the mode switching zone and switches from the human-driven mode to the automated mode. Then, the vehicle accelerates its speed to merge into the inner automated mode lane through the buffer zone.

As shown in FIG. 30, in some embodiments, the technology provides a Type 1 road design, system, and methods for exit of an AV from an inner automated lane of a multi-lane (e.g., two-way multi-lane) highway. In the particular embodiment shown in FIG. 30, the road section is a two-way ten-lane highway, the inner lane is an automated lane, and a lane adjacent to the automated lane (e.g., the second lane) comprises a mode switching zone and a buffer zone. The vehicle decelerates in the buffer zone and automatically switches to human-driven mode through the mode switching zone.

As shown in FIG. 31, in some embodiments, the technology provides a Type 2 road design, system, and methods for entry of an AV into an inner automated lane on a multi-lane (e.g., two-way multi-lane) highway. In the particular embodiment shown in FIG. 31, the road section is a two-way ten-lane highway comprising a mode switching area that broadens for one lane for mode switching. An AV enters the mode switching area. If the requirements for automated driving are met, the AV is accelerated through the buffer zone and into the automated lane to complete the switching process from human-driven mode to automated mode. If the requirements for automated driving are not met, the vehicle moves out of the mode switching area into the normal lane.

As shown in FIG. 32, in some embodiments, the technology provides a Type 2 road design, system, and methods for exit of an AV from an inner automated lane on a multi-lane (e.g., two-way multi-lane) highway. In the particular embodiment shown in FIG. 32, the road section is a two-way ten-lane highway comprising a mode switching area that broadens for one lane for mode switching. The vehicle that needs to drive out of the automated lane enters the buffer zone to slow down. Then, it enters the mode switching area, switches from automated mode to human-driven mode, and finally moves into the human-driven lane.

As shown in FIG. 33, in some embodiments, the technology provides a Type 3 road design, system, and methods for controlling entry of vehicles (e.g., human-driven and/or automated vehicles) into an automated lane of a multi-lane (e.g., a two-way multi-lane) highway. In the particular embodiment shown in FIG. 33, the road section is a two-way ten-lane highway and the innermost lane is an automated lane comprising a mode switching zone and a buffer zone. For switching from human-driven mode to automated driving mode, the vehicle passes through the mode switching area. If the requirements for automated driving are met, the vehicle switches from human-driven mode to automated mode and the vehicle continues straight into the automated lane. Otherwise, the vehicle moves into the normal lane. For switching automated driving mode to human-driven mode, the vehicle enters the mode switching zone after decelerating through the buffer zone, switches from automated mode to human-driven mode, and continues straight into the normal lane to complete the automated mode to human-driven mode switching process.

As shown in FIG. 34A-34C, in some embodiments, the technology provides road designs, systems, and methods for lane merging, diverging, and overtaking. In some embodiments, different types of vehicles travel on their corresponding lanes using different entries and exits for merging, diverging, and/or overtaking. In some embodiments the system, road geometry scenarios comprise, e.g., 1) lane types including extended merge/diverge lanes, major lanes, and conventional merge/diverge lanes for automated and human-driven vehicles; 2) road types including human driven lanes and automated lanes; 3) vehicle types including human-driven vehicles and AVs. In some embodiments, the technology provides a merge/diverge module that provides systems configured to provide extended merging/diverging and/or conventional (e.g., human-driven) merging/diverging and, in some embodiments, systems configured to provide a direct departure process for extended merging/diverging and a merging/diverging process for conventional (e.g., human-driven) lanes involving mode switching. In some embodiments, the technology provides an overtaking module that provides systems configured to provide passing/overtaking (e.g., through an opposite lane and/or an emergency lane) for human-driven and/or automated mode vehicles. In some embodiments, the overtaking module provides systems configured to provide passing/overtaking on special lanes for automated vehicles (e.g., for only automated vehicles).

As shown in FIG. 35, in some embodiments, the technology provides systems and methods for controlling merging of automated vehicles. In some embodiments, systems and methods detect and/or collect basic vehicle information (e.g., speed, direction, acceleration (e.g., turning), road gradient, road geometry), e.g., by a road-side unit (RSU) and/or by an on-board unit (e.g., OBU). In some embodiments, the systems and methods calculate an appropriate velocity (e.g., speed and direction) and/or acceleration for vehicles. After that, in some embodiments, the information is transmitted to a traffic operation center (TOC), which is a control center that managing vehicle-road cooperation, for decision-making and vehicle control. When a vehicle makes a merge/diverge request, the TOC directly controls traffic control infrastructure (e.g., signal lights, gates) installed at the entrance of the human-driven lane to ensure the vehicle can merge into the main road safely. Further, in some embodiments, the AV is directly controlled by an RSU to complete the merge to the automated lane and the human-driven vehicle completes the merge according to the signal lights. In some embodiments, when the merging/diverging AV is in the human-driven mode, the TOC will control the vehicle to enter the target lane.

As shown in FIG. 36, in some embodiments, the technology provides systems and methods for overtaking (e.g., by automated vehicles in an automated lane). For example, in some embodiments, an RSU and/or an OBU detect the speed, road gradient, and turning information for vehicles, provide precise acceleration instructions to the vehicles, and transmit the information and instructions to the CAVH TOC. In some exemplary embodiments, if an overtaking lane exists (e.g., for an AV), the TOC makes the decisions and controls the vehicle (e.g., a vehicle is controlled to enter into an overtaking lane when a safe overtaking distance is detected). After completing the overtaking and driving to a safe lane change position, the vehicle is controlled to drive back to the original lane. If an overtaking lane does not exist, embodiments provide that overtaking uses an opposite lane and vehicles are controlled by the TOC. In addition, in some embodiments, overtaking uses an emergency lane, e.g., when overtaking using a dedicated overtaking lane or using an opposite lane cannot be implemented.

As shown in FIG. 37, in some embodiments, the technology provides road designs, systems, and methods for vehicle merging, diverging, and overtaking. In some embodiments, a fixed barrier is not provided between the two travel directions. Further, in some embodiments, automated lanes are inner lanes (e.g., the second and third lanes, e.g., as shown in FIG. 37) and the road comprises an extended merging/diverging lane. In particular, in some embodiments, the technology provides road designs, methods, and systems for merging. As shown in the example provided in FIG. 37, the AV 3707 completes a merging operation on the expanded merge lane (off-ramp), e.g., according to a system and/or method in which the vehicle makes a request to merge into the automated lane and a TOC receives the request. The vehicle enters a parallel buffer position 3708 on an extended lane. The TOC reviews the merging criteria and vehicle capabilities for a safe merge (e.g., lane change) and determines whether to grant the merge request or deny the merge request. If granted, the AV completes the merging maneuver to the target lane 3709 when the criteria of safe lane change are satisfied.

In some embodiments, the technology provides road designs, methods, and systems for diverging. As shown in the example provided in FIG. 37, the AV 3710 completes a diverging operation on the expanded diverge lane (on-ramp), e.g., according to a system and/or method in which the vehicle enters a parallel buffer position 3711 on the expanded merge lane and performs human-driven diverging from 3712. In some embodiments, the human-driven vehicles 3716 and 3717 can use the conventional merging and diverging rules, wherein the extended merge and diverge lanes (e.g., positions 3708 and 3711) are provided in adjacent human-driven lanes, so the adjacent human-driven lanes are combined with emergency lanes on the same side.

In some embodiments, the technology provides road designs, methods, and systems for overtaking. As shown in the example provided in FIG. 37, the AV 3713 makes an overtaking request and a TOC receives the request. The TOC performs decision making processes and controls the AV 3713 to the position 3714 on the contraflow automated-driven lane, e.g., when overtaking through the opposite lane is safe. After the overtaking is completed and a safe distance for changing lanes is satisfied, the vehicle controlled by the system returns to the original lane 3715 to complete the overtaking.

In some embodiments, for a human-driven vehicle, the TOC switches the landmark line of the automated lane according to the vehicle status of the current road segment. For example, when the surface line of a current segment is a dotted line comprising long and short line segments, this road marking indicates that the human-driven vehicle can overtake through the opposite lane by using the adjacent automated lane. When the surface line of a current segment is a continuous solid line, the road marking indicates that the overtaking method is not allowed. In some embodiments, a human-driven vehicle can perform the overtaking on an emergency lane under the condition that an emergency lane exists. In some embodiments, the technology provides overtaking procedures for a human-driven vehicle. In one exemplary scene, when the human-driven vehicle 3718 needs to overtake, the vehicle enters the adjacent automated dedicated lane 3719 (e.g., if allowed). After the vehicle completes overtaking, the vehicle returns to the original lane 3720 using a save driving maneuver to ensure the safety of the AVs. In a second exemplary scene, when the human-driven vehicle 3721 needs to overtake, the vehicle travels on the automated lane 3722. After the overtaking is completed, the vehicle returns to the original lane 3723.

As shown in FIG. 38, in some embodiments, the technology provides road designs, methods, and systems for lane entry of vehicles. In some embodiments, a fixed barrier (e.g., a central median 3814) is provided between the two travel directions. Further, in some embodiments, automated lanes are outer lanes (e.g., the first and fourth lanes, e.g., as shown in FIG. 38) and the road comprises merging/diverging lanes and, optionally, lanes for overtaking. FIG. 38 shows an exemplary mixed scene in which vehicles perform lane entry with merging, diverging, and overtaking. In the exemplary road design shown in FIG. 38, the automated lanes are located on both sides of the road and AVs 3801 and 3802 can enter and exit the major road following conventional driving rules as controlled and managed by the planning and decision functions of the TOC system. A traffic light 3813 is provided at the entrance of the lane, e.g., to minimize and/or eliminate obstructing the adjacent lane by the merging of the human-driven vehicle 3807. The human-driven lane includes an extended re-diverge lane to minimize and/or eliminate conflicts of human-driven vehicles (e.g., 3809) with automated vehicles during the approach of the human-driven lane vehicles. In some embodiments, the vehicle driver controls the vehicle 3809 to enter the diverging lane buffer zone (e.g., to maximize safety) and exits the major road.

In some embodiments, the TOC manages traffic and controls a vehicle making a request to overtake, e.g., using an emergency lane. For example, an automated vehicle (e.g., 3803) makes an overtaking request, which is evaluated by the TOC. If the request is granted by the TOC, the vehicle is controlled to use the emergency lane for overtaking. When a human-driven car (e.g., 3810) makes a request for overtaking, embodiments provide that the driver selects the overtaking according to the line marking of the automated lane on the adjacent side. In particular, when overtaking through the opposite lane is allowed, the driver controls the vehicle for overtaking. After the overtaking is completed, the vehicle returns to the original driving lane. If overtaking is prohibited on the road section, the vehicle not allowed to overtake.

As shown in FIG. 39, in some embodiments, the technology provides road designs, systems, and methods for merging, diverging, and overtaking in hybrid situations in which inner lanes are automated lanes and merge and diverge lanes are not provided. FIG. 39 shows an exemplary embodiment in which lanes 2, 3, and 4 are automated lanes and there is no additional merge or diverge lanes. In some embodiments, the middle lane is a specialized lane that is used for overtaking. In some embodiments, the width of the lanes for AVs is narrower than the lanes for human-driven vehicles. When the AV 3901 sends a request for overtaking, the TOC performs decision making functions and controls the AV 3901 to change lanes to the central overtaking lane (to place the AV at position 3902). When the overtaking is completed and the vehicle can safely return to its original lane, the TOC performs decision making functions and controls the AV 3902 to change lanes to the original lane (to place the AV at position 3903). In some embodiments, the technology provides systems and methods for overtaking by a human-driven vehicle. In particular, (e.g., when the automated lane is forbidden to use), an emergency lane is used to complete the overtaking, which is illustrated with by the vehicle moving from position 3904, to 3905, and to 3906. When an automated lane is available for use, the human-driven vehicle can overtake using the adjacent lane for AVs, which is illustrated by the vehicle moving from 3907, to 3908, and to 3909.

As shown in FIG. 40A and FIG. 40B, in some embodiments, the technology provides road designs, methods, and systems for overtaking on roads comprising tidal lanes (e.g., comprising dynamic barriers, and/or a central median). In the exemplary scene shown in FIGS. 40A and 40B, the road is a two-way, multi-tidal-lane (e.g., four-tidal-lane) roadway. The pavement marking indicator for the automated lane is switched to dashed segments with equal length (e.g., as shown in FIG. 40A and FIG. 40B). In addition, the mode indicators 4001 and 4002 are set at the start and end of the tidal section to provide information to drivers that indicate the traffic directions of tidal lanes. For vehicles on tidal lanes, if vehicles are on the human-driven lane, both AVs and human-driven vehicles are in the human-driven mode. In some embodiments comprising multiple combinations of automated and human-driven lanes, the driving rules provided in FIG. 4, FIG. 5, and FIG. 6 are followed.

As shown in FIG. 41A and FIG. 41B, in some embodiments, the technology provides road designs, methods, and systems for merging and diverging (e.g., to enter roads) on roads without an extended merge/diverge lane (e.g., comprising a dynamic barrier and/or a central median). In some embodiments, inner lanes are automated lanes (e.g., 2nd and 3rd lanes) and roads do not comprise an extended emerge/diverge lane. On some segments that do not comprise an extended merge lane and/or where an extended merge lane cannot be easily added, AVs and human-driven vehicles share the same entrance. The AVs are in human-driven mode before entering the major lane. In the embodiments shown in FIG. 41A and FIG. 41B, the merging AV moves from the position indicated by 4101 to the position 4102 and 4103; and merging human-driven vehicles move from the position indicated by 4104 to the position indicated by 4105.

As shown in FIG. 42, in some embodiments, the technology provides road designs, methods, and systems for merging and diverging (e.g., to exit roads) on roads without an extended merge/diverge lane (e.g., comprising a dynamic barrier and/or a central median). In some embodiments, inner lanes are automated lanes (e.g., 2nd and 3rd lanes) and roads do not comprise an extended merge/diverge lane. On some segments that do not comprise an extended merge lane and/or where an extended merge lane cannot be easily added, AVs and human-driven vehicles share the same exit. When safe, vehicle 4201 moves from the inner automated lane to the outer lane and switches modes to the human-driven mode. Then the driver assumes control of the vehicle and exits the lane, as shown by the change in vehicle positions from the position indicated by 4201 to the positions indicated by 4202 and 4203. Human-driven vehicles exit according to common driving rules, as shown by the vehicle changing positions from the position indicated by 4204 to the position indicated by 4205.

As shown in FIG. 43, in some embodiments, the technology provides systems and methods for emergency response (e.g., after an accident). For example, in some embodiments, an RSU collects accident information and sends the information to a rescue center. Then, the rescue center evaluates the type of accident and performs decision making functions to determine whether to dispatch a rescue vehicle. If the rescue center chooses to dispatch a rescue vehicle, different schemes are implemented according to the lane choice of the rescue vehicle (FIG. 43).

For example, as shown in FIG. 44, in some embodiments, the technology provides systems and methods for emergency response (e.g., after an accident) on a main road in-plane two-way road section. In FIGS. 44, 4401 and 4404 are automated lanes. If an accident occurs in an automated lane, rescue vehicles are dispatched using human-driven lanes in both directions or using the automated lane to access the accident. If the accident occurs in the human-driven lane, the rescue procedure is the same. 4401: Automated lane; 4402: Human driving lane; 4403: Human driving lane; 4404: Automated lane; 4405: The route of the rescue vehicle moving from the human driving lane to the accident point on the automated lane; 4406: The route of the rescue vehicle moving to the accident point on the automated lane; 4407: The route of the rescue vehicle moving from the human driving lane in the other direction to the accident point on the automated lane.

Additionally, as shown in FIG. 45, in some embodiments, the technology provides systems and methods for emergency response (e.g., after an accident) at a road entrance of an in-plane two-way road section. In FIGS. 45, 4502 and 4503 are automated lanes. If the accident occurs at the onramp area of the automated lane, the rescue vehicles use automated lanes in both directions and the onramp of the automated lane to access the accident. If the accident occurs at the onramp area of the human-driven lane ramp, the rescue vehicle uses the human-driven lane onramp to access the accident scene. 4501: Human driving lane; 4502: Automated lane; 4503: Automated lane; 4504: Human driving lane; 4505: The route of the rescue vehicle moving to the accident point on the automated lane; 4506: The route of the rescue vehicle moving from the automated lane in the other direction to the accident point on the automated lane; 4507: The route of the rescue vehicle moving from the onramp to the accident point on the automated lane.

Further, as shown in FIG. 46, in some embodiments, the technology provides systems and methods for emergency response (e.g., after an accident) at a road exit of an in-plane two-way road section. In FIGS. 46, 4602 and 4603 are automated lanes. If the accident occurs at the offramp area of the automated lane, the rescue vehicles use automated lanes in both directions and the offramp of the automated lane to access the accident. If the accident occurs at the offramp area of the human-driven lane, the rescue vehicles use the human-driven lane, the automated lane, the reverse automated lane, the reverse human-driven lane exit, and/or the reverse automated lane exit to access the accident. 4601: Human driving lane; 4602: Automated lane; 4603: Automated lane; 4604: Human driving lane; 4605: The route of the rescue vehicle moving from the automated lane in the other direction to the accident point on the automated lane; 4606: The route of the rescue vehicle moving to the accident point on the automated lane; 4607: The route of the rescue vehicle moving from the offramp to the accident point on the automated lane.

In some embodiments, as shown in FIG. 47, the technology provides an urban expressway vehicle-road cooperative automated driving system. In some embodiments, the urban expressway vehicle-road cooperative automated driving system module comprises an automated lane/human-driven lane switching module, an automated lane merging/diverging module, and/or an automated lane/human-driven lane crossing module. In some embodiments, as shown in FIG. 48, vehicles on the urban expressway vehicle-road cooperative automated system include, e.g., AV, human-driven vehicles, and AV under human-driven mode. In some embodiments, the system detects and/or determines the statuses of vehicles on the road and the intersection signal status of the automated lanes and/or human-driven lanes is/are determined by the statuses of the vehicles. For example, the AVs under human-driven mode and the human-driven vehicles are subject to the signal light control and enter their target lanes after passing the intersection.

In some embodiments, as shown in FIG. 49, the technology provides methods and systems for switching an AV from human-driven mode to automated mode. For example, in some embodiments, a mode switching request is sent by an AV to the system when the vehicle passes the mode switching zone. Next, the CAVH control center determines whether mode switching requirements are met by the AV. If the requirements are met, the system assumes control of the vehicle; if the requirements are not met, the vehicle returns to the human-driven lane. After the system assumes control of the vehicle, the system controls the vehicle to complete the acceleration process through the buffer zone, e.g., to achieve an optimized speed and/or to group AVs to form platoons. At this point, the vehicle completes the process of switching from the human driven mode to the automated mode. In some embodiments, the CAVH control center updates the status of the associated traffic lights based on the real-time traffic status.

In some embodiments, as shown in FIG. 50, the technology provides methods and systems for switching an AV from an automated mode to a human-driven mode. For example, in some embodiments, a mode switching request is sent by an AV to the system when the vehicle passes the mode switching zone. Next, the CAVH control center determines whether mode switching requirements are met by the AV. If the requirements are met, the driver is prompted to assume control of the vehicle; if the requirements are not met, the vehicle continues driving on the automated lane. After the driver assumes control of the vehicle, the driver controls the vehicle to complete the deceleration process through the buffer zone and enters the human-driven lane. At this point, the vehicle completes the process of switching to the human-driven lane. In some embodiments, the CAVH Control Center optimizes the remaining AV speeds on the automated lanes and regroups them to form platoons. In some embodiments, the CAVH Control Center updates the status of the associated traffic lights based on the real-time traffic status.

In some embodiments, as shown in FIG. 51, the technology provides methods and systems for controlling vehicles (e.g., on automated lanes and/or human-driven lanes) to move through a signalized intersection. In some embodiments, methods and systems comprise: 1) controlling human-driven vehicles entering a human-driven lane after passing through an intersection; and 2) controlling AV under human-driven mode entering the automated lane after passing through the intersection. These two processes follow the same set of signal commands issued by the CAVH control center. In particular, when a human-driven vehicle travels to an intersection, if it encounters a red light, it waits until the signal light turns to green and then enters the target human-driven lane through the intersection according to the road sign. When an AV under human-driven mode travels to the mode switching zone in front of the intersection, a mode switching request is sent to the CAVH control center and the CAVH control center accepts the request and controls the vehicle. If a red light is encountered, the system waits until the signal light changes to green and then the system controls the vehicle to enter the automated lane. At the same time, the CAVH Control Center optimizes the traffic speed of the automated lanes and regroups vehicles to form platoons. The CAVH Control Center updates the status of the associated traffic lights based on the real-time traffic status. At this point, the vehicle completes the automated lane/human-driven lane intersection process with signal light control.

In some embodiments, as shown in FIG. 52, the technology provides road designs, methods, and systems for mode switching and/or lane changing, e.g., to move from a human-driven lane to an automated lane. In FIG. 52, lane 1 is an automated lane and lane 2 comprises a mode switching zone (MSZ) and a buffer zone (BZ). The vehicle switches to the automated mode after passing through the mode switching zone and then merges to the automated lane after passing through the buffer zone.

In some embodiments, as shown in FIG. 53, the technology provides Type 1 road designs, methods, and systems for mode switching and/or lane changing, e.g., to move from an automated lane to a human-driven lane. In particular, FIG. 53 shows a Type 1 dedicated automated lane for AVs diverging from the inner automated lane (5301). In the particular embodiment shown in FIG. 53, the road section is a two-way six-lane road. In FIG. 53, the inner lane (5301)

is an automated lane and the middle lane (5302) comprises a mode-switching zone (5306) and buffer zone (5305). The vehicles (5308) slow in the buffer zone (5305) and then switch to human-driven mode through the mode-switching zone (5306).

In some embodiments, as shown in FIG. 54, the technology provides Type 2 road designs, methods, and systems for mode switching and/or lane changing, e.g., to move from an automated lane to a human-driven lane. In particular, FIG. 54 shows a Type 2 dedicated automated lane where AVs merge into and diverge from an inner automated lane (5401). In the particular embodiment shown in FIG. 54, the major road is a two-way six-lane road. The inner lane is a partial automated lane (e.g., comprising both automated and human-driven sections) with a mode switching zone (5405 and 5407) and a buffer zone (5405). In some embodiments, the procedure for mode switching from human-driven to automated mode comprises vehicles (5408) passing through the mode switching zone (5405). If the vehicles complete the switching procedure from the human-driven mode to automated mode, they enter the automated lane (5401). Otherwise, vehicles move to the human-driven lane (5402). In some embodiments, the procedure of switching from automated to human-driven mode comprises vehicles (5409) slowing and driving through the mode switching zone (5407); switching from automated mode to human-driven mode; and proceeding to the human-driven lane (5402).

In some embodiments, as shown in FIG. 55, the technology provides Type 1 road designs, methods, and systems for merging. In particular, FIG. 55 shows a Type 1 dedicated lane for vehicles merging from a minor road into an automated lane where the outer lane is an automated lane (5503). In the particular embodiment shown in FIG. 55, the major road is a two-way six-lane road and the outer lane (5503) is automated lane. The minor road is a one-way two-lane road. The human-driven vehicles (5510) on the inner lane of the minor road (5504) could choose to enter the outer automated lane (5503) or the human-driven lane (5502) of the major road.

In some embodiments, as shown in FIG. 56, the technology provides Type 2 road designs, methods, and systems for merging. In particular, FIG. 56 shows a Type 2 dedicated lane for vehicles merging from a minor road into an automated lane where the outer lane is an automated lane (5603). In the particular embodiment shown in FIG. 56, the major road is a two-way six-lane road and the outer lane is the automated lane. The minor road is a one-way two-lane road. The human-driven vehicles (5611) on the minor road can enter the major road under the control of the traffic signals (5613). When the signal turns green, AVs (5610) stop and human-driven vehicles (5611) on the inner lane of the minor road (5604) can enter the major road. When the light turned red, AVs (5610) can move on and human-driven vehicles (5611) on the inner lane of the minor road (5604) stop.

In some embodiments, as shown in FIG. 57, the technology provides Type 1 road designs, methods, and systems for diverging. In particular, FIG. 57 shows a Type 1 dedicated lane for vehicles diverging from an automated lane when the outer lane is an automated lane (5703). In the particular embodiment shown in FIG. 56, the major road is a two-way six-lane road and the outer lane is the automated lane. The minor road is a one-way two-lane road. When the signal (5713) turns green, human-driven vehicles (5711) in the waiting zone (5709) leave the major road and AVs (5710) stop. When the signal turns red, human-driven vehicles (5711) in the waiting zone (5709) stop and AVs (5710) move.

In some embodiments, as shown in FIG. 58, the technology provides Type 2 road designs, methods, and systems for diverging. In particular, FIG. 58 shows a Type 2 dedicated lane for vehicles diverging from an automated lane where the outer lane is an automated lane (5803). In the particular embodiment shown in FIG. 58, the major road is a two-way six-lane road and the outer lane is the automated lane. The minor road is a one-way two-lane road. Human-driven vehicles (5814) on the middle lane of the major road (5802) leaving the road continue straight at the direction switching zone (5809). Otherwise, the vehicles move to the inner lane of the major road (5801). When the signal (5816) turns green, human-driven vehicles (5814) on the middle lane of the major roads (5802) leave the road and AVs (5812) stop. When the signal turns red, human-driven vehicles (5814) on the middle lane of the major road (5802) stop driving and AVs (5812) could choose to go straight or switch to the human-driven mode.

In some embodiments, as shown in FIG. 59, the technology provides Type 2 road designs, methods, and systems for merging. In particular, FIG. 59 shows a Type 2 dedicated lane for AVs merging into an automated lane where the outer lane of the major road is an automated lane (5903). In the particular embodiment shown in FIG. 59, the major road is a two-way six-lane road. The outer lane is automated lane (5903) and the middle lane (5902) includes a mode switching zone (5905) and a buffer zone (5906). After the vehicles switch from the human-driven mode to the automated mode at the mode switching zone (5905), they speed up in the buffer zone (5906) and merge into the automated lane (5903).

In some embodiments, as shown in FIG. 60, the technology provides Type 1 road designs, methods, and systems for diverging. In particular, FIG. 60 shows a Type 1 dedicated lane for AVs diverging from an automated lane where the outer lane of the major road is an automated lane (6003). In the particular embodiment shown in FIG. 60, the major road is a two-way six-lane road. The outer lane is automated lane (6003) and the middle lane (6002) includes a mode switching zone (6006) and a buffer zone (6005). After the vehicles slow down at the buffer zone (6005), they switch from the automated mode to the human driven mode at the mode switching zone (6006).

In some embodiments, as shown in FIG. 61, the technology provides a Type 2 road design, methods, and systems for entering and exiting a road. In particular, FIG. 61 shows a Type 2 dedicated lane for an AV to enter and exit where the outer lane of the major road is an automated lane (6103). In the particular embodiment shown in FIG. 61, the road section is a two-way six lane road. The outer lane is an automated lane (6103) and the middle lane (6102) includes a mode switching zone (6105) and a buffer zone (6106). In some embodiments, the procedure of switching from a human-driven mode to an automated mode comprising vehicles passing through the mode switching zone (6105). If the vehicles complete the human-driven mode to automated mode switching procedure, the vehicles enter the automated lane (6103). Otherwise, they move to the human-driven lane (6102). In some embodiments, the procedure of switching from the automated mode to the human-driven mode comprises vehicles driving through the mode switching zone (6105); switching from the automated mode to the human-driven mode; and continuing to the human-driven lane.

In some embodiments, as shown in FIG. 62, the technology provides road designs, systems, and methods for entering an urban expressway. In particular, FIG. 62 shows an automated lane (6204) located at an entrance to an urban expressway minor lane. The inner lane of the minor lane is an automated lane (6204) and the outer lane is a human-driven lane (6205). The AVs are controlled by the system control and a gap is created for the human-driven vehicle (6211) to enter the major lane. The traffic signals (6213) are set at the entrance where the human-driven lane (6204) merges with the major lane. The traffic signals, which control and release the vehicles at the appropriate time, are cooperating with the AV platooning control.

In some embodiments, as shown in FIG. 63, the technology provides road designs, systems, and methods for exiting an urban expressway. In particular, FIG. 63 shows an automated lane (6304) located at an exit from an urban expressway minor road. The inner lane of the minor lane (6304) is an automated lane and the outer lane is a human-driven lane (6305). The AVs (6310) are controlled by the system control and a gap is created for the human-driven vehicle (6311) to leave the major lane. The traffic signals (6313) are set at the exit where the human-driven lane (6303) diverges from the major lane. The traffic signals control and release the vehicles at the appropriate time and are cooperating with the AV platooning control.

In some embodiments, as shown in FIG. 64, the technology provides road designs, systems, and methods for entering an urban expressway. In particular, FIG. 64 shows a design of an entrance for an automated lane that is alternately located in the inner lane of the minor lane and the outer lane of the urban expressway. The outer lane of the minor lane is a human-driven lane (6405). The automated lane on the inner lane of the minor lane (6404) is channeled to the outer lane of the major lane (6403) at the entrance. The AVs (6410) are automatically grouped by the system control and a gap is created for the human-driven vehicles (6411) to enter the major lane. The traffic signals (6413) are set at the entrance where the human-driven lane (6405) merges into the major lane, and the signal control is cooperating with the AV platooning control.

In some embodiments, as shown in FIG. 65, the technology provides road designs, systems, and methods for entering an urban expressway. In particular, FIG. 65 shows a design of an entrance for an urban expressway where the automated lane is located at the inner lane of an auxiliary road (6504) and an outer lane of the auxiliary road (6505) is for human-driven vehicles (6506). The AVs (6507) controlled by the system move in platoons and leave gaps for human-driven vehicles (6506) to enter the main road. The entrance where the human-driven vehicles (6506) enter the main road includes traffic signal lights, which are controlled according to the platoons and gaps of AVs (6507) and release the human-driven vehicles (6506) at the appropriate times. In some embodiments, the front of the waiting zone (6508) is used as a buffer and mode switching zone (6509) for AVs. In some embodiments, AVs (6510*a*) leave the automated lane and enter the human-driven mode (6510*h*) in this zone.

In some embodiments, as shown in FIG. 66, the technology provides road designs, systems, and methods for entering an urban expressway. In particular, FIG. 66 shows a design of an entrance to an urban expressway in which an inner automated driving lane of an auxiliary road (6604) connects with an outer automated driving lane of a main road (6603). The outer lane of the auxiliary road (6605) is for human-driven vehicles (6606) and the automated lane located on the inner lane of the auxiliary road (6604) is connected to the outer lane of the main road (6603) at the entrance. The AVs (6607) move in platoons controlled by the CAVH system and leave gaps for the human-driven vehicle (6606) to enter the main road. The entrance where the human-driven vehicles (6606) enter the main road includes traffic signal lights, which are controlled according to the platoons of AVs (6607) and release the human-driven vehicles (6606) at the appropriate times. AVs (6607) and human-driven vehicles (6606) enter the main road through two adjacent entrances. In some embodiments, to reduce interruption of the human driven traffic from the auxiliary road, a waiting zone (6608) is added.

In some embodiments, as shown in FIG. 67, the technology provides road designs, systems, and methods for exiting an urban expressway. In particular, FIG. 67 shows a design for an exit for an urban expressway in which an outer automated driving lane of the main road (6703) connects with an inner automated driving lane of an auxiliary road (6704) and the outer lane of the auxiliary road (6705) is a human-driven lane. The AVs (6707) travel in platoons controlled by the CAVH system and leave gaps for the human-driven vehicle (6706) to leave the main road. The exit where the human-driven vehicles (6706) leave the main road includes traffic signal lights, which are controlled according to the platoons of AVs (6707) and release the human-driven vehicles (6706) at the appropriate times. AVs (6707) and human-driven vehicles (6706) leave the main road through two adjacent exits. In some embodiments, to reduce interruption of the human-driven traffic to the auxiliary road, a waiting zone (6608) is added.

In some embodiments, as shown in FIG. 68, the technology provides road designs, systems, and methods for entering an urban expressway. In particular, FIG. 68 shows a design of an entrance for an urban expressway in which an inner lane (6804) of an auxiliary road is an automated lane and an outer lane (6805) is for human-driven vehicles (6807). The AVs (6808) travel in platoons controlled by the CAVH system and leave gaps for the human-driven vehicles (6807) to enter the main road. The entrance where the human-driven vehicles (6807) enter the main road includes traffic signal lights, which are controlled according to the platooning of AVs (6808) and release the human-driven vehicles (6707) at the appropriate times. The waiting zone (6809) of the human-driven vehicle is also used as a mode switching zone of the AVs, where the AVs previously moving using a human-driven mode switch to an automated mode and enter an automated lane.

In some embodiments, as shown in FIG. 69, the technology provides road designs, systems, and methods for exiting an urban expressway. In particular, FIG. 69 shows a design of an exit for an urban expressway in which an inner lane of an auxiliary road (6904) is an automated lane and an outer lane (6905) is for human-driven vehicles (6906). The AVs (6907) travel in platoons controlled by the CAVH system and leave gaps for the human-driven vehicles (6906) to leave the main road. The exit where the human-driven vehicles (6906) leave the main road includes traffic signal lights, which are controlled according to the platooning of AVs (6907) and release the human-driven vehicles (6906) at the appropriate times. The waiting zone (6908) of the human-driven vehicles (6906) is also used as a mode switching zone for the AVs (6907), in which AVs previously moving using a human-driven mode switch to an automated mode and enter an automated lane.

In some embodiments, as shown in FIG. 70, the technology provides road designs, systems, and methods for entering an urban expressway. In particular, FIG. 70 shows a design of an entrance for an urban expressway in which an inner automated driving lane of an auxiliary road (7004) connects to an outer automated driving lane of a main road (7003) and the outer lane of an auxiliary road (7005) is for human-driven vehicles (7006). The AVs (7007) controlled by the CAVH system travel in platoons and leave gaps for human-driven vehicles (7006) to enter the main road. The entrance where the human-driven vehicles (7006) enter the main road include traffic signal lights, which are controlled according to the platooning of AVs (7007) and release the human-driven vehicles (7006) at the appropriate times. The waiting zone (7008) of the human-driven vehicles is also used as a mode switching zone for the automated vehicles, in which AVs previously moving using a human-driven mode switch to an automated mode and enter an automated lane.

In some embodiments, as shown in FIG. 71, the technology provides road designs, systems, and methods for entering an urban expressway. In particular, FIG. 71 shows a design of an entrance for an urban expressway in which the inner automated lane of an auxiliary road (7104) connects to an outer automated lane of a main road (7103) at the entrance and the outer lane of as auxiliary road (7105) is for human-driven vehicles (7106). The AVs (7107) controlled by the CAVH system travel in platoons and leave gaps for human-driven vehicles (7106) to enter the main road. The entrance where the human-driven vehicles (7106) enter the main road includes traffic signal lights, which are controlled according to the platooning of AVs (7107) and release the human-driven vehicles (7106) at the appropriate times. In some embodiments, automated vehicles and human-driven vehicles (7106) enter the main road through two adjacent entrances. In some embodiments, to reduce interruption of the human-driven traffic from the auxiliary road, a waiting zone (7108) is added. The waiting zone (7108) of the human-driven vehicles (7106) is also used as a mode switching zone for the automatic vehicles, in which AVs previously on the human driving mode can switch to the automated mode and enter the automated lane.

In some embodiments, as shown in FIG. 72, the technology provides road designs, systems, and methods for exiting an urban expressway. In particular, FIG. 72 shows a design of an exit for an urban expressway in which an outer automated lane of a main road (7203) connects to an inner automated lane of an auxiliary road (7204). The outer lane of the auxiliary road (7205) is for human-driven vehicles. The AVs (7207) controlled by the CAVH system travel in platoons and leave gaps to let human-driven vehicles (7206) enter the main road. The entrance where the human-driven vehicles (7206) enter the main road include traffic signal lights, which are controlled according to the platooning of AVs (7207) and release the human-driven vehicles (7206) at the appropriate times. The waiting zone (7208) for human-driven vehicles is also used as the mode switching zone for AVs, where human-driven vehicles with automated driving capabilities (7209) can switch to the automated mode and enter the automated lane.

In some embodiments, as shown in FIG. 73, the technology provides road designs, systems, and methods for entering a main road. In particular, FIG. 73 shows a design for a road entrance in which an inner automated lane of an auxiliary road (7304) connects to an outer automated lane of a main road (7303) and an outer lane of an auxiliary road (7305) is for human-driven vehicles (7310). The AVs (7309) controlled by the system travel in platoons and leave gaps for human-driven vehicles (7310) to enter the main road. The entrance where the human-driven vehicles enter the main road includes traffic signal lights, which are controlled according to the platooning of AVs and release the human-driven vehicles at the appropriate times. In some embodiments, the front of the waiting zone (7306) is used as a buffer (7307) and mode switching zone (7308) for AVs, where AVs (7309) can switch from the automated mode to the human-driven mode (7310).

In some embodiments, as shown in FIG. 74, the technology provides road designs, systems, and methods for entering a main road. In particular, FIG. 74 shows a design for an entrance in which an inner automated lane of an auxiliary road (7404) connects to an outer automated lane of a main road (7403) and an outer lane of the auxiliary road (7405) is for human-driven vehicles. The AVs (7409) controlled by the system travel in platoons and leave gaps for human-driven vehicles (7410) to enter the main road. The entrance where the human-driven vehicles enter the main road includes traffic signal lights, which are controlled according to the platooning of AVs (7409) and release the human-driven vehicles (7410) at the appropriate times. AVs and human-driven vehicles enter the main road through two adjacent entrances. In some embodiments, a waiting zone is added to reduce interruption of the human-driven vehicles on the auxiliary road. The front of the waiting zone (7406) can be used as a buffer (7407) and mode switching zone (7408) for AVs, where AVs (7409) can leave the automated lane and enter human-driven mode (7410).

In some embodiments, as shown in FIG. 75, the technology provides road designs, methods, and systems for an intersection and controlling vehicles at an intersection. In particular, FIG. 75 shows an intersection design in which an outer lane of an auxiliary road and a branch road are automated lanes. In the particular embodiment shown in FIG. 75, the auxiliary road has two lanes in one direction: the outer lane (7502) is the automated lane, and the inner lane (7501) is the human-driven lane. The branch road is two-way four-lane road. The outer lane from south to north (7503) includes a mode switching zone (7506) and a buffer zone (7505). In some embodiments, a mode switching process from the human-driven mode (7508) to the automated mode (7507) comprises vehicles passing the mode switching zone. If the requirements for mode switching are met, vehicles switch from the human-driven mode (7508) to the automated mode (7507) and enter the automated lane; if the requirements for mode switching are not met, vehicles drive into the human-driven lane. The mode switching process from the automated mode to the human-driven mode comprises AVs driving out of the automated lane and completing the switching process from automated mode to human-driven mode.

In some embodiments, as shown in FIG. 76, the technology provides road designs, methods, and systems for entering a main road. In particular, FIG. 76 shows an entrance design in which an outer automated lane of an auxiliary road (7605) connects to an outer human-driven lane of a main road (7603) and an inner lane of the auxiliary road (7604) is for human-driven vehicles (7610). The AVs (7609) controlled by the system travel in platoons and leave gaps for human-driven vehicles (7610) to enter the main road.

In some embodiments, as shown in FIG. 77, the technology provides road designs, methods, and systems for exiting a main road. In particular, FIG. 77 shows an exiting design in which an outer automated lane of a main road (7703) connects to an outer automated lane of an auxiliary road (7705) and an inner lane of the auxiliary road (7704) is for human-driven vehicles (7710). The AVs (7709) controlled by the system travel in platoons and leave gaps for human-driven vehicles (7710) to exit the main road.

Also provided herein are methods employing any of the systems described herein for the management of one or more aspects of traffic control. The methods include those processes undertaken by individual participants in the system (e.g., drivers, public or private local, regional, or national transportation facilitators, government agencies, etc.) as well as collective activities of one or more participants working in coordination or independently from each other.

Some portions of this description describe the embodiments of the technology in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Certain steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments of the invention may also relate to an apparatus for performing the operations herein. This apparatus may be specially constructed for the required purposes, and/or it may comprise a general purpose computing device selectively activated or reconfigured by a computer program stored in the computer. Such a computer program may be stored in a non transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Although the disclosure herein refers to certain illustrated embodiments, it is to be understood that these embodiments are presented by way of example and not by way of limitation.

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims.

We claim:

1. A method of mode switching for an automated vehicle (AV), the method comprising:
   providing an AV identification detector at an entrance of an automated driving lane;
   sending a mode switching request from an AV to a road design and traffic control system;
   determining by the AV identification detector if the AV meets a requirement for switching from a human-driven mode to an automated driving mode; and
   controlling by a connected and automated vehicle highway (CAVH) system the AV to accelerate or decelerate through the buffer zone to the automated lane.

2. The method of claim 1, wherein the AV is in a mode switching zone of the road design and traffic control system when the AV sends the mode switching request.

3. The method of claim 1, wherein the mode switching request comprises a request to switch from a human driven mode to an automated mode.

4. The method of claim 3, wherein the method further comprises:
   determining by the road design and traffic control system if the AV approaching an automated lane meets a requirement for mode switching from a human-driven mode to an automated mode.

5. The method of claim 4, further comprising providing an "access allowed" signal if the approaching AV meets the requirement for mode switching from a human-driven mode to an automated mode or providing an "access denied" signal if the approaching AV does not meet the requirement for mode switching from a human-driven mode to an automated mode.

6. The method of claim 4, wherein, if the AV does not meet the requirement for mode switching from a human-driven mode to an automated mode, then further comprising identifying by the AV or road design and traffic control system an exit from the automated lane; controlling the AV by the CAVH system to drive through a buffer zone and mode switching zone; exiting the automated lane; and entering the human-driven lane.

7. The method of claim 4, further comprising determining by the CAVH system a real-time location and velocity information of the AV; and providing control instructions from the CAVH system to the AV for merging into the automated lane.

8. The method of claim 7, wherein providing control instructions from the CAVH system to the AV comprises providing the control instructions from a roadside unit of the CAVH system to an onboard unit of the AV.

9. The method of claim 4, wherein the buffer zone is a road segment comprising at least a portion of the automated lane and at least a portion of a human-driven lane.

10. The method of claim 4, wherein the requirement for mode switching from a human-driven mode to an automated mode is that the CAVH system is able to control the AV.

11. The method of claim 4, wherein the requirement for mode switching from a human-driven mode to an automated mode comprises assessing a vehicle automation level of the AV, a speed of the AV, hardware of the AV, and software of the AV.

12. The method of claim 4, wherein the mode switching request comprises a request to switch from an automated mode to a human-driven mode.

13. The method of claim 12, wherein the method further comprises:
   determining by the road design and traffic control system if an AV exiting an automated lane meets a requirement for mode switching from an automated mode to a human-driven mode; and
   if the AV meets the requirement for mode switching from an automated mode to a human-driven mode, then controlling the AV by the CAVH system to enter a mode switching zone, guiding the AV to exit the automated lane through a buffer zone to enter a human-driven lane, and transferring control of the AV to a human driver.

14. The method of claim 13, wherein the requirement for mode switching from an automated mode to a human-driven mode is that the AV may be driven by a human driver of the AV.

15. The method of claim 1, further comprising switching modes by the AV from a human driven mode to an automated mode or from an automated mode to a human-driven mode.

16. The method of claim 15, wherein the AV is in a mode switching zone when switching modes.

17. The method of claim 16, further comprising driving from a human-driven lane through a buffer zone to an automated lane or driving from an automated lane through a buffer zone to a human-driven lane.

18. The method of claim 17, wherein the buffer zone is a road segment comprising at least a portion of the automated lane and at least a portion of the human-driven lane and having a length provided by $$L_h = v_{in}\tau_{85} + \frac{|v_{in}^2 - v_{out}^2|}{2a_{avg}}$$

where $L_h$ is the buffer zone length, $v_{in}$ is the maximum speed when entering the buffer zone, $v_{out}$ is the minimum speed to leave the buffer zone, $a_{avg}$ is the average acceleration of a vehicle, and $\tau_{85}$ is an 85% reaction time for a driver.

19. The method of claim 17, wherein the mode switching zone is a road segment having a length provided by $$L_2 = v \cdot \tau_{85}$$

where $L_2$ is the length of the mode switching zone, v is a vehicle speed, and $\tau_{85}$ is an 85% reaction time for a driver.

* * * * *